US010908732B1

(12) United States Patent
Sundara-Rajan et al.

(10) Patent No.: US 10,908,732 B1
(45) Date of Patent: Feb. 2, 2021

(54) REMOVABLE ELECTRONICS DEVICE FOR PRE-FABRICATED SENSOR ASSEMBLIES

(71) Applicant: Google LLC, Mountain View, CA (US)

(72) Inventors: Kishore Sundara-Rajan, Redwood City, CA (US); Mauricio E. Gutierrez Bravo, Santa Clara, CA (US); Ivan Poupyrev, Sunnyvale, CA (US); Alejandro Kauffmann, San Francisco, CA (US); Mustafa Emre Karagozler, London (GB)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/550,932

(22) Filed: Aug. 26, 2019

(51) Int. Cl.
| | | |
|---|---|---|
| *G06F 3/041* | (2006.01) | |
| *G06F 3/044* | (2006.01) | |
| *G06F 3/0488* | (2013.01) | |
| *D03D 1/00* | (2006.01) | |
| *G06N 20/00* | (2019.01) | |

(52) U.S. Cl.
CPC ........ *G06F 3/04162* (2019.05); *G06F 3/0446* (2019.05); *G06F 3/04883* (2013.01); *D03D 1/0088* (2013.01); *G06F 2203/04102* (2013.01); *G06F 2203/04107* (2013.01); *G06N 20/00* (2019.01)

(58) Field of Classification Search
CPC .............. G06F 3/04162; G06F 3/0446; G06F 3/04883; G06F 2203/04102; G06F 2203/04107; G06N 20/00; D03D 1/0088
See application file for complete search history.

(56) References Cited

U.S. PATENT DOCUMENTS

| | | | |
|---|---|---|---|
| 8,035,039 | B2 | 10/2011 | Cha et al. |
| 8,373,672 | B2 | 2/2013 | Wallace et al. |
| 8,648,837 | B1 * | 2/2014 | Tran .................... G06F 3/03545 |
| | | | 345/179 |
| 2002/0076948 | A1 | 6/2002 | Farrell et al. |
| 2006/0281382 | A1 | 12/2006 | Karayianni et al. |
| 2009/0303602 | A1 | 12/2009 | Bright et al. |

(Continued)

FOREIGN PATENT DOCUMENTS

WO    WO 2007/137486    12/2007

*Primary Examiner* — Lisa S Landis
(74) *Attorney, Agent, or Firm* — Dority & Manning, PA

(57) ABSTRACT

A removable electronics device for pre-fabricated sensor assemblies of interactive objects is provided. The removable electronics device includes one or more processors, a first communication interface configured to communicatively couple with one or more remote computing devices, and a second communication interface configured to communicatively couple with a plurality of pre-fabricated sensor assemblies having touch sensors with different sensor layouts. The removable electronics module can analyze, in response to being physically coupled to a first pre-fabricated sensor assembly, first touch data to detect one or more pre-defined motions based on one or more first pre-defined parameters associated with the first touch sensor. The removable electronics module can analyze, in response to being physically coupled to a second pre-fabricated sensor assembly, second touch data to detect the one or more pre-defined motions based on one or more second pre-defined parameters associated with the second touch sensor.

20 Claims, 37 Drawing Sheets

(56) References Cited

U.S. PATENT DOCUMENTS

| | | |
|---|---|---|
| 2010/0283749 A1* | 11/2010 | Walkington .......... G06F 3/0416 345/173 |
| 2013/0068602 A1 | 3/2013 | Reynolds et al. |
| 2014/0048310 A1 | 2/2014 | Montevirgen et al. |
| 2014/0295063 A1 | 10/2014 | Petcavich et al. |
| 2016/0058076 A1 | 3/2016 | Reho et al. |
| 2018/0260052 A1 | 9/2018 | Karagozler |
| 2018/0310659 A1 | 11/2018 | Poupyrev et al. |
| 2018/0338544 A1 | 11/2018 | Huang et al. |

* cited by examiner

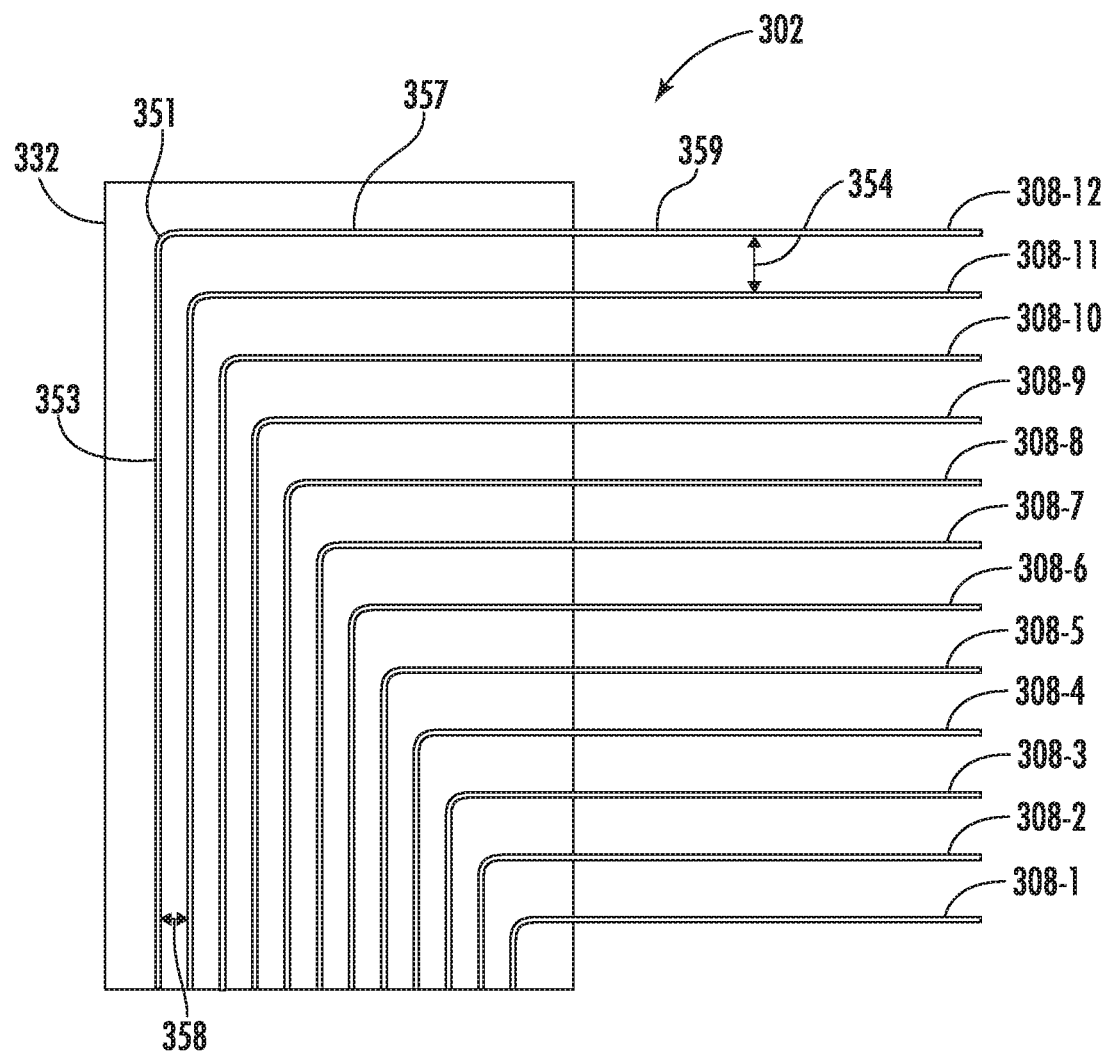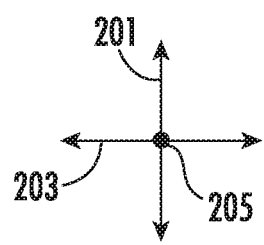
FIG. 10

US 10,908,732 B1

REMOVABLE ELECTRONICS DEVICE FOR PRE-FABRICATED SENSOR ASSEMBLIES

FIELD

The present disclosure relates generally to electronics devices for interactive objects.

BACKGROUND

An interactive object can include a sensor such as sensing lines which may include conductive threads incorporated into the interactive object to form a sensor such as a capacitive touch sensor that is configured to detect touch input. The interactive object can process the touch input to generate touch data that is useable to initiate functionality locally at the interactive object or at various remote devices that are wirelessly coupled to the interactive object. Interactive objects may include conductive lines for other purposes, such as for strain sensors using conductive threads and for visual interfaces using line optics.

An interactive object may be formed by forming a grid or array of conductive thread woven into an interactive textile, for example. Each conductive thread can include a conductive wire (e.g., a copper wire) that is twisted, braided, or wrapped with one or more flexible threads (e.g., polyester or cotton threads). It may be difficult, however, for traditional sensor designs with such conductive lines to be implemented within objects.

SUMMARY

Aspects and advantages of embodiments of the present disclosure will be set forth in part in the following description, or may be learned from the description, or may be learned through practice of the embodiments.

One example aspect of the present disclosure is directed to a removable electronics device, including one or more processors, a first communication interface configured to communicatively couple the removable electronics device to one or more remote computing devices, and a second communication interface configured to communicatively couple the removable electronics device to at least a first pre-fabricated sensor assembly comprising a first touch sensor having a first set of sensing elements and a second pre-fabricated sensor assembly comprising a second touch sensor having a second set of sensing elements. A first sensor layout of the first set of sensing elements is different from a second sensor layout of the second set of sensing elements. The removable electronics device includes one or more non-transitory computer-readable media that collectively store instructions that, when executed by the one or more processors, cause the one or more processors to perform operations. The operations include analyzing, in response to the removable electronics device being physically coupled to the first pre-fabricated sensor assembly, first touch data associated with the first pre-fabricated sensor assembly to detect one or more pre-defined motions based on one or more first pre-defined parameters associated with the first touch sensor, and analyzing, in response to the removable electronics device being physically coupled to the second pre-fabricated sensor assembly, second touch data associated with the second pre-fabricated sensor assembly to detect the one or more pre-defined motions based on one or more second pre-defined parameters associated with the second touch sensor.

Other example aspects of the present disclosure are directed to systems, apparatus, computer program products (such as tangible, non-transitory computer-readable media but also such as software which is downloadable over a communications network without necessarily being stored in non-transitory form), user interfaces, memory devices, and electronic devices for implementing and utilizing touch sensors such as capacitive touch sensors.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIGS. 8-9 are top and bottom perspective views, respectively, depicting an example pre-fabricated sensor assembly in accordance with example embodiments of the present disclosure;

FIG. 10 depicts an example layout of a plurality of conductive threads of a capacitive touch sensor in accordance with example embodiments of the present disclosure;

DETAILED DESCRIPTION

Figure 1:
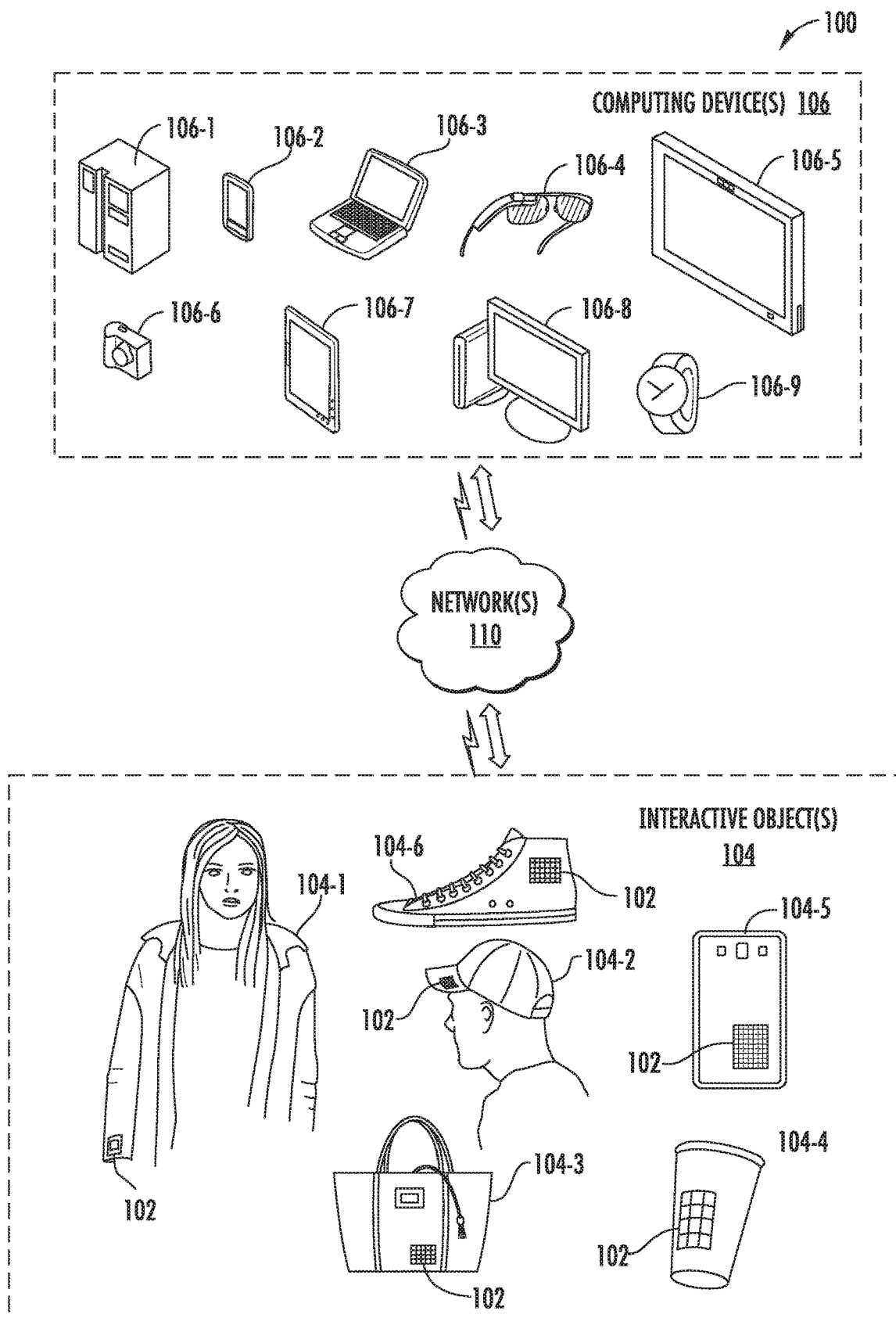
FIG. 1 depicts an example computing environment in which a pre-fabricated sensor assembly in accordance with example embodiments of the present disclosure may be implemented.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, embodiments in accordance with the present disclosure are directed to methods and systems related to pre-fabricated sensor assemblies for interactive objects and removable electronics devices (also referred to as removable electronics modules) that are configured to interface with different types of pre-fabricated sensor assemblies, such as may be incorporated within different types of interactive objects. More particularly, a removable electronics device in accordance with example embodiments of the disclosed technology can be configured to interface with various types of touch sensors that may be integrated within different pre-fabricated sensor assemblies. Additionally, the removable electronics device can be configured to interface with one or more sensors integrated within the removable electronics device, such as an inertial measurement unit. The removable electronics device may be configured to physically and removably couple to sensor assemblies having different form factors, as well as for communication with touch sensors having different sensor layouts of sensing elements, etc. In this manner, a user may utilize a single removable electronics device that can automatically interface with different types of sensor assemblies in order to interact with various types of interactive objects.

By way of example, a removable electronics device in accordance with example embodiments may be configured to interface with pre-fabricated sensor assemblies having different types of sensors. For example, a first pre-fabricated sensor assembly may have a first type of capacitive touch sensor, such as may be integrated within a first type of interactive object (e.g., a jacket). The first type of capacitive touch sensor may include sensing elements having a first sensor layout. The sensor layout may refer to a sensing element material (e.g., metal line, conductive thread, etc.), a number of sensing elements of the touch sensor a shape of the sensing elements (e.g., lines, squares, circles, or other shape), a dimension of the sensing elements, and/or a spacing between sensing elements, etc. The removable electronics module may be further configured to interface with a second pre-fabricated sensor assembly having a second type of capacitive touch sensor, such as may be integrated within a second type of interactive object (e.g., a shoe). The second type of capacitive touch sensor may include sensing elements having a second sensor layout. In this manner, a single removable electronics device may be utilized with multiple interactive objects including different types of pre-fabricated sensor assemblies.

According to example aspects, a removable electronics device in accordance with example embodiments can include one or more processors, a first communication interface configured to communicatively couple the removable electronics device to one or more computing devices, and a second communication interface configured to communicatively couple the removable electronics device to a plurality of pre-fabricated sensor assemblies. Each pre-fabricated sensor assembly can include a respective touch sensor having a respective plurality of sensing elements with different sensory layouts. By way of example, the removable electronics device can be configured for communication with at least a first pre-fabricated sensor assembly comprising a first touch sensor having a first set of sensing elements and a second pre-fabricated sensor assembly comprising a second touch sensor having a second set of sensing elements with a different sensory layout. The removable electronics module can analyze, in response to the removable electronics device being physically coupled to the first pre-fabricated sensor assembly, first touch data associated with the first pre-fabricated sensor assembly to detect one or more pre-defined motions based on one or more first pre-defined parameters associated with the first touch sensor. The removable electronics module can analyze, in response to the removable electronics device being physically coupled to the second pre-fabricated sensor assembly, second touch data associated with the second pre-fabricated sensor assembly to detect the one or more pre-defined motions based on one or more second pre-defined parameters associated with the second touch sensor.

The removable electronics device may be removably inserted into a first pre-fabricated sensor assembly of a first interactive object and be configured to detect one or more pre-defined motions associated with touch data generated in response to touch inputs to a first sensor (e.g., capacitive touch sensor) of the first pre-fabricated sensor assembly. For example, the removable electronics module may perform a motion (e.g., gesture) recognition process for the one or more pre-defined motions using a first set of pre-defined detection parameters when the removable electronics module is inserted into the first pre-fabricated sensor assembly. In some examples, the removable electronics module may perform a gesture recognition process for the one or more pre-defined motions using a machine learned model associated with the first pre-fabricated sensor assembly. The machine learned model associated with the first pre-fabricated sensor assembly can be configured particularly for the sensor of the first pre-fabricated sensor assembly. In some examples, the machine learned model associated with the first pre-fabricated sensor assembly can include a set of weights or other parameters associated with the sensor of the first pre-fabricated sensor assembly.

The removable electronics module may be removed from the first interactive object and inserted into a second pre-fabricated sensor assembly of a second interactive object. The removable electronics module can be reconfigured to detect the one or more pre-defined motions associated with touch data generated in response to touch inputs to a second touch sensor (e.g., resistive touch sensor) of the second pre-fabricated sensor assembly when the removable electronics module is inserted into the second pre-fabricated sensor assembly. For example, the removable electronics module may perform a motion recognition process for the one or more pre-defined motions using a second set of pre-defined detection parameters. In some examples, the removable electronics module may perform a gesture recognition process for the one or more pre-defined motions using a machine learned model associated with the second pre-fabricated sensor assembly. The machine learned model associated with the second pre-fabricated sensor assembly can be configured particularly for the sensor of the second pre-fabricated sensor assembly. In some examples, the machine learned model associated with the second pre-fabricated sensor assembly can include a set of weights or other parameters associated with the sensor of the second pre-fabricated sensor assembly. In some examples, the removable electronics module may perform a gesture recognition process for the one or more pre-defined motions using a second machine learned model associated with the second preconfigured sensor assembly. In other examples, the removable electronics module may perform a gesture recognition process for the one or more pre-defined motions using the same machine learned model as for the pre-first pre-fabricated sensor assembly, however a different set of weights can be used. The removable electronics device can obtain the pre-defined parameters over a wireless network interface in some examples. For instance, the removable electronics device may obtain the pre-defined parameters from one or more remote computing devices, such as of a cloud computing service.

According to some aspects, a removable electronics device such as a removable electronics module for pre-fabricated sensor assemblies can analyze touch data from a first preconfigured sensor assembly to detect one or more pre-defined motions such as gestures provided as a touch input to a capacitive touch sensor of the first pre-fabricated sensor assembly. The removable electronics module can use one or more first pre-defined parameters such as sensing, motion, or other detection parameters associated with the first pre-fabricated sensor assembly. The removable electronics device can analyze touch data from a second pre-configured sensor assembly to detect the one or more pre-defined motions such as gestures provided as a touch input to a capacitive touch sensor of the second pre-fabricated sensor assembly. The removable electronics device can use one or more second pre-defined parameters associated with the second preconfigured sensor assembly.

In accordance with some example embodiments, a removable electronics device can detect a connection of the removable electronics device with a pre-fabricated sensor assembly. For example, the removable electronics device may detect that the removable electronics device is physically coupled to a first pre-fabricated sensor assembly comprising a first touch sensor having a first set of sensing elements with a first sensor layout. The removable electronics device can obtain pre-defined parameters associated with the first touch sensor of the first pre-fabricated sensor assembly in response to detecting the connection. The removable electronics device can be configured to detect pre-defined motions based on the pre-defined parameters obtained in response to detecting the connection. Subsequent to configuring the removable electronics device with pre-defined parameters associated with the first touch sensor of the first pre-fabricated sensor assembly, the removable electronics device can be removed from the first pre-fabricated sensor assembly and inserted into a second pre-fabricated sensor assembly. The removable electronics device can detect that the removable electronics device is physically coupled to the second pre-fabricated sensor assembly comprising a second touch sensor having a second set of sensing elements having a second sensor layout that is different from the first sensor layout. In response, the removable electronics module can obtain one or more second pre-defined parameters associated with the second pre-fabricated sensor assembly. The removable electronics device can be reconfigured to detect the one or more pre-defined motions based at least in part on the one or more second pre-defined parameters.

In some examples, the removable electronics device may utilize one or more machine learned models to detect the one or more pre-defined motions. The removable electronics device can configure one or more machine learned models for detecting pre-defined motions based on the pre-defined parameters associated with a particular pre-fabricated sensor assembly. By way of example, one or more machine learned models can be configured with a first set of weights to detect pre-defined motions associated with a first pre-fabricated sensor assembly. The one or more machine learned models can be reconfigured with a second set of weights to detect pre-defined motions associated with a second pre-fabricated sensor assembly. In another example, one or more first machine learned models can be obtained to configure the removable electronics device to detect pre-defined motions associated with a first pre-fabricated sensor assembly. One or more second machine learned models can be obtained to configure the removable electronics device to detect the pre-defined motions associated with a second pre-fabricated sensor assembly.

The removable electronics module can include a housing that is configured to removably couple the removable electronics module to different types of pre-fabricated sensor assemblies that may be integrated within various types of interactive objects. For example, the removable electronics module can include one or more retaining elements that are configured to removably couple to the one or more retaining elements of different types of receptacles of different sensor assemblies. The removable electronics device can connect to different types of receptacles, such as may be utilized for different types of interactive objects. In some examples, the removable electronics module can include a single set of retaining elements that are configured to interface with receptacles having different form factors. By way of example, the removable electronics module can include retaining elements that are adapted to physically couple to corresponding retaining elements of receptacles having a slot-based form factor as well as receptacles having a box-based form factor. In other examples, the removable electronics module can include multiple sets of retaining elements with individual sets configured to interface with particular receptacles having particular types of form factors.

In accordance with some aspects, the removable electronics device can include a processor, an inertial measurement unit, a first communication interface that is configured for data power communication with one or more remote computing devices, and a second communication interface that is configured for communication with a plurality of preconfigured sensor assemblies that each include a capacitive touch sensor. The various components can be at least partially disposed within the housing of the removable electronics module. The second communication interface can be configured for communication with sensor assemblies having different sensor layouts, such as sensors with different numbers of sensing elements for the capacitive touch sensor, different material types of the sensing element, different spacings and/or other sensor layouts of the sensing elements, etc.

In some examples, the housing of the removable electronics module can include a first opening that is disposed along a first longitudinal face of the housing. The first communication interface can include a connector adjacent to the first opening and that is configured to physically and communicatively couple the removable electronic device to one or more remote computing devices. The removable electronics device can include a plurality of second openings disposed along the lower surface of the housing. The second communication interface can include a plurality of contacts that are configured to communicatively couple the removable electronic device to a pre-fabricated sensor assembly when the removable electronic device is inserted in the receptacle of a pre-fabricated sensor assembly. The contacts of the removable electronics device can interface with receptacles having different form factors to establish an electrical connection.

According to some aspects, the removable electronics device can include a rechargeable power source such as a rechargeable battery (e.g., lithium-ion battery). An internal electronics device (also referred to as internal electronics module) of each pre-fabricated sensor assembly can be powered by a power source of the removable electronics module when the removable electronics module is connected to the pre-fabricated sensor assembly. For example, an internal electronics module of each pre-fabricated sensor assembly may include sensing circuitry that is configured to generate touch data in response to touch input detected at a corresponding capacitive touch sensor. The sensing circuitry can be powered by the power source of the removable electronics device when the removable electronics module inserted into a corresponding pre-fabricated sensor assembly.

According to some aspects of the disclosed technology, one or more of the contacts of the removable electronics module can be configured to provide power from the power source of the removable electronics module to a pre-fabricated sensor assembly when the removable electronics module is inserted into the pre-fabricated sensor assembly. At the same time, one or more other contacts of the removable electronics module can be configured to provide data from the removable electronics module to a pre-fabricated sensor assembly when the removable electronics devices inserted into the pre-fabricated sensor assembly.

Embodiments of the disclosed technology provide a number of technical effects and benefits, particularly in the areas of interactive objects, touch sensors, computing technology, and the integration of electronics with different types of touch sensors. Additionally, one or more aspects of the disclosed technology may address issues that may arise when seeking to provide a practical system and method for incorporating sensor assemblies into interactive objects, and providing electronics that are capable of interfacing with the sensor assemblies of different types of interactive objects. In accordance with example embodiments of the disclosed technology, a removable electronics device can be configured to interface with different types of sensor assemblies, including sensor assemblies that can include different form factors as well as different types of touch sensors. The unique combination of a housing adapted to interface with different form factors and electronics preconfigured to interface with different types of capacitive touch sensors enables sensor assemblies to be widely incorporated within different types of interactive objects, while providing a simple and cost efficient electronics device for interfacing with the various types of sensor assemblies once incorporated into different types of interactive objects.

In some examples, different types of pre-fabricated sensor assemblies can be provided to enable tight integration within an interactive object. The pre-fabricated sensor assemblies can include different types of sensors such as different types of capacitive touch sensors in some examples. For instance, different materials may be utilized to form the sensing elements of the capacitive touch sensors, different numbers of sensing elements may be used, different spacings between sensing elements may be utilized, etc. Such differences can enable various pre-fabricated sensor assemblies to be integrated within a wide variety of interactive objects, including but not limited to, interactive garments, interactive garment accessories, interactive garment containers, and other wearable devices, etc. A single removable electronics device can be configured for physical coupling with the different types of pre-fabricated sensor assemblies, and can be configured for communication with different types of capacitive touch sensors. In this manner, a single removable electronics device may be adapted for multiple types of interactive objects to provide a cost-effective and efficient solution. In some examples, the removable electronics device can communicate with remote computing devices such as a smart phone, tablet, laptop, cloud computing device, etc. to provide an interface between the interactive object and the remote computing devices.

According to some aspects, a removable electronics device can include a housing having a set of retaining elements configured to physically couple the movable electronics device to different types of receptacles having different form factors. The set of retaining elements can be adapted for physical coupling with slot-based receptacles of some preconfigured sensor assemblies as well as box-based receptacles of other preconfigured sensor assemblies. In this manner, a suitable receptacle can be integrated within an interactive object to facilitate coupling with a common form factor for the removable electronics device. As such, the removable electronics device can seamlessly and efficiently interface with different types of interactive objects having different types of receptacles for receiving the removable electronics device.

According to some aspects, the removable electronics device can be configured to analyze the touch data from different types of preconfigured sensor assemblies. For example, the removable electronics device can be configured to analyze the touch data from a first type of capacitive touch sensor (such as including a first number of sensing elements) and a second type of capacitive touch sensor (such as including a second number of sensing elements). The removable electronics device can be configured to analyze the different types of touch data may be provided for different types pre-fabricated sensor assemblies in order to detect the same set of pre-defined motions such as gestures. By way of example, the removable electronics device can apply different types of sensing or other detection parameters to analyze the touch data from different types of capacitive touch sensors. In some instances, the removable electronics device can utilize different machine learned model configurations to analyze the touch data from different types of touch sensors. Accordingly, the removable electronics device can provide a seamless integration with different types of capacitive touch sensors, including an automatic configuration for detecting gestures from different types of capacitive touch sensors.

In accordance with example aspects of the disclosed technology, an electronics system may include a removable electronics module, a first interactive object, and a second interactive object. The removable electronics module can include one or more processors, and inertial measurement unit, a communication interface including a plurality of contacts configured for communication with a plurality of pre-fabricated sensor assemblies, and a housing that at least partially encloses a processor, the inertial measurement unit, and the communication interface. The housing can include one or more retaining elements that are configured to couple the removable electronics module to different types of receptacles having different form factors.

The first interactive object can include a first pre-fabricated sensor assembly. The first pre-fabricated sensor assembly can include a first capacitive touch sensor that comprises a first plurality of flexible sensing elements. The first preconfigured sensor assembly can include a first internal electronics device comprising first sensing circuitry in electrical communication with the flexible sensing elements of the capacitive touch sensor. The pre-fabricated sensor assembly can include a first receptacle that has a first form factor including a first plurality of receiving elements. The first plurality of receiving elements can be configured to removably couple to one or more retaining elements of the removable electronics module to removably connect the removable electronics module to the first pre-fabricated sensor assembly. The first receptacle can include a first plurality of contact protrusions that extend from a first plurality of openings in a first base member of the first receptacle contact the plurality of contact pads of the removable electronics device when inserted in the first receptacle.

The second interactive object can include a second preconfigured sensor assembly including a second capacitive touch sensor comprising a second plurality of flexible sensing elements. The second interactive object can include a second internal electronics device that includes second sensing circuitry in electrical communication with the second plurality of flexible sensing elements. The second pre-fabricated sensor assembly can include a second receptacle that has a second form factor including a second plurality of receiving elements that are configured to removably couple to the one or more retaining elements of the removable electronics device to removably connect the removable electronics device to the second pre-fabricated sensor assembly. The second receptacle can include a second plurality of contact protrusions that extend from a second plurality of openings in a second base member of the second receptacle. The first base member of the first receptacle can have a first length in the longitudinal direction that is less than a second link of the second base member of the second receptacle in the longitudinal direction.

In some example aspects, the present disclosure is directed to a pre-fabricated sensor assembly and related manufacturing processes that can be applied to create interactive objects from existing object substrates that have been at least partially fabricated or otherwise formed prior to application of the pre-fabricated sensor assembly. A pre-fabricated sensor assembly can include a touch sensor such as a resistive or capacitive touch sensor and sensing circuitry formed in a housing that enables tight integration with an interactive object, while also being suitable for application to the interactive object after the interactive object has been at least partially assembled. In this manner, the pre-fabricated sensor assembly can enable physical incorporation of the touch sensor within an interactive object, while also permitting traditional manufacturing processes to be used to form at least a portion of the interactive object.

According to some example embodiments, a pre-fabricated sensor assembly can include a touch sensor having a plurality of sensing elements that are coupled to sensing circuitry of a first electronics device (e.g., internal electronics device). One or more communication interfaces such as a communication cable can be coupled to the electronics module to facilitate communication with other electronic components that are local to the pre-fabricated sensor assembly and/or that are remote from the assembly, such as a smartphone or other computing device. A receptacle can be coupled to at least one of the communication cables for removably connecting a second electronics module (e.g., removable electronics device) to the pre-fabricated sensor assembly. One or more flexible retaining layers can be used to define a housing for at least the touch sensor and optionally other components such as the first electronics module. In some examples, the one more retaining layers can also be used to attach the pre-fabricated sensor assembly to a substrate of an object. For example, the one more retaining layers can be heat-pressed, sewn, glued, bonded or otherwise attached to the substrate of an existing object so as to form interactive object therefrom. The one or more retaining layers may be one or more encapsulating layers form from a polyurethane or other suitably flexible material. In this manner, traditional manufacturing processes may be utilized to form at least a portion of the object prior to integrating a capacitive touch sensor. By way of example, an interactive garment including a pre-fabricated sensor assembly in accordance with example embodiments can be manufactured with minimal disruption to traditional manufacturing processes that are utilized to form garments and the like. A garment can be at least partially manufactured using traditional textile manufacturing processes, followed by attaching the pre-fabricated sensor assembly to form an interactive garment.

A pre-fabricated sensor assembly for interactive objects in accordance with example embodiments may be contrasted with previous approaches for forming interactive objects. For example, many existing techniques seek to integrate sensing elements into a substrate such as a textile fabric prior to forming an object. For instance, some existing techniques weave conductive threads into a fabric to form a capacitive touch sensor. In these approaches, a fabric with conductive threads undergoes any manufacturing processes used to form an object such as cutting, sewing, gluing, etc. Many traditional manufacturing processes, such as traditional textile manufacturing processes, however, may not be able to process, or may not be as easily able to process, a substrate such as a textile fabric that has conductive sensing lines integrated within the fabric. Accordingly, such techniques may require modifications to traditional textile machinery and processes in order to be able to accommodate conductive threads. As such, in many cases it may be not be desirable to form sensing lines within a textile substrate that forms a garment or other interactive object, etc.

In accordance with example embodiments of the present disclosure, a pre-fabricated sensor assembly can include a touch sensor that includes a plurality of sensing elements that are adapted for integration within an object after at least a portion of the object has been formed. In this manner, traditional manufacturing processes may be utilized to form at least a portion of the object prior to integration of the capacitive touch sensor.

For example, an interactive object can be manufactured by receiving a manufactured object that includes an object substrate. The manufactured object can be in a form suitable for its primary purpose such as a garment that is suitable for wear, a backpack or luggage that is suitable for carrying items, etc. The manufactured object may include sub-components of objects, such as a strap or other object that is intended to be applied to other materials to form a final product. Nevertheless, the strap is suitable for its primary purpose of attachment and providing a carrying mechanism. The manufactured object can include a receiving feature. The manufacturing process can include providing a pre-fabricated sensor assembly including one or more flexible retaining layers, a capacitive touch sensor, a first electronics module, and a communication interface having a first end portion coupled to the first electronics module and a second end portion coupled to a receptacle configured to removably connect a second electronics module to the pre-fabricated sensor assembly. The capacitive touch sensor can include a plurality of flexible sensing lines elongated in a first direction and coupled to the first electronics module. The first electronics module can be powered by a power source of the second electronics module when the second electronics module is connected to the pre-fabricated sensor assembly. The manufacturing process can include attaching the pre-fabricated sensor assembly to the object substrate after receiving the manufactured object.

By way of example, an interactive object can include a "soft" object such as a garment, garment accessory, or garment container at least partially formed from a flexible substrate. The flexible substrate may be formed of a soft material such as leather, natural fibers, synthetic fibers, or networks of such fibers. The flexible substrate may include a textile such as a woven or non-woven fabric, or other materials such as flexible plastics, films, etc. Materials may be formed by weaving, knitting, crocheting, knotting, pressing threads together or consolidating fibers or filaments together in a nonwoven manner. Interactive objects may also include "hard" objects such as may be made from nonflexible or semi-flexible materials such as plastic, metal, aluminum, and so on. By utilizing flexible sensing lines with a flexible retaining layer structure, a pre-fabricated sensor assembly in accordance with embodiments of the present disclosure may be incorporated or otherwise applied to at least partially formed soft objects and/or hard objects.

As a specific example, consider a garment such as a shirt or jacket that can be manufactured from a textile-based substrate. In such a case, a woven or non-woven fabric can be processed using traditional textile manufacturing techniques that may include sewing, gluing, and other fastening techniques to form the garment. The pre-fabricated sensor assembly can be attached to the garment after at least a portion of the garment has been formed using these traditional manufacturing processes.

To apply pre-fabricated sensor assembly in accordance with example embodiments, one or more portions of a garment may be left accessible, such as by leaving an opening in a cuff of a jacket or shirt. One or more seams that are used to form the cuff portion of the jacket may be left open for example. The open cuff may comprise a receiving feature of the interactive object. The pre-fabricated sensor assembly can be inserted into the opening or otherwise attached to the existing textile substrate that forms the interactive garment. The pre-fabricated sensor assembly can be sewn, glued, heat pressed, or attached to the jacket in another suitable manner. After attaching the pre-fabricated sensor assembly, the one or more seams can be sewn or otherwise closed to complete manufacturing of the cuff for the interactive object. In this manner, minimal disruption to the manufacturing process for making the jacket itself may occur. In some instances, additional portions of the manufacturing process can be performed after attaching the pre-fabricated capacitive sensor assembly.

As another example, the pre-fabricated sensor assembly may be attached to the inner portion of a garment or other object without leaving an opening for inserting the assembly. For example, the pre-fabricated sensor assembly can be affixed to the inside surface of a textile using a heat press application, sewing application, or other mechanism to attach the pre-fabricated sensor assembly to the partially formed object.

In accordance with some embodiments, a pre-fabricated sensor assembly may include one or more capacitive touch sensors and one or more electronics modules that include sensing circuitry electrically coupled to the capacitive touch sensor. The one or more capacitive touch sensors can each include a plurality of flexible and conductive sensing lines. The sensing lines can be formed of various flexible materials and in various formations to provide a capacitive touch sensor that is capable of flexible integration within various types of interactive objects.

Traditionally, the use of flexible sensing lines as a post fabrication application has been problematic because of the ability of the sensing lines to move relative to one another. Movement of sensing lines relative to one another may affect the ability of sensing circuitry and other components to properly detect an input. In some cases, such movement may even result in shorting of the sensing lines to one another.

By applying one or more flexible retaining layers in accordance with example embodiments, a flexible sensor assembly can be provided in a post fabrication application while maintaining a pre-defined arrangement of the sensor elements. The flexible sensing lines can be positioned in a pre-defined arrangement, including a size and spacing relative to one another and/or other components of the pre-fabricated assembly prior to incorporation within an object. One or more retaining layers can be utilized to secure the plurality of sensing lines in the predetermined arrangement. The retaining layer(s) can provide structural stability to maintain the plurality of sensing lines in the desired arrangement. Because of their flexibility, the one or more retaining layers can also permit the assembly to flex as the interactive object moves and flexes. In some examples, the flexible retaining layer(s) can provide physical separation of the flexible sensing lines from the object substrate.

In accordance with some embodiments, a plurality of sensing elements can be formed from a multilayered flexible film to facilitate a flexible sensing line for application to existing objects. For example, the multilayered film may include one or more flexible base layers such as a flexible textile, plastic, or other flexible material. One or more metal layers may extend over the flexible base layer(s). Optionally, one or more passivation layers can extend over the one or more flexible base layers and the one or more metal layer(s) to promote adhesion between the metal layer(s) and the base layer(s). In accordance with some examples, a multilayered sheet including one or more flexible base layers, one or more metal layers, and optionally one or more passivation layers can be formed and then cut, etched, or otherwise divided into individual sensing lines. Each sensing line can include a line of the one or more metal layers formed over a line of the one or more flexible base layers. Optionally, a sensing line can include a line of one or more passivation layers overlying the one or more flexible base layers.

According to some embodiments, one or more adhesive layers may be applied to the plurality of sensing lines to help maintain the sensing lines in a pre-defined arrangement and/or to couple the sensing lines to other layers. The one or more adhesive layers may be applied to a first surface of each sensing line or a portion of each sensing line in some examples. The adhesive layer may be a common adhesive layer that extends across a surface of each of the sensing lines.

In some examples, one or more shield layers can be applied over at least a portion of one or more of the sensing lines to selectively define a touch-sensitive area for the capacitive touch sensor. By way of example, the plurality of sensing lines for a capacitive touch sensor may extend in a first direction and a second direction that is different than the first direction. For instance, the plurality of sensing lines may extend in a longitudinal direction and a lateral direction that is substantially orthogonal to the longitudinal direction. The longitudinal portion of each conductive sensing line can be covered with one or more shield layers to selectively define a touch-sensitive area for the capacitive touch sensor at the portion of the sensing lines that extends in the lateral direction. Alternatively, the lateral portion of each conductive sensing line can be covered with the one or more shield layers to selectively define a touch-sensitive area at the portion of the sensing line that extends in the longitudinal direction. The one or more adhesive layers can be applied over a upper surface of the one or more sensing lines and the one or more shield layers can be applied over an upper surface of the one or more adhesive layers. Other examples of selective formation of a touch-sensitive area utilizing one or more shield layers can be used. In some examples, a single layer may provide electrical shielding as well as adhesive properties.

In accordance with some embodiments, a plurality of sensing lines may each include a first portion that extends in a first direction with a spacing therebetween in a second direction. The second direction can be substantially orthogonal to the first direction. The plurality of sensing lines can also extend in the second direction with a spacing therebetween in the first direction. The first portion of each sensing line can connect to sensing circuitry while the second portion of each sensing line can be used to form a touch-sensitive area for the capacitive touch sensor. The spacing in the first direction can be less than the spacing in the second direction to enable a compact arrangement for attaching the conductive lines to the sensing circuitry. At the same time, the larger spacing in the second direction can facilitate a more robust detection of touch inputs in some examples. By spacing the sensing lines appropriately, a more efficient, accurate, and/or precise detection of touch inputs may be achieved.

In accordance with some examples, a plurality of conductive threads can form the plurality of sensing lines for a capacitive touch sensor of a pre-fabricated sensor assembly. At least a portion of each conductive thread can be connected to a flexible substrate, such as by weaving, embroidering, gluing, or otherwise attaching the conductive threads to the flexible substrate. In some examples, the conductive threads can be woven with a plurality of non-conductive threads to form the flexible substrate.

In some examples, each conductive thread may include a first loose end that is not directly attached to the flexible substrate. Each conductive thread can include a second loose end that is opposite to the first loose end of the conductive thread and that is also not directly attached to the flexible substrate. In between the loose ends, each conductive thread may include an attached portion that extends along and in attachment with the flexible substrate. The first loose end of each conductive thread can be attached to the internal electronics module of the pre-fabricated sensor assembly. The second loose end of each conductive thread can be movable relative to the flexible substrate. In some examples, the second loose end of each conductive thread can extend beyond an outer perimeter of the flexible substrate. In some instances, the extent of each conductive line that extends beyond the outer perimeter of the flexible substrate may be utilized as the touch-sensitive area for a capacitive touch sensor.

In some implementations, each conductive thread can include a longitudinal portion that is attached to the flexible substrate and a lateral portion that is loose from the flexible substrate and that optionally extends beyond the outer perimeter of the flexible substrate. The lateral portion of each conductive thread may extend in a substantially orthogonal direction to the longitudinal portion. The lateral portion of each conductive thread may form the touch-sensitive area of the capacitive touch sensor. The touch-sensitive area formed by the lateral portion of the sensing lines can be configured to receive touch inputs such as swipe gestures provided in the longitudinal direction. Other gestures may be detected, such as colds, swipes, etc.

In accordance with some example embodiments, a conductive thread can include a first portion that is attached to the flexible substrate of the pre-fabricated sensor assembly and a second portion that is attached to a different substrate. By way of example, a pre-fabricated sensor assembly may be affixed to a textile substrate to form an interactive garment. The first portion of each conductive thread can be attached to a flexible substrate such as a first textile fabric within the pre-fabricated sensor assembly. The second portion of each conductive thread can be attached to the core substrate of the interactive garment such as the textile substrate from which the interactive garment itself is formed. Various techniques may be utilized to attach the second portion of each conductive thread to the interactive garment substrate. For instance, the second portion of each conductive thread can be attached to the interactive garment using an embroidery technique which may be particularly suitable to application of the conductive thread to an object that has already been fabricated. Other techniques such as gluing, taping, bonding and the like may be used.

In some implementations, one or more shield layers can be utilized to form a first capacitive touch sensor and a second capacitive touch sensor from a plurality of flexible sensing lines. A first capacitive touch sensor can include a first subset of the plurality of flexible sensing lines and a second capacitive touch sensor can include a second subset of the plurality of flexible sensing lines. Each flexible sensing line of the first subset can include a first portion that is elongated in a first direction and a second portion that is elongated and a second direction. Each flexible sensing line of the second subset can include a first portion that is elongated in the first direction and can also include a second portion. One or more shield layers can be formed over the first portion of each flexible sensing light of the first subset. One or more sensing circuits can be physically coupled to the first subset and the second subset of the plurality of flexible sensing lines. In this manner, the second portion of each flexible sensing line of the first subset can form a touch-sensitive area for the first capacitive touch sensor. Additionally, the second portion of each flexible sensing line of the second subset can form a touch-sensitive area for the second capacitive touch sensor. In some examples, the one or more shield layers can overlie the first portion of the flexible sensing line of the second subset of the plurality of flexible something lines. The second portion of each flexible sensing line of the second subset can be elongated and the second direction or the first direction.

Although much of the disclosure is described with respect to capacitive touch sensors, it will be appreciated that any type of sensor may be included in a pre-fabricated sensory assembly as described. For example, resistive touch sensors can be formed in a similar manner to capacitive touch sensors as described. Other types of sensors such as inertial measurement units, strain gauges, ultrasonic sensors, radar-based touch interfaces, image-based sensors, infrared sensors, etc. can be used.

The pre-fabricated sensor assembly can include one or more flexible retaining layers that define a housing for the plurality of sensing lines that form the capacitive touch sensor. The housing can additionally hold other components of the pre-fabricated sensor assembly, such as the internal electronics module. By including the plurality of sensing lines within a housing created by the one or more flexible retaining layers, the plurality of sensing lines for the capacitive touch sensor can be provided in a pre-defined sensor layout. Moreover, by utilizing flexible layers, the capacitive touch sensor can remain flexible to enable subsequent integration within a variety of interactive objects. Furthermore, the pre-fabricated sensor assembly may be integrated within flexible objects such as an interactive garment in a manner that enables the capacitive touch sensor to remain flexible with the interactive garment. In some examples, the flexible retaining layers can form a water-tight housing. In some examples, the flexible retaining layers can form a hermetically-sealed housing.

According to some example implementations, the interactive object can include an internal electronics module that is integrated within an interactive object. The plurality of sensing elements can be directly attached to the internal electronics module or can be attached to the internal electronics module via one or more connector components. The internal electronics module can provide power and/or control signals to the plurality of sensing lines. The internal electronics module may not include an on-board power source in some embodiments. Instead, a removable electronics module removably coupled via a receptacle of the pre-fabricated sensor assembly can supply power to the internal electronics module.

In some examples, the internal electronics module can include sensing circuitry for the plurality of sensing lines. The internal electronics module can include a first subset of electronic components, such as one or more drivers configured to provide control signals and/or power to the plurality of sensing lines. The internal electronics module in some examples includes a controller that is configured to generate control signals for the for the plurality of sensing lines and to detect changes in capacitance based on objects approaching or coming in contact with the plurality of sensing lines. In some examples, the internal electronics module includes a flexible printed circuit board (PCB). The printed circuit board can include a set of contact pads and/or one or more ports for attaching to one or more communication cables. In some examples, the printed circuit board includes a microprocessor. A portion of the PCB (e.g., including the microprocessor) can be overmolded with a polymer composition.

In some embodiments, a removable electronics module that includes a second subset of electronic components (e.g., a microprocessor, power source, or network interface) can be removably coupled to the interactive object via a communication interface. The communication interface enables communication between the internal electronics module and the removable electronics module when the removable electronics module is coupled to the interactive object. In example embodiments, the removable electronics module can be removably mounted to a rigid member on the interactive object such as a receptacle. A receptacle can include a connecting device for physically and electrically coupling to the removable electronics module. The internal electronics module can be in communication with the receptacle. The internal electronics module can be configured to communicate with the removable electronics module when connected to the receptacle. A controller of the removable electronics module can receive information and send commands to the internal electronics module. A communication interface is configured to enable communication between the internal electronics module and the controller when the receptacle is coupled to the removable electronics module.

For example, the communication interface may include a network interface integral with the removable electronics module. The removable electronics module can also include a rechargeable power source. The removable electronics module can be removable from the interactive object for charging the power source. Once the power source is charged, the removable electronics module can then be placed back into the interactive object and electrically coupled to the connector.

According to some embodiments, a touch sensor formed from one or more sets of sensing elements such as conductive threads or lines formed from one or more conductive films can be coupled to the internal electronics module that is integrated into the interactive object. The set(s) of sensing elements can be directly attached to the internal electronics module or can be attached to the internal electronics module via one or more connector components.

The internal electronics module can include electronic components, such as sensing circuitry configured to detect touch-input to the conductive lines. The sensing circuitry in some examples includes a controller that is configured to detect a touch-input when user pressure is applied to the conductive threads, for example. The controller can also detect a touch input when an object comes in contact with or approaches a sensing line. The controller can be configured to communicate the touch-input data to a computing device. In some examples, the controller includes a flexible printed circuit board (PCB). The printed circuit board can include a set of electrical contacts such as contact pads for attaching to the sensing lines.

Touch inputs provided via a resistive or capacitive touch sensor as described may include various applications and capabilities. By way of example, a touch sensor may be used as a button to detect a simple touch input at a location of the touch sensor. In some examples, a one-dimensional array of sensing lines may be used to implement a touch sensor that can detect a button-type input. A one-dimensional array of sensing lines may also be used to detect a one-dimensional swipe input (e.g., movement in a single direction corresponding to the spacing between threads). In some examples, a two-dimensional array of sensing lines may be used to implement a touch sensor that can detect trackpad inputs, including a specific location of a touch within a grid of conductive threads. Additionally, a two-dimensional array of sensing lines may be used to detect various gesture inputs, authentication inputs, pre-defined keystrokes, movements, user-specific natural behaviors and the like. One or more machine-learned models may be used to detect user inputs based on training the machine-learned models using training data. Additionally, the touch sensor may be configured to detect analog and pseudo-force inputs from a capacitive change caused by a finger distance.

According to some aspects, the pre-fabricated sensor assembly can be responsive to inputs received via an external computing device (e.g., smartphone, tablet, laptop, etc.). The external computing device can be communicatively coupled to the interactive object using one or more wireless and/or wired interfaces. A gesture manager can be implemented on the computing device to store mappings between gestures and functionalities of the computing device. A functionality mapped to a gesture can be initiated in response to detecting the gesture at the capacitive touch sensor. The interactive object can be responsive to gestures detected by the internal electronics module, removable electronics module, remote computing device, or any combination of the above.

Embodiments of the disclosed technology provide a number of technical effects and benefits, particularly in the areas of computing technology, capacitive touch sensors, and the integration of capacitive touch sensors including related electronics with interactive objects such as garments. Additionally, one or more aspects of the disclosed technology may address issues that may arise when seeking to provide a practical system and method for incorporating input devices such as capacitive touch sensors into existing objects such as garments and the like. In accordance with example embodiments of the disclosed technology, a pre-fabricated sensor assembly can uniquely provide a flexible architecture that can be utilized subsequent to processing at least a portion of the base substrate of an object. In this manner, sensing lines are not necessarily incorporated directly within the object substrate, but instead can be flexibly applied to the object substrate after at least some processing of the substrate. The unique combination of a set of flexible sensing lines that are housed within one or more flexible retaining layers enables a capacitive touch sensor to be tightly integrated within an object, without requiring the sensing lines of the capacitive touch sensor to be integrated with the substrate of the object. Moreover, the flexible retaining layer(s) enable a post-processing attachment of the capacitive touch sensor to thereby create interactive objects from existing structures. Further, the flexible retaining layers can maintain the plurality of sensing lines in a pre-defined arrangement or sensor layout. This can enable flexible sensing lines to be used while also maintaining the sensing lines in a known and defined arrangement to provide adequate sensing capabilities.

In some examples, a set of conductive lines may include a multilayered film including a flexible base layer, one or more metal layers, and optionally one or more passivation layers. For example, an electromagnetic field shielding fabric can be used. These fabrics may be referred to as EMI fabrics. The metal layer(s) include at least one of a copper layer, a silver layer, or a gold layer. These conductive lines may be formed within a housing defined by one or more flexible retaining layer. In some examples, the plurality of conductive lines may be formed on a common flexible substrate which in some instances may include an adhesive layer. A multilayered structure may enable a flexible metal line to be provided that is suitable for integration within interactive object such as garments, garment accessories, garment containers, and the like.

In some examples, a set of conductive lines may include a set of conductive threads. The set of conductive threads may be attached to a flexible substrate, such as by weaving at least a portion of each of the conductive threads with a plurality of non-conductive threads to form a flexible textile base substrate. The set of conductive threads including the flexible substrate can be provided within a housing created by one or more retaining layers to maintain the set of conductive threads in a pre-defined arrangement. In some examples, the set of conductive threads can be selectively attached to the flexible substrate such that at least a portion of each conductive thread is loose from the flexible substrate. This can enable unique configurations and arrangements of the capacitive touch sensor including selectively defined touch-sensitive areas where touch inputs are to be received.

These unique arrangements, including but not limited to flexible sensing lines and flexible retaining layers, provide a practical device that can be incorporated within existing manufacturing technologies and other processes. Such approaches may overcome issues related to the high cost and disruptive nature of incorporating sensing lines within the substrate of existing structures. For instance, existing textile and other manufacturing processes may be utilized with the application of a pre-fabricated sensor assembly in accordance with example embodiments.

With reference now to the figures, example aspects of the present disclosure will be discussed in greater detail.

FIG. 1 is an illustration of an example environment 100 in which an interactive object with multiple electronics modules can be implemented. Environment 100 includes a touch sensor 102 (e.g., capacitive or resistive touch sensor), or other sensor. Touch sensor 102 is shown as being integrated within various interactive objects 104. Touch sensor 102 may include one or more sensing elements such as conductive threads or other sensing lines that are configured to detect a touch input. In some examples, a capacitive touch sensor can be formed from an interactive textile which is a textile that is configured to sense multi-touch-input. As described herein, a textile corresponds to any type of flexible woven material consisting of a network of natural or artificial fibers, often referred to as thread or yarn. Textiles may be formed by weaving, knitting, crocheting, knotting, pressing threads together or consolidating fibers or filaments together in a nonwoven manner. A capacitive touch sensor can be formed from any suitable conductive material and in other manners, such as by using flexible conductive lines including metal lines, filaments, etc. attached to a nonwoven substrate.

In environment 100, interactive objects 104 include "flexible" objects, such as a shirt 104-1, a hat 104-2, a handbag 104-3 and a shoe 104-6. It is to be noted, however, that touch sensor 102 may be integrated within any type of flexible object made from fabric or a similar flexible material, such as garments or articles of clothing, garment accessories, garment containers, blankets, shower curtains, towels, sheets, bed spreads, or fabric casings of furniture, to name just a few. Examples of garment accessories may include sweat-wicking elastic bands to be worn around the head, wrist, or bicep. Other examples of garment accessories may be found in various wrist, arm, shoulder, knee, leg, and hip braces or compression sleeves. Headwear is another example of a garment accessory, e.g. sun visors, caps, and thermal balaclavas. Examples of garment containers may include waist or hip pouches, backpacks, handbags, satchels, hanging garment bags, and totes. Garment containers may be worn or carried by a user, as in the case of a backpack, or may hold their own weight, as in rolling luggage. Touch sensor 102 may be integrated within flexible objects 104 in a variety of different ways, including weaving, sewing, gluing, and so forth.

In this example, objects 104 further include "hard" objects, such as a plastic cup 104-4 and a hard smart phone casing 104-5. It is to be noted, however, that hard objects 104 may include any type of "hard" or "rigid" object made from non-flexible or semi-flexible materials, such as plastic, metal, aluminum, and so on. For example, hard objects 104 may also include plastic chairs, water bottles, plastic balls, or car parts, to name just a few. In another example, hard objects 104 may also include garment accessories such as chest plates, helmets, goggles, shin guards, and elbow guards. Alternatively, the hard or semi-flexible garment accessory may be embodied by a shoe, cleat, boot, or sandal. Touch sensor 102 may be integrated within hard objects 104 using a variety of different manufacturing processes. In one or more implementations, injection molding is used to integrate touch sensors into hard objects 104.

Touch sensor 102 enables a user to control an object 104 with which the touch sensor 102 is integrated, or to control a variety of other computing devices 106 via a network 110. Computing devices 106 are illustrated with various non-limiting example devices: server 106-1, smart phone 106-2, laptop 106-3, computing spectacles 106-4, television 106-5, camera 106-6, tablet 106-7, desktop 106-8, and smart watch 106-9, though other devices may also be used, such as home automation and control systems, sound or entertainment systems, home appliances, security systems, netbooks, and e-readers. Note that computing device 106 can be wearable (e.g., computing spectacles and smart watches), non-wearable but mobile (e.g., laptops and tablets), or relatively immobile (e.g., desktops and servers). Computing device 106 may be a local computing device, such as a computing device that can be accessed over a bluetooth connection, near-field communication connection, or other local-network connection. Computing device 106 may be a remote computing device, such as a computing device of a cloud computing system.

Network 110 includes one or more of many types of wireless or partly wireless communication networks, such as a local-area-network (LAN), a wireless local-area-network (WLAN), a personal-area-network (PAN), a wide-area-network (WAN), an intranet, the Internet, a peer-to-peer network, point-to-point network, a mesh network, and so forth.

Touch sensor 102 can interact with computing devices 106 by transmitting touch data or other sensor data through network 110. Additionally or alternatively, touch sensor 102 may transmit gesture data, movement data, or other data derived from sensor data generated by the touch sensor 102. Computing device 106 can use the touch data to control computing device 106 or applications at computing device 106. As an example, consider that touch sensor 102 integrated at shirt 104-1 may be configured to control the user's smart phone 106-2 in the user's pocket, television 106-5 in the user's home, smart watch 106-9 on the user's wrist, or various other appliances in the user's house, such as thermostats, lights, music, and so forth. For example, the user may be able to swipe up or down on touch sensor 102 integrated within the user's shirt 104-1 to cause the volume on television 106-5 to go up or down, to cause the temperature controlled by a thermostat in the user's house to increase or decrease, or to turn on and off lights in the user's house. Note that any type of touch, tap, swipe, hold, or stroke gesture may be recognized by touch sensor 102.

Figure 2:
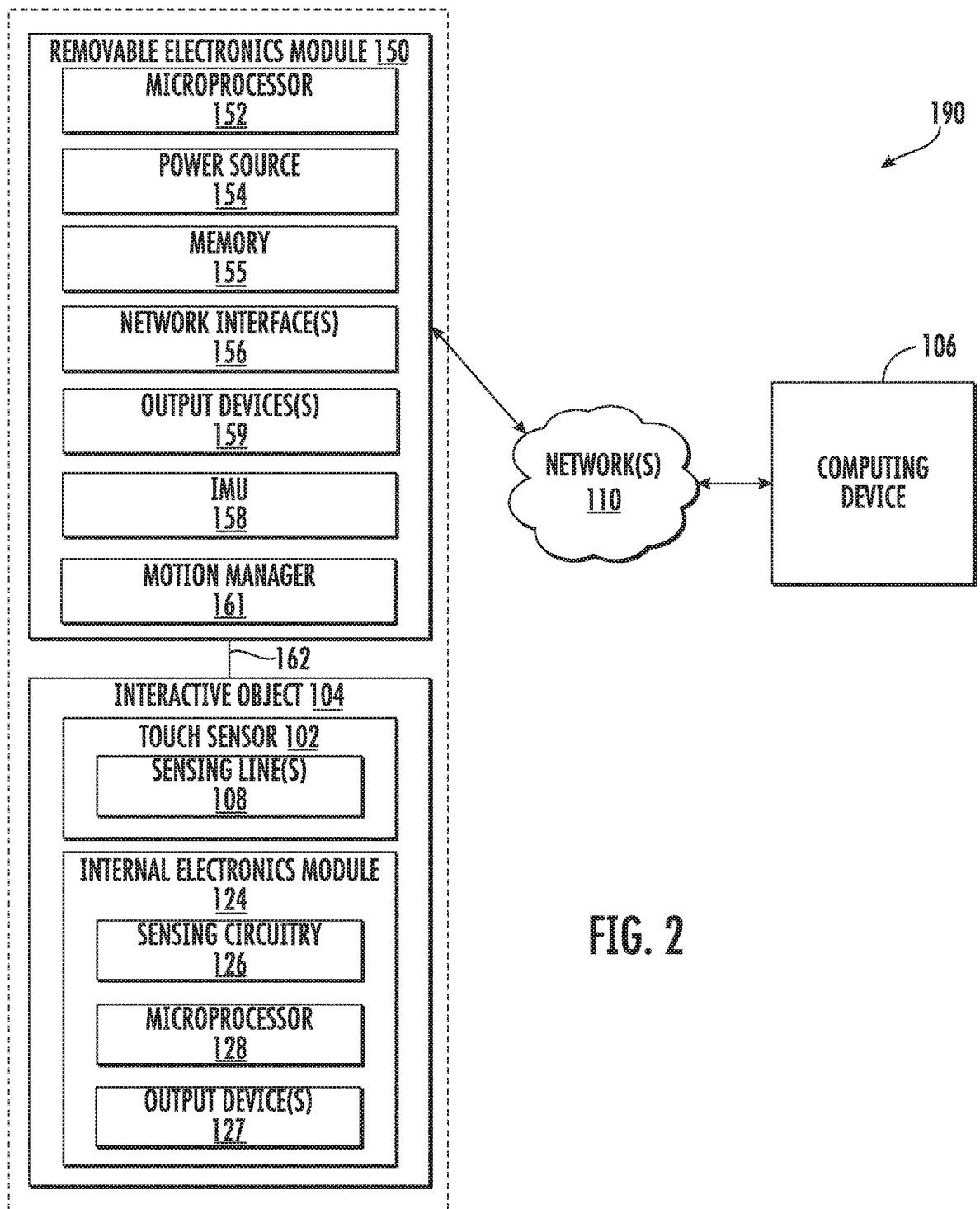
FIG. 2 depicts a block diagram of an example computing environment that includes an interactive object in accordance with example embodiments of the present disclosure.

In more detail, consider FIG. 2 which illustrates an example system 190 that includes an interactive object 104, a removable electronics module 150, and a computing device 106. In system 190, touch sensor 102 is integrated in an object 104, which may be implemented as a flexible object (e.g., shirt 104-1, hat 104-2, or handbag 104-3) or a hard object (e.g., plastic cup 104-4 or smart phone casing 104-5).

Touch sensor 102 is configured to sense touch-input from a user when one or more fingers of the user's hand touch or approach touch sensor 102. Touch sensor 102 may be configured as a capacitive touch sensor or resistive touch sensor to sense single-touch, multi-touch, and/or full-hand touch-input from a user. To enable the detection of touch-input, touch sensor 102 includes sensing elements 108. Sensing elements may include various shapes and geometries. In some examples, sensing elements 108 can be formed as a grid, array, or parallel pattern of sensing lines so as to detect touch input. In some implementations, the sensing elements 108 do not alter the flexibility of touch sensor 102, which enables touch sensor 102 to be easily integrated within interactive objects 104.

Interactive object 104 includes an internal electronics module 124 (also referred to as internal electronics device) that is embedded within interactive object 104 and is directly coupled to sensing elements 108. Internal electronics module 124 can be communicatively coupled to a removable electronics module 150 (also referred to as a removable electronics device) via a communication interface 162. Internal electronics module 124 contains a first subset of electronic circuits or components for the interactive object 104, and removable electronics module 150 contains a second, different, subset of electronic circuits or components for the interactive object 104. As described herein, the internal electronics module 124 may be physically and permanently embedded within interactive object 104, whereas the removable electronics module 150 may be removably coupled to interactive object 104.

In system 190, the electronic components contained within the internal electronics module 124 includes sensing circuitry 126 that is coupled to sensing elements 108 that form the touch sensor 102. In some examples, the internal electronics module includes a flexible printed circuit board (PCB). The printed circuit board can include a set of contact pads for attaching to the conductive lines. In some examples, the printed circuit board includes a microprocessor. For example, wires from conductive threads may be connected to sensing circuitry 126 using flexible PCB, creping, gluing with conductive glue, soldering, and so forth. In one embodiment, the sensing circuitry 126 can be configured to detect a user-inputted touch-input on the conductive threads that is pre-programmed to indicate a certain request. In one embodiment, when the conductive threads form a grid or other pattern, sensing circuitry 126 can be configured to also detect the location of the touch-input on sensing element 108, as well as motion of the touch-input. For example, when an object, such as a user's finger, touches sensing element 108, the position of the touch can be determined by sensing circuitry 126 by detecting a change in capacitance on the grid or array of sensing element 108. The touch-input may then be used to generate touch data usable to control a computing device 106. For example, the touch-input can be used to determine various gestures, such as single-finger touches (e.g., touches, taps, and holds), multi-finger touches (e.g., two-finger touches, two-finger taps, two-finger holds, and pinches), single-finger and multi-finger swipes (e.g., swipe up, swipe down, swipe left, swipe right), and full-hand interactions (e.g., touching the textile with a user's entire hand, covering textile with the user's entire hand, pressing the textile with the user's entire hand, palm touches, and rolling, twisting, or rotating the user's hand while touching the textile).

Internal electronics module 124 can include various types of electronics, such as sensing circuitry 126, sensors (e.g., capacitive touch sensors woven into the garment, microphones, or accelerometers), output devices (e.g., LEDs, speakers, or micro-displays), electrical circuitry, and so forth. Removable electronics module 150 can include various electronics that are configured to connect and/or interface with the electronics of internal electronics module 124. Generally, the electronics contained within removable electronics module 150 are different than those contained within internal electronics module 124, and may include electronics such as microprocessor 152, power source 154 (e.g., a battery), memory 155, network interface 156 (e.g., Bluetooth, WiFi, USB), sensors (e.g., accelerometers, heart rate monitors, pedometers, IMUs), output devices (e.g., speakers, LEDs), and so forth.

In some examples, removable electronics module 150 is implemented as a strap or tag that contains the various electronics. The strap or tag, for example, can be formed from a material such as rubber, nylon, plastic, metal, or any other type of fabric. Notably, however, removable electronics module 150 may take any type of form. For example, rather than being a strap, removable electronics module 150 could resemble a circular or square piece of material (e.g., rubber or nylon).

The inertial measurement unit(s) (IMU(s)) 158 can generate sensor data indicative of a position, velocity, and/or an acceleration of the interactive object. The IMU(s) 158 may generate one or more outputs describing one or more three-dimensional motions of the interactive object 104. The IMU(s) may be secured to the internal electronics module 124, for example, with zero degrees of freedom, either removably or irremovably, such that the inertial measurement unit translates and is reoriented as the interactive object 104 is translated and are reoriented. In some embodiments, the inertial measurement unit(s) 158 may include a gyroscope or an accelerometer (e.g., a combination of a gyroscope and an accelerometer), such as a three axis gyroscope or accelerometer configured to sense rotation and acceleration along and about three, generally orthogonal axes. In some embodiments, the inertial measurement unit(s) may include a sensor configured to detect changes in velocity or changes in rotational velocity of the interactive object and an integrator configured to integrate signals from the sensor such that a net movement may be calculated, for instance by a processor of the inertial measurement unit, based on an integrated movement about or along each of a plurality of axes.

Communication interface 162 enables the transfer of power and data (e.g., the touch-input detected by sensing circuitry 126) between the internal electronics module 124 and the removable electronics module 260. In some implementations, communication interface 162 may be implemented as a connector that includes a connector plug and a connector receptacle. The connector plug may be implemented at the removable electronics module 150 and is configured to connect to the connector receptacle, which may be implemented at the interactive object 104. One or more communication interface(s) may be included in some examples. For instance, a first communication interface may physically couple the removable electronics module 150 to one or more computing devices 106, and a second communication interface may physically couple the removable electronics module 150 to interactive object 104.

In system 190, the removable electronics module 150 includes a microprocessor 152, power source 154, and network interface 156. Power source 154 may be coupled, via communication interface 162, to sensing circuitry 126 to provide power to sensing circuitry 126 to enable the detection of touch-input, and may be implemented as a small battery. When touch-input is detected by sensing circuitry 126 of the internal electronics module 124, data representative of the touch-input may be communicated, via communication interface 162, to microprocessor 152 of the removable electronics module 150. Microprocessor 152 may then analyze the touch-input data to generate one or more control signals, which may then be communicated to a computing device 106 (e.g., a smart phone, server, cloud computing infrastructure, etc.) via the network interface 156 to cause the computing device to initiate a particular functionality. Generally, network interfaces 156 are configured to communicate data, such as touch data, over wired, wireless, or optical networks to computing devices. By way of example and not limitation, network interfaces 156 may communicate data over a local-area-network (LAN), a wireless local-area-network (WLAN), a personal-area-network (PAN) (e.g., Bluetooth™), a wide-area-network (WAN), an intranet, the Internet, a peer-to-peer network, point-to-point network, a mesh network, and the like (e.g., through network 110 of FIG. 1 and FIG. 2).

Object 104 may also include one or more output devices 127 configured to provide a haptic response, a tactical response, an audio response, a visual response, or some combination thereof. Similarly, removable electronics module 150 may include one or more output devices 159 configured to provide a haptic response, tactical response, and audio response, a visual response, or some combination thereof. Output devices may include visual output devices, such as one or more light-emitting diodes (LEDs), audio output devices such as one or more speakers, one or more tactile output devices, and/or one or more haptic output devices. In some examples, the one or more output devices are formed as part of removable electronics module, although this is not required. In one example, an output device can include one or more LEDs configured to provide different types of output signals. For example, the one or more LEDs can be configured to generate a circular pattern of light, such as by controlling the order and/or timing of individual LED activations. Other lights and techniques may be used to generate visual patterns including circular patterns. In some examples, one or more LEDs may produce different colored light to provide different types of visual indications. Output devices may include a haptic or tactile output device that provides different types of output signals in the form of different vibrations and/or vibration patterns. In yet another example, output devices may include a haptic output device such as may tighten or loosen an interactive garment with respect to a user. For example, a clamp, clasp, cuff, pleat, pleat actuator, band (e.g., contraction band), or other device may be used to adjust the fit of a garment on a user (e.g., tighten and/or loosen). In some examples, an interactive textile may be configured to tighten a garment such as by actuating conductive threads within the touch sensor 102.

A motion manager 161 is capable of interacting with applications at computing devices 106 and touch sensor 102 effective to aid, in some cases, control of applications through touch-input received by touch sensor 102. For example, motion manager 161 can interact with applications. In FIG. 2, motion manager 161 is illustrated as implemented at removable electronics module 150. It will be appreciated, however, that motion manager 161 may be implemented at internal electronics module 124, a computing device 106 remote from the interactive object, or some combination thereof. A motion manager may be implemented as a standalone application in some embodiments. In other embodiments, a motion manager may be incorporated with one or more applications at a computing device.

A gesture or other predetermined motion can be determined based on touch data detected by the touch sensor 102 and/or an inertial measurement unit 158 or other sensor. For example, motion manager 161 can determine a gesture based on touch data, such as single-finger touch gesture, a double-tap gesture, a two-finger touch gesture, a swipe gesture, and so forth. As another example, motion manager 161 can determine a gesture based on movement data such as a velocity, acceleration, etc. as can be determined by inertial measurement unit 158.

A functionality associated with a gesture can be determined by motion manager 161 and/or an application at a computing device. In some examples, it is determined whether the touch data corresponds to a request to perform a particular functionality. For example, the motion manager determines whether touch data corresponds to a user input or gesture that is mapped to a particular functionality, such as initiating a vehicle service, triggering a text message or other notification associated with a vehicle service, answering a phone call, creating a journal entry, and so forth. As described throughout, any type of user input or gesture may be used to trigger the functionality, such as swiping, tapping, or holding touch sensor 102. In one or more implementations, a motion manager enables application developers or users to configure the types of user input or gestures that can be used to trigger various different types of functionalities. For example, a motion manager can cause a particular functionality to be performed, such as by sending a text message or other communication, answering a phone call, creating a journal entry, increase the volume on a television, turn on lights in the user's house, open the automatic garage door of the user's house, and so forth.

While internal electronics module 124 and removable electronics module 150 are illustrated and described as including specific electronic components, it is to be appreciated that these modules may be configured in a variety of different ways. For example, in some cases, electronic components described as being contained within internal electronics module 124 may be at least partially implemented at the removable electronics module 150, and vice versa. Furthermore, internal electronics module 124 and removable electronics module 150 may include electronic components other that those illustrated in FIG. 2, such as sensors, light sources (e.g., LED's), displays, speakers, and so forth.

Figure 3:
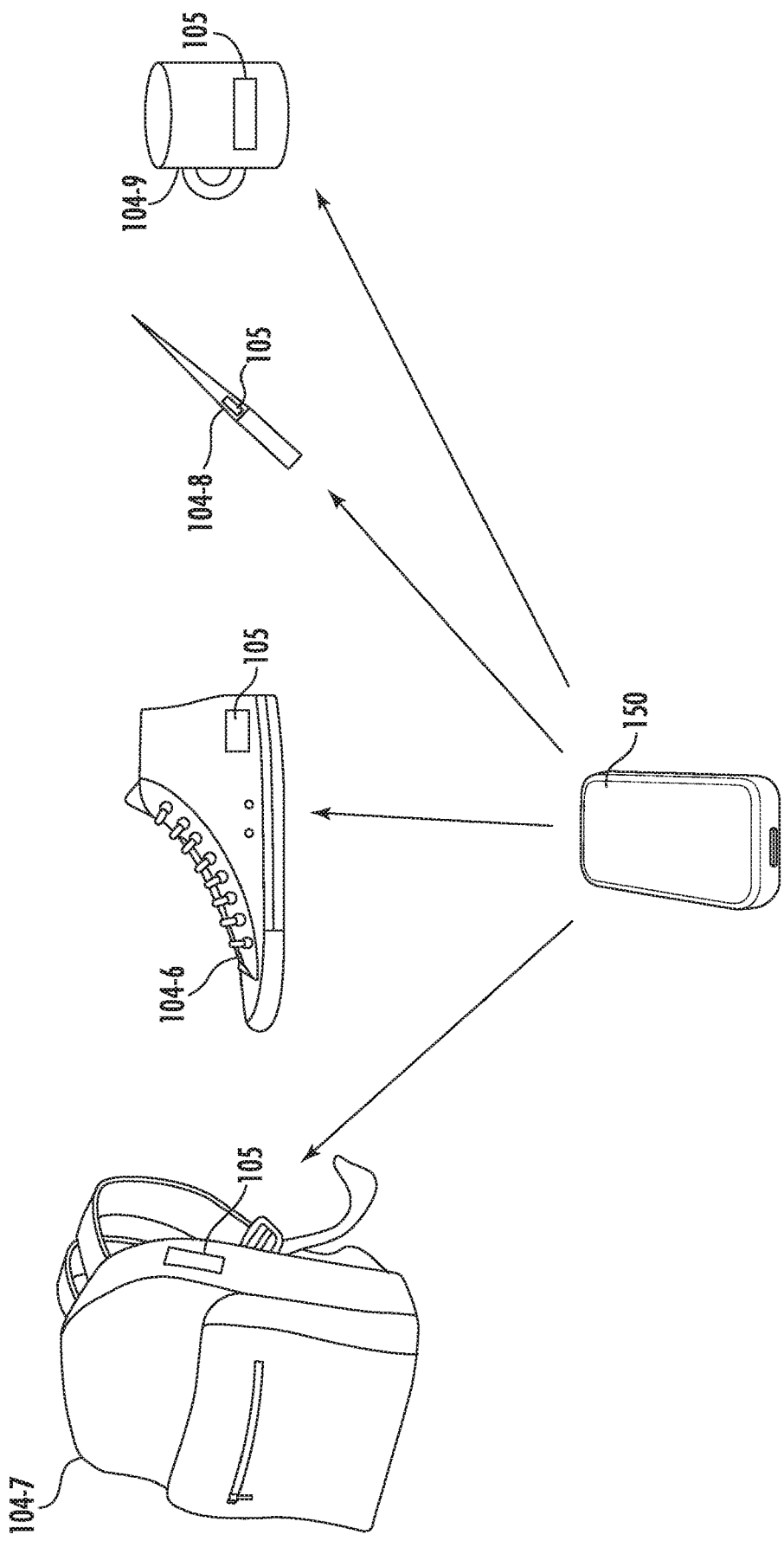
FIG. 3 depicts an example computing environment including a removable electronics device that may be removably coupled to multiple interactive objects in accordance with example embodiments of the present disclosure.

FIG. 3 depicts an example of a computing environment including a plurality of interactive objects in which a removable electronics module 150 may be removably inserted and removed. In FIG. 3, removable electronics module 150 may be removably inserted into an interactive backpack 104-7, an interactive shoe 104-6, an interactive wand 104-8, and an interactive cup 104-9 or mug. It will be appreciated that the depicted interactive objects are provided by way of example only. Removable electronics module 150 may be removably inserted into any number and type of interactive objects. Interactive backpack 104-7 and interactive shoe 104-6 are examples of soft interactive objects in which a removable electronics module 150 may be removably inserted. Wand 104-8 and mug 104-9 are examples of hard interactive objects in which a removable electronics module 150 may be removably inserted. Each interactive object includes a receiving feature 105 such as a receptacle configured to removably receive the removable electronics module 150.

The receiving feature 105 at each interactive object may include a different form factor that is adapted to the particular interactive object. In some examples, a receiving feature 105 may include a receptacle having a slot based form factor in which the removable electronics module 150 may be physically coupled to the receptacle by insertion in a single slot direction. In other examples, a receiving feature 105 may include a receptacle having a box based form factor in which the removable electronics module 150 may be physically coupled to the receptacle by insertion in both a longitudinal and vertical direction. Other types of form factors may be used.

In some examples, the receiving feature 105 at an interactive object may include electrical contacts for establishing an electrical connection with the removable electronics module. For example, an interactive object 104 may include one or more touch sensors and/or internal electronics modules coupled to the electrical contacts. Interactive backpack 104-7, for instance, may include a receptacle receiving feature 105 that includes a form factor that is configured to physically couple to removable electronics module 150 when inserted. Additionally, the receptacle receiving feature can include one or more contacts configured to provide an electrical connection between the removable electronics module 150 and one or more electronic components of the interactive object. For example, receiving feature 105 may include a set of contact pads configured to contact a set of contact pads of removable electronics module 150. In some examples, each receiving feature may include one or more retaining elements configured to couple with one or more retaining elements of the removable electronics module 150.

In some examples, the receiving feature 105 at an interactive object may include one or more retaining elements without including electrical contacts for establishing an electrical connection. For instance, some interactive objects may not include a touch sensor or internal electronics module to which the removable electronics module is to be electrically connected when inserted. For example, an interactive shoe 104-6 may include a receiving feature 105 that is configured to securely house removable electronics module 150 when inserted into the shoe, but that does not include electrical contacts. Removable electronics module 150 can be used to generate motion data such as from an inertial measurement unit of removable electronics module 150. Additionally or alternatively, removable electronics module 150 may be configured to provide one or more outputs such as audible outputs, visual outputs, and/or haptic output in response to inputs from a remote computing device for example. In such instances, the receiving feature 105 may not necessarily include electrical contacts.

Figure 4:
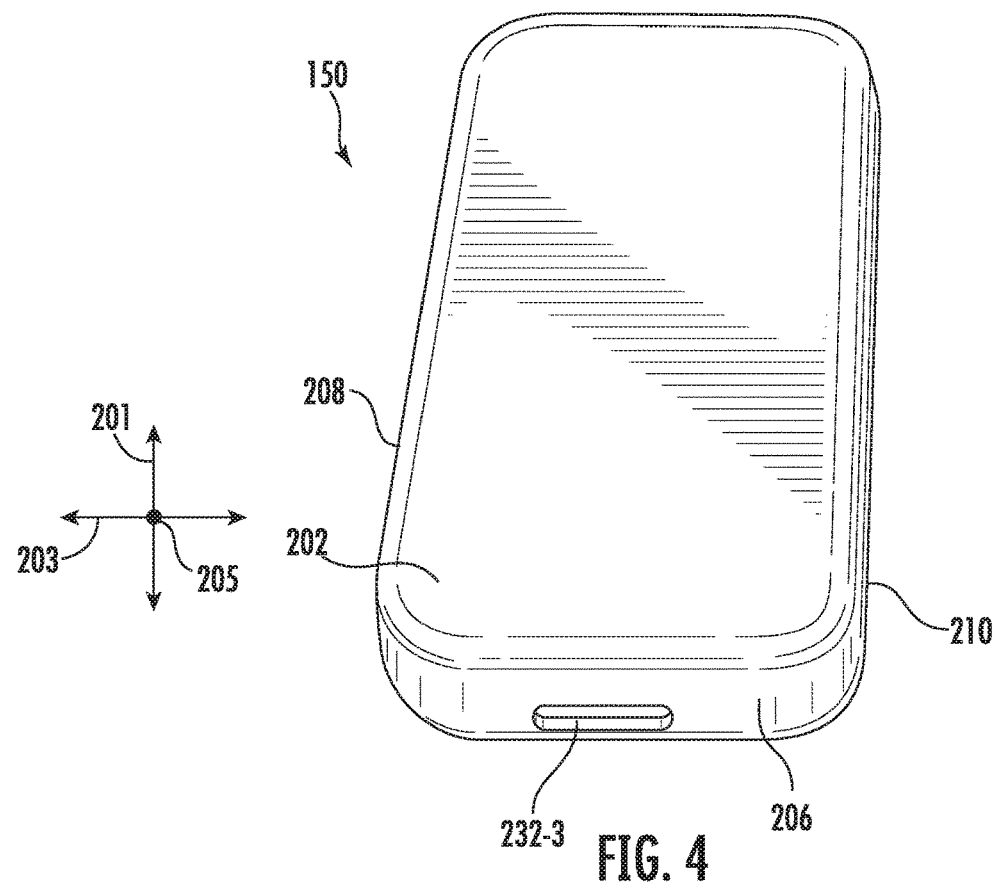
FIGS. 4-8 are various perspective views depicting an example removable electronics device in accordance with example embodiments of the present disclosure
Figure 5:
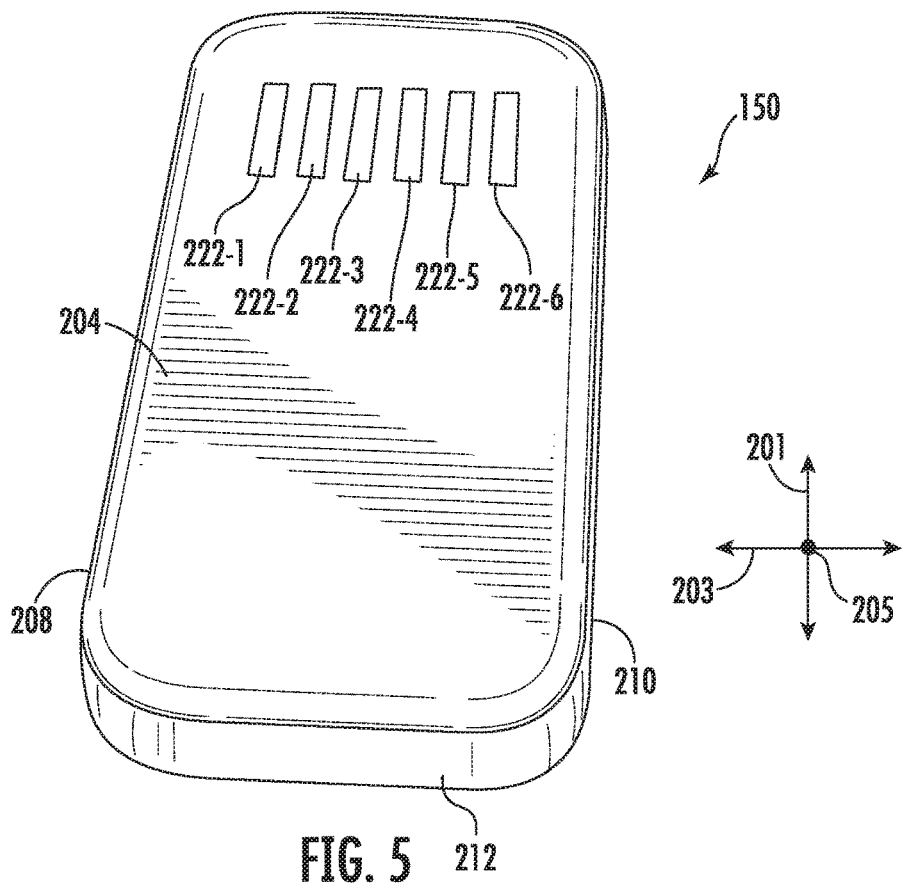
Figure 6:
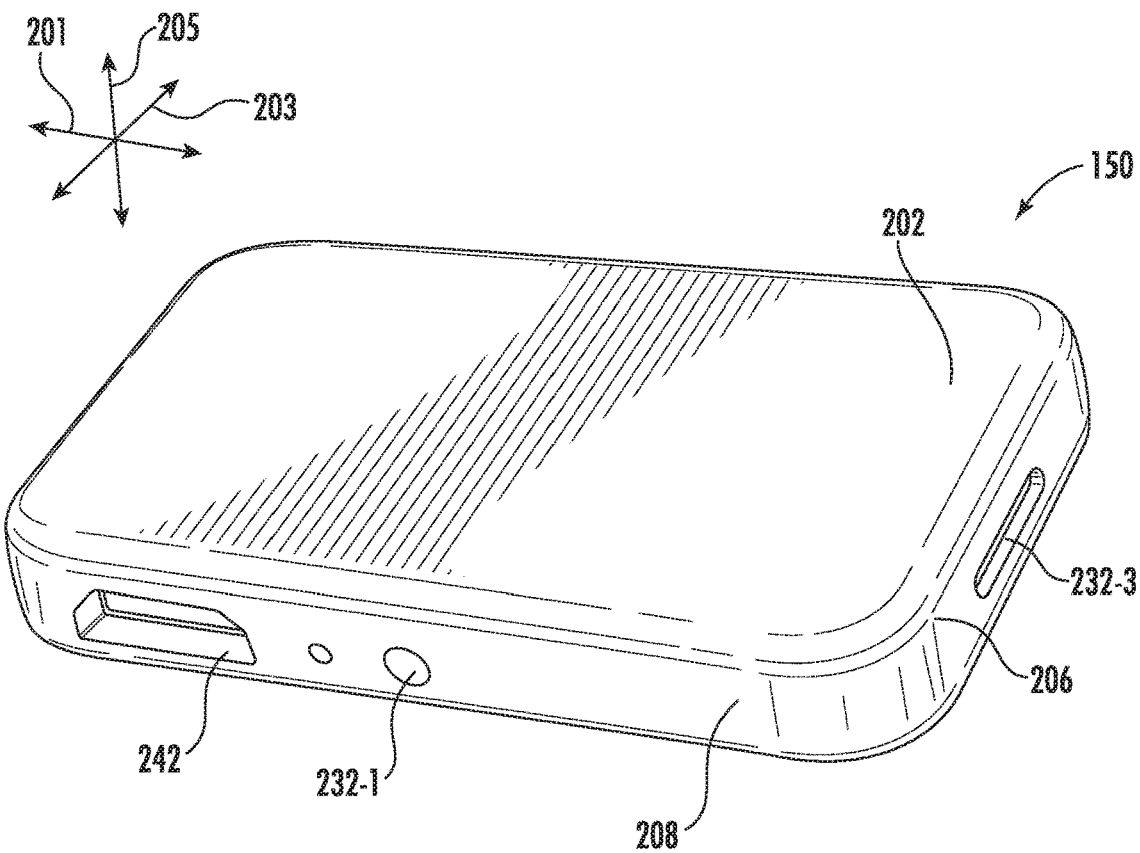
Figure 7:
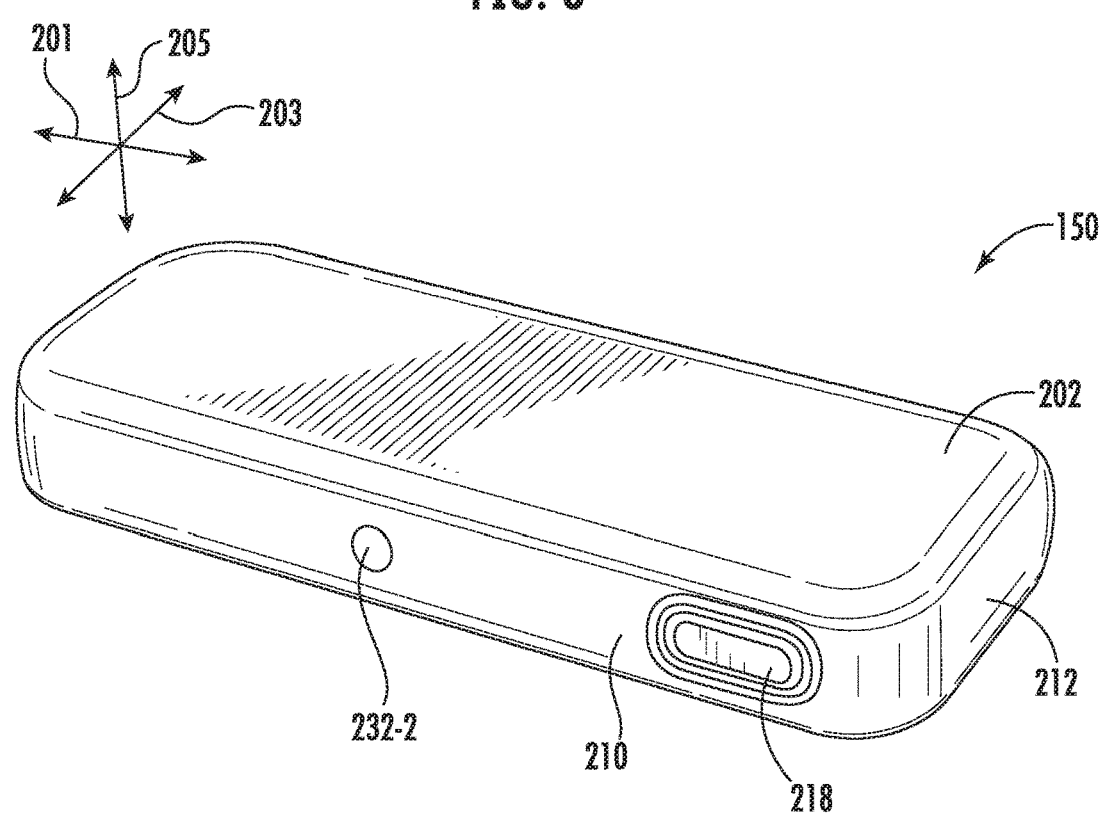

FIGS. 4-7 depict an example of a removable electronics module 150 in accordance with example embodiments of the present disclosure. FIG. 4 is a top perspective view of the removable electronics module, FIG. 5 is a bottom perspective view of the removable electronics module, FIG. 6 is a first side perspective view of the removable electronics module, and FIG. 7 is a second side perspective view of the removable electronics module. Removable electronics module 150 can define a longitudinal axis 201, a lateral axis 203, and a transverse or vertical axis 205. Removable electronics module 150 includes a housing that defines an upper surface 202, a lower surface 204, a first lateral surface 206, a first longitudinal surface 208, a second longitudinal surface 210, and a second lateral surface 212. An input device 218 such as a button is provided to receive user input in some examples. The housing may include one or more members that define the surfaces of the housing. By way of example, the housing can be a composite of different components or can be a non-composite structure. The housing can include rounded edges in some examples to provide a device having an enhanced ergonomic capability for use by a user as well as to promote ease of insertion and removal from receptacles.

Removable electronics module 150 can include a first communication interface comprising a connector 242 that is configured to physically and communicatively couple the removable electronics device to a remote computing device. The first communication interface is an example of a wired communication interface 162. The first communication interface can be formed adjacent to an opening in the first longitudinal surface 208 in example embodiments. In example embodiments, a removable cable such as a USB cable can be inserted into connector 242 and attached to the remote computing device to establish a physical and communicative connection between the removable electronics module and the remote computing device. Connector 242 can both physically couple the removable electronics module to the remote computing device (e.g., via a connecting cable) as well as communicatively couple the removable electronics module to the remote computing device. In example embodiments, removable electronics module 150 can include a power source (e.g., power source 154) such as a battery that can be charged via connector 242 of the first communication interface. Removable electronics module 150 can establish both a communicative and a power coupling to a remote computing device via connector 242. In some examples, connector 242 may be implemented at the USB type interface, a micro USB type interface, or other type of interface.

Removable electronics module 150 can include a second communication interface that is configured to communicatively couple and/or physically couple removable electronics device to various preconfigured sensor assembly of interactive objects. The second communication interface is an example of a wired network interface 156 in some examples. In example embodiments, the second communication interface can include one or more contact pads 222. As illustrated in FIG. 5, the lower surface 204 of removable electronics module 150 can include a plurality of openings that expose a plurality of contact pads 222. In the example of FIG. 5, removable electronics module 150 includes 6 electrical contact pads 222-1, 222-2, 222-3, 222-4, 222-5, 222-6, however, any number of electrical contact pads may be used. In some examples, an upper surface of each of the electrical contact pads can be recessed relative to the lower surface 204 of the removable electronics module 150. For instance, lower surface 204 can include a plurality of openings such that electrical contact pads 222 can be formed on an underside of the lower surface 204 where they are accessible via the openings of the lower surface 204. An upper surface of each of the plurality of contact pads can define a plane that is lower in a vertical direction from a plane defined by the bottom surface of the removable electronic device.

Removable electronics module 150 can include a plurality of retaining elements 232. The plurality of retaining elements can be configured to removably couple the removable electronics device to a receptacle of a preconfigured sensor assembly of an interactive object. In some examples, the plurality of retaining elements can be configured to removably couple the removable electronics module 150 to different types of receptacles of different preconfigured sensor assemblies. For example, the plurality of retaining elements can be configured to removably couple the removable electronics module 150 to receptacles having a slot-based formed factor, receptacles having a tub or box-based form factor, or receptacles having other form factors.

Removable electronics module 150 includes a first retaining element 232-1 disposed along the first longitudinal surface 208, a second retaining element 232-2 disposed along the second longitudinal surface 210, and a third retaining element 232-3 disposed along the first lateral surface 206. The first retaining element 232-1, the second retaining element 232-2, and the third retaining element 232-3 can be indent retaining elements in example embodiments. For instance, each retaining element can be recessed relative to the respective surface in which it is formed. In this manner, each retaining element can be configured to receive a corresponding retaining element such as a detent retaining element provided on a corresponding surface of a receptacle or other receiving feature. First retaining element 232-1 and second retaining element 232-2 can have a circular cross-sectional shape in example embodiments, and third retaining element 232-3 can have an ovular or rectangular cross-sectional shape in example embodiments. It is noted that more or fewer than three retaining elements may be used in example embodiments, and that retaining elements of different shapes can be used.

Figure 8:
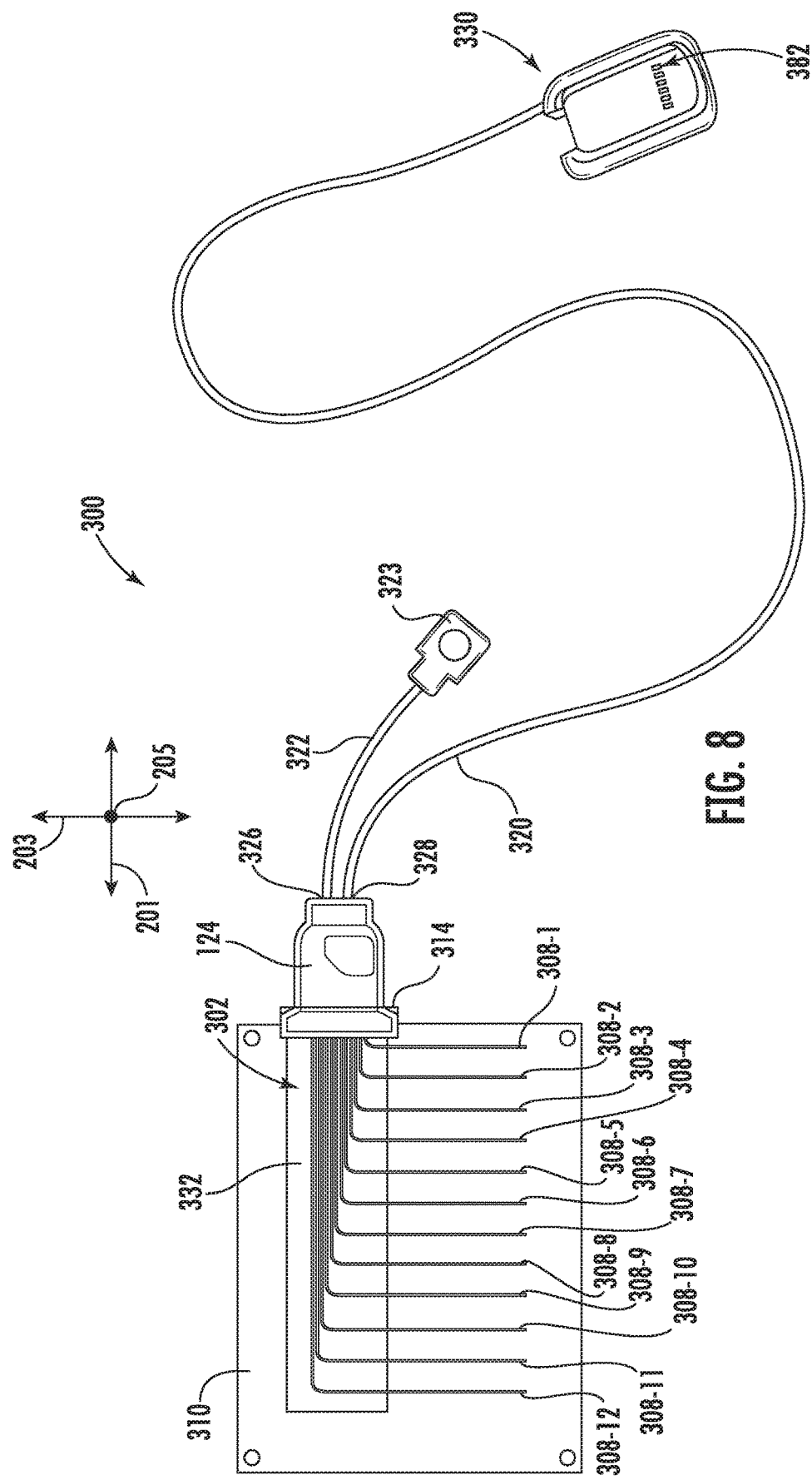
Figure 9:
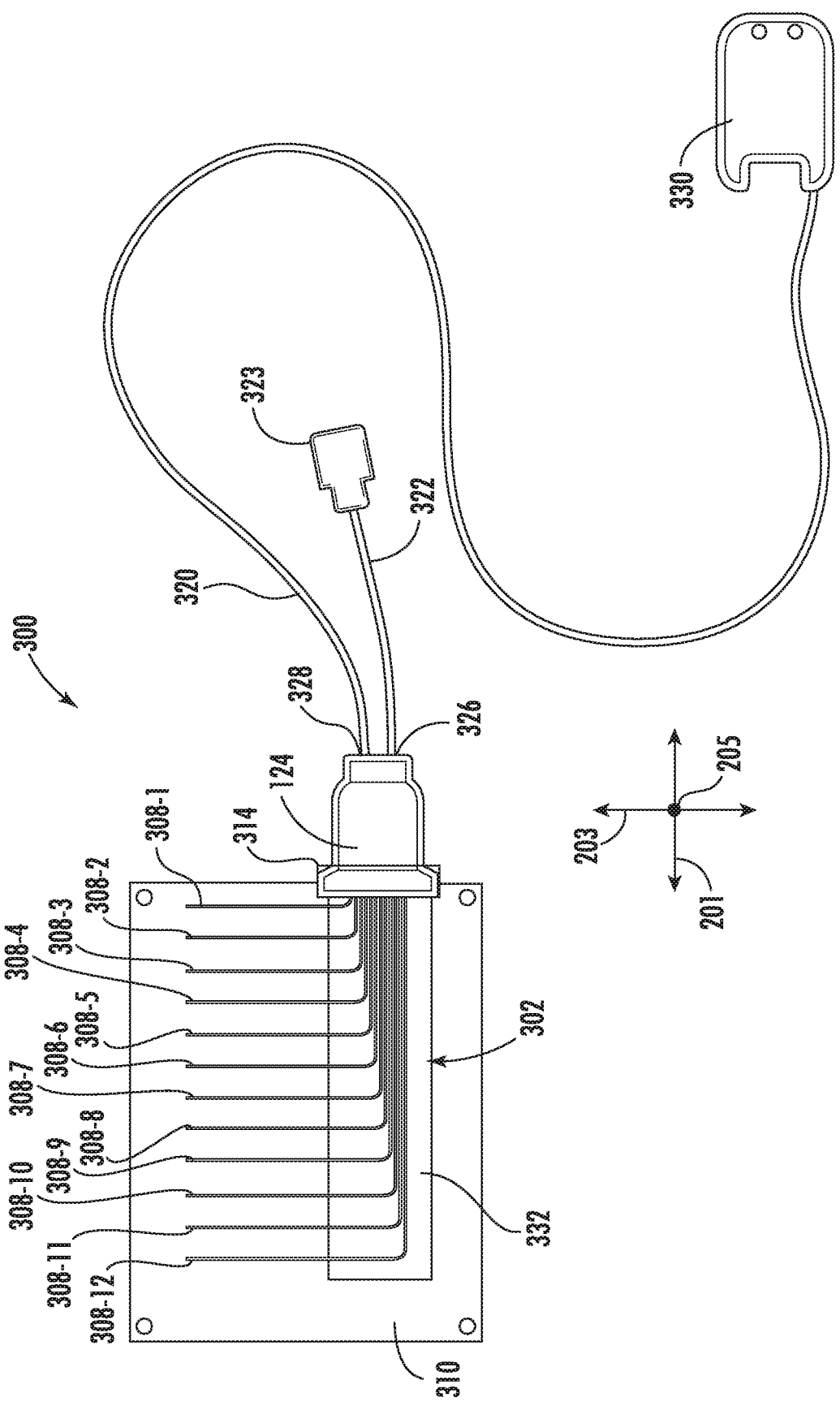

FIGS. 8-10 depict an example of a pre-fabricated sensor assembly 300 in accordance with example embodiments of the present disclosure. FIGS. 8 and 9 depict a top perspective view and a bottom perspective view of sensor assembly 300, respectively. FIG. 10 depicts a top view showing additional details of touch sensor 302. Sensor assembly 300 includes a touch sensor 302, an internal electronics module 124, a receptacle 330, a communication cable 320, and a communication cable 322. Touch sensor 302 is one example of a touch sensor 102 as illustrated in FIGS. 1 and 2, and can be configured as a capacitive touch sensor or resistive touch sensor in example embodiments.

Pre-fabricated sensor assembly 300 includes a touch sensor 302 that is formed from a plurality of conductive threads 308-1 through 308-12. Conductive threads 308-1 to 308-12 are one example of sensing elements 108. Conductive threads 308-1 through 308-12 extend in a lateral direction parallel to a lateral axis 203 defined by the touch sensor 302. Conductive threads 308-1 through 308-12 include a curved section 351 that connects a first lateral section 357 of each conductive thread to a longitudinal section 353 of each conductive thread that extends in a direction parallel to longitudinal axis 201. The first lateral section 357 of each conductive thread is attached to substrate 332, while a second lateral section 359 of each conductive thread extends beyond an outer perimeter of the substrate 332 to form loose portion of each conductive thread. The longitudinal section 353 can extend in a first direction (e.g., longitudinal) at a first portion of the pre-fabricated sensor assembly and the lateral section can extend in a second direction (e.g., lateral) at a second portion of the pre-fabricated sensor assembly. The first direction and the second direction can be substantially orthogonal. The conductive threads are coupled to a connecting ribbon 314 in some examples, which can be utilized to position the conductive lines for connection to a plurality of electrical contact pads (not shown) of internal electronics module 124. The plurality of conductive threads 308-1 through 308-12 can be collected and organized using a ribbon with a pitch that matches a corresponding pitch of connection points of an electronic component such as a component of internal electronics module 124.

Internal electronics module 124 may include sensing circuitry (not shown) in electrical communication with the plurality of conductive threads 308-1 through 308-12. Internal electronics module 124 may include one or more communication ports. In the example of FIGS. 8-10, internal electronics module 124 includes a communication port 326 and a communication port 328. Communication port 326 is coupled to a first end portion of the communications cable 320. Communications cable 320 can form a portion of a communication interface 162 as shown in FIG. 2. Communication cable 320 includes a second end portion that is coupled to a receptacle 330. Receptacle 330 is configured to removably connect a removable electronics module 150 (not shown) to the pre-fabricated sensor assembly 300 via communication cable 320. Receptacle 330 may be manufactured from a plastic, metal, polymer, or other suitable material. Receptacle 330 can include one or more electrical contact pads 382 for electrically coupling the removable electronics module to the pre-fabricated sensor assembly 300. Communication port 328 is coupled to a first end portion of the communications cable 322. Communication cable 322 can form a portion of the communication interface 162 as shown in FIG. 2. Communication cable 322 includes a second end portion that is coupled to an output device 323. Output device 323 is one example of an output device 127 depicted in FIG. 2. Output device 323 may include an audible output device such as a speaker, a visual output device such as a light (e.g., LED), or a haptic output device such as a haptic motor. Any suitable type of output device may be provided as output device 323.

Pre-fabricated sensor assembly 300 may include one or more flexible retaining layers 310. In some examples, the one or more flexible retaining layers 310 can include an upper flexible retaining layer and a lower flexible retaining layer. Between the flexible retaining layers can be formed the set of conductive threads 308. In some examples, internal electronics module 124 and/or a portion of communication cable 320 can be formed between the flexible retaining layers. In some examples, a single flexible retaining layer 310 may be utilized while still forming a housing for enclosing the touch sensor 302 and optionally other components such as internal electronics module 124. For instance, a single flexible retaining layer 310 may be folded with the touch sensor 302 and internal electronics module 124 formed therebetween.

The one or more flexible retaining layers can at least partially surround the capacitive touch sensor in some examples. In other examples, the one or more flexible retaining layers can at least partially surround the first electronics module and the plurality of conductive threads of the capacitive touch sensor. The communication cable can extend from within the housing of the one or more flexible retaining layers to outside of the one or more flexible retaining layers. The receptacle extends at least partially outside of the one or more flexible retaining layers to enable removable connection of the second electronics module.

The set of conductive threads 308 and internal electronics module 124 can be positioned in a predetermined arrangement or sensor layout. A vacuum sealing, thermal, pressure, bonding, or other technique may be utilized to adhere a top flexible retaining layer to a bottom flexible retaining layer, thereby enclosing the internal elements within a housing formed by the flexible retaining layers. More particularly, the set of conductive threads 308 and/or the internal electronics module 124 can be formed within a housing that is made by the flexible retaining layer(s) 310.

A similar pre-fabricated sensor assembly may additionally or alternatively include other types of sensors. For example, resistive touch sensors can be formed in a similar manner to capacitive touch sensors as described. Other types of sensors such as inertial measurement units, strain gauges, ultrasonic sensors, radar-based touch interfaces, image-based sensors, infrared sensors, etc. can be integrated within flexible retaining layers as described.

Conductive threads 308-1 through 308-12 can be formed on or within a textile-based substrate 332. By way of example, textile-based substrate 332 may be formed by weaving, embroidering, stitching, or otherwise integrating conductive threads 308-1 through 308-12 with a set of nonconductive threads. In the example of FIG. 8-10, each conductive thread 308 includes a lateral section 359 that can extend in a lateral direction to form an area designed to detect touch inputs by the touch sensor. Collectively, the lateral portions of each conductive thread form a touch-sensitive area for the touch sensor 302. As illustrated, the pitch between the conductive threads where they connect to the internal electronics module may be less than the pitch between the conductive threads at the touch-sensitive area. Such a design can enable a suitable spacing and arrangement of the conductive threads where the touch-sensitive area(s) are formed, while providing a tighter pitch to enable a compact arrangement where the conductive threads are connected to the sensing circuitry.

With reference to FIG. 10, further details of the spacing and arrangement of conductive threads 308 in an example of a pre-fabricated sensor assembly 300 is illustrated. A close-up view of a touch sensor is depicted showing a subset of the conductive threads including conductive threads 308-1 to 308-12. Each conductive thread includes a first lateral section 357 and a second lateral section 359 that extend in a direction parallel to lateral axis 203, and a longitudinal section 353 that extends in a longitudinal direction parallel to the longitudinal axis 201. Longitudinal section 353 is connected to the first lateral section 357 by curved section 351.

The first lateral section 357 of each conductive thread can include a first portion that is woven or otherwise integrated within the textile-based substrate 332, and a second lateral section 359 that extends in a lateral direction beyond an outer perimeter of the textile-based substrate 332. The lateral portion of each conductive thread can have a length that is different than the lengths of the lateral portions of other conductive threads.

The lateral sections 357 and 359 of each conductive thread 308 are separated from the lateral sections of adjacent threads by a distance 354. The longitudinal section 353 of the each conductive thread 308 is separated from the longitudinal section 353 of adjacent conductive threads by a distance 358. The distance 354 between the lateral sections is greater than the distance 358 between the longitudinal sections. Such a configuration can enable a sufficient spacing to be utilized in the touch-sensitive area to receive and distinguish touch inputs utilizing the conductive lines. Moreover, such a configuration can enable a smaller spacing to be utilized at an area not intended for touch input in order to conserve space and ultimately make a more compact device. Additionally, the decreased spacing and width of the longitudinal sections can enable a tighter pitch to be utilized when connecting to a ribbon and ultimately to the sensing circuitry within internal electronics module 124. In such a manner, a tight or small spacing can be utilized to conserve space where connections are made but a larger spacing can be utilized at other areas where a touch input is desired to be detected.

Figure 11:
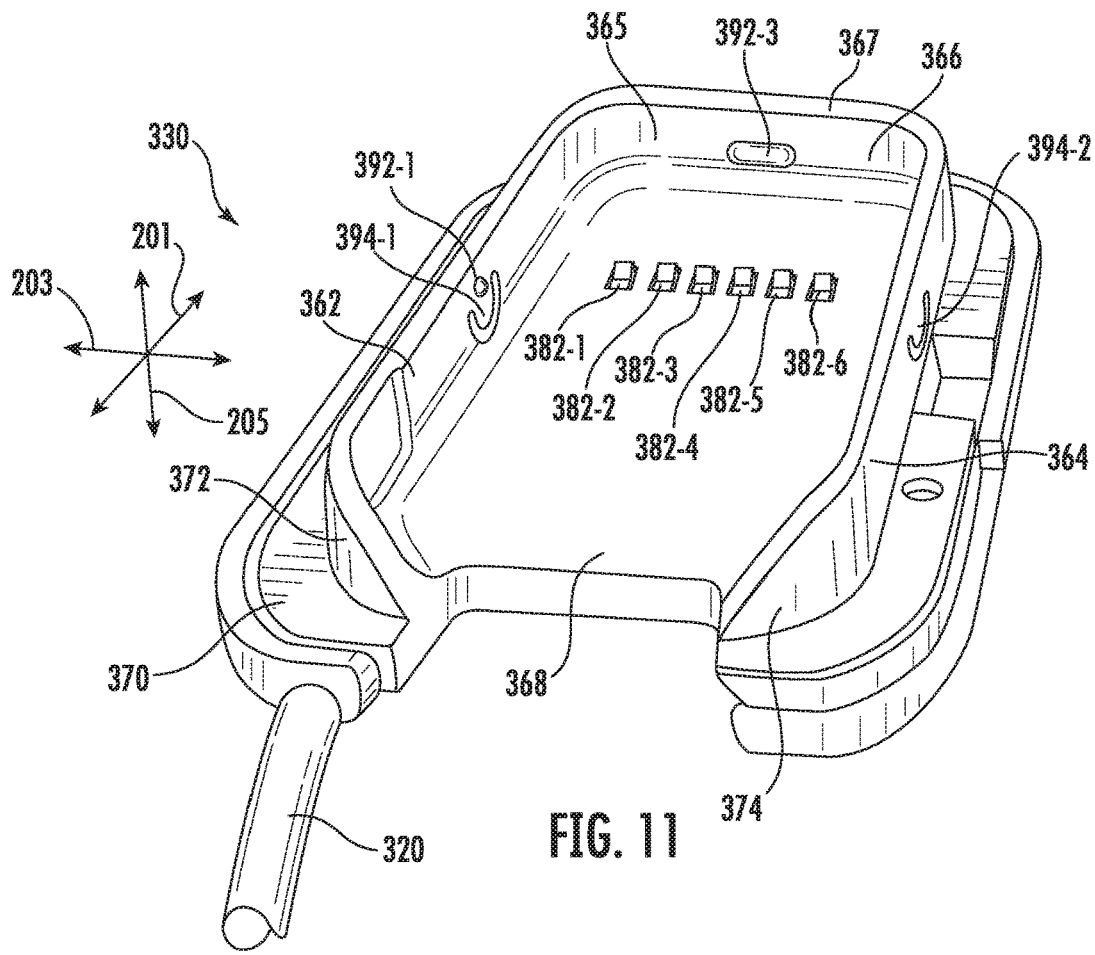
FIGS. 11-13 are various perspective views depicting an example receptacle of a pre-fabricated sensor assembly in accordance with example embodiments of the present disclosure.
Figure 12:
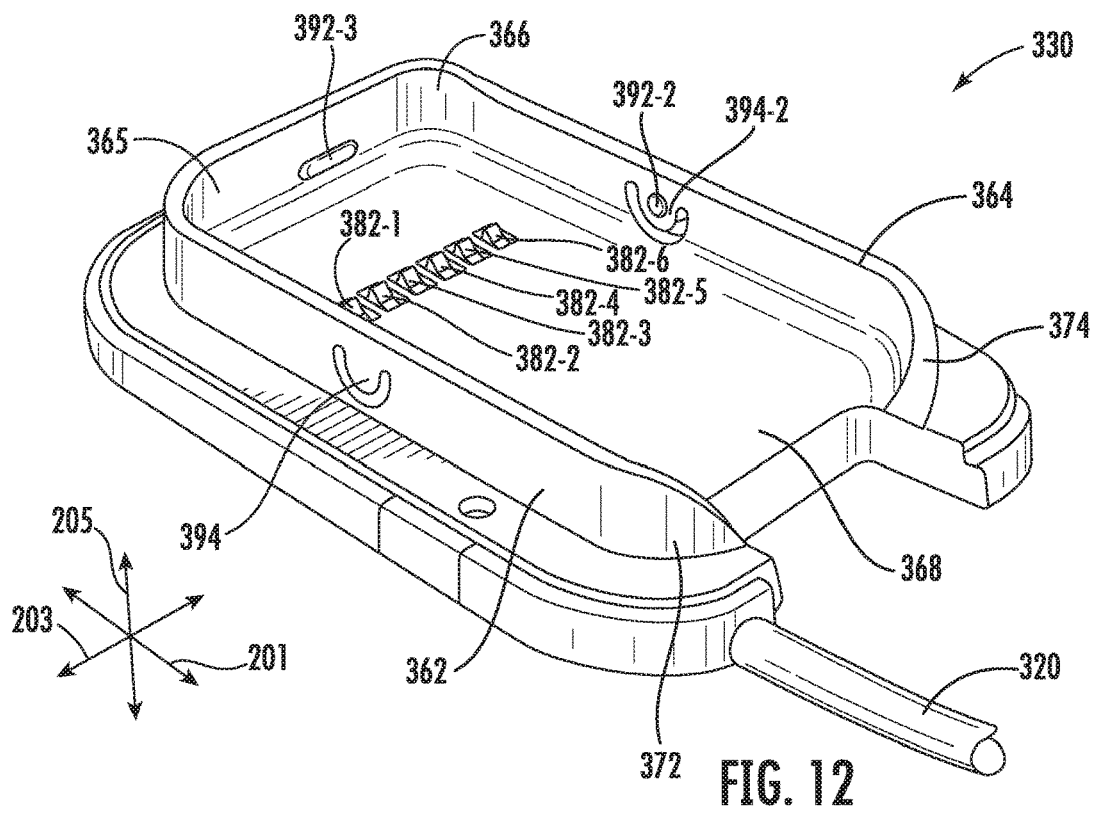
Figure 13:
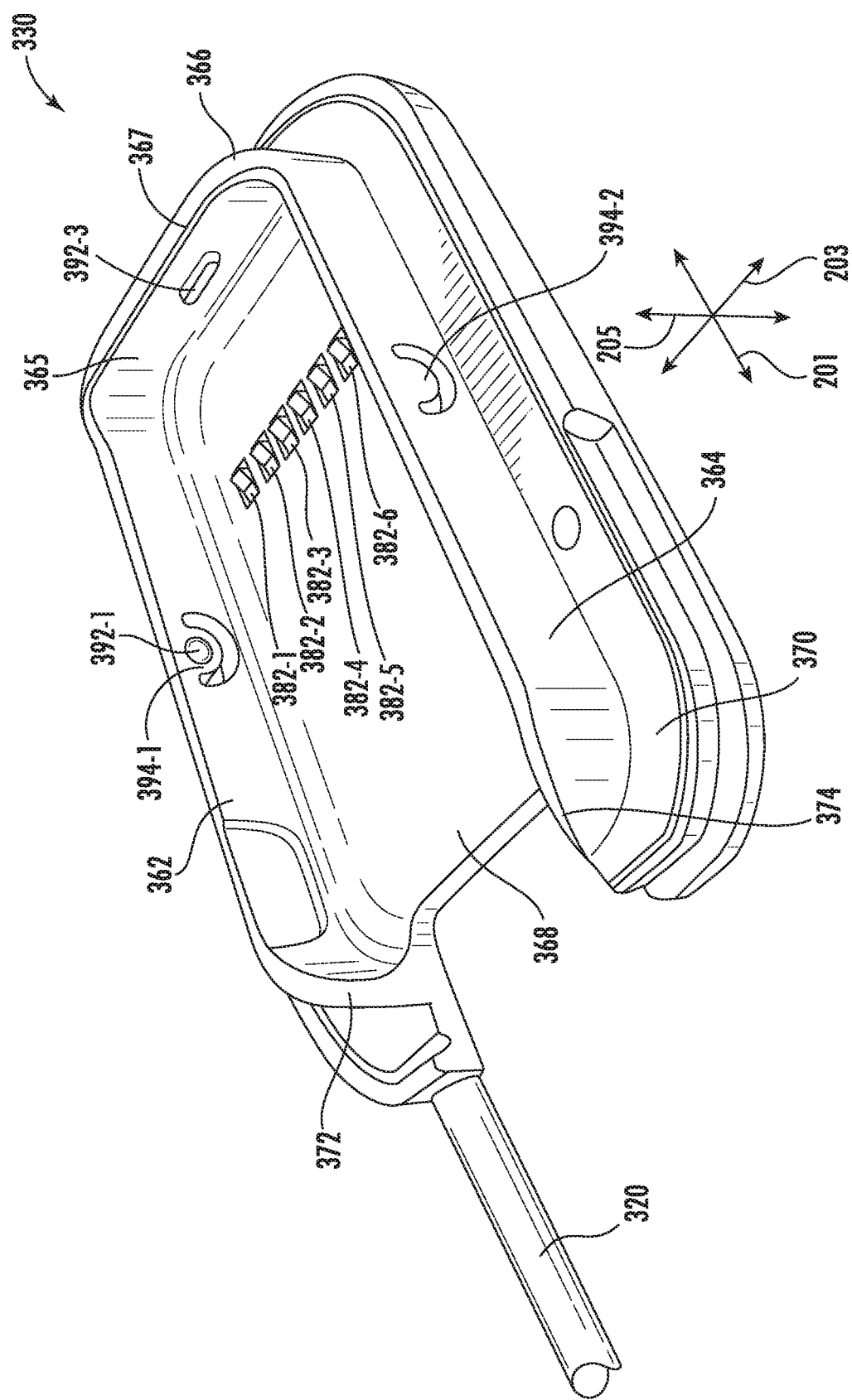

FIGS. 11-13 depict an example of receptacle 330 in accordance with example embodiments of the present disclosure. FIG. 11 depicts a front perspective view of receptacle 330, FIG. 12 depicts a first side perspective view of receptacle 330, and FIG. 13 depicts a second side perspective of receptacle 330.

Receptacle 330 includes a first longitudinal sidewall 362, a second longitudinal sidewall 364, a back or lateral wall 366, and a base member 368. Receptacle 330 is one example of a tub or box-based receptacle including one or more wall members that extend from a base member 368 to form an open box for receiving a removable electronics module 150.

The first longitudinal sidewall 362 can include a first curved section 372 and the second longitudinal sidewall 364 can include a second curved section 374. Curved sections 372 and 374 can extend along the back or second lateral surface of removable electronics module 150 when inserted to provide additional support for the removable electronics module.

Lateral wall 366 includes a vertical portion 365 and an overhang portion 367. When removable electronics module 150 is inserted within receptacle 330, a portion of the upper surface 202 of the removable electronics module will be contacted by overhang portion 367. In this manner, overhang portion 367 can at least partially secure removable electronics module 150 within receptacle 330.

Receptacle 330 includes a plurality of retaining elements 392. Retaining elements 392-1 and 392-2 are disposed on an inner portion of a vertical member 394. More particularly, the first longitudinal sidewall 362 includes a first retaining element 392-1 disposed on an inner surface of a vertical member 394-1. The second longitudinal sidewall 304 includes a second retaining member 392-2 formed on an inner surface of vertical member 394-2. Vertical members 394-1 and 394-2 can provide flexibility so that retaining elements 392-1 and 392-2 can flex when removable electronics module 150 is inserted. In this manner, the retaining elements 392-1 can accommodate the retaining elements 232 located on the removable electronics module 150. A third retaining element 332-3 is formed on an inner surface of the vertical portion 365 of lateral wall 366. In FIG. 13, retaining elements 392-1, 392-2, and 392-3 are detents configured to mate with the indents comprising the retaining elements 232 of removable electronics module 150. Retaining elements 392-1 and 392-2 can include a circular cross-section in example embodiments. Retaining element 392-3 can include an ovular or rectangular cross-section in example embodiments.

Base member 368 can include a plurality of openings disposed along a portion of the base member 368 to provide accessibility to a plurality of contact pads 382. In some examples, the plurality of contact pads 382 can extend vertically from the inner surface of base member 368 to form contact protrusions, such that the plurality of contact protrusions can have an upper surface that define a plane that is separated vertically from a plane defined in by the inner surface of base member 368.

Receptacle 330 includes an attachment member 370 which may be used to attach receptacle 330 to an interactive object. Attachment member 370 may be affixed to the substrate of an existing object using an adhesive, one or more fasteners, heat pressing, or other suitable techniques. In FIGS. 11-13, attachment member 370 extends in a lateral and longitudinal direction with dimensions that exceed corresponding dimensions of the receptacle box formed by the sidewalls of the box-based receptacle. Attachment member 370 can form a flange in such embodiments to enable receptacle 330 to be attached to an interactive object by attachment member 370 while exposing the box portion of receptacle 330 for user insertion and removal of the removable electronics module 150. Attachment member 370 can extend in such directions to facilitate attaching the receptacle to various types of interactive objects. In some examples, receptacle 330 may be placed in the cuff of a jacket or the sleeve of another type of wearable garment. In another example, receptacle 330 may be attached to a portion of a backpack, purse, or other garment accessory. Receptacle 330 may be sewn to a substrate of an interactive object using attachment member 370 in some embodiments.

In other examples, receptacle 330 may be attached to a substrate of an interactive object using glue or another adhesive.

Figure 14A:
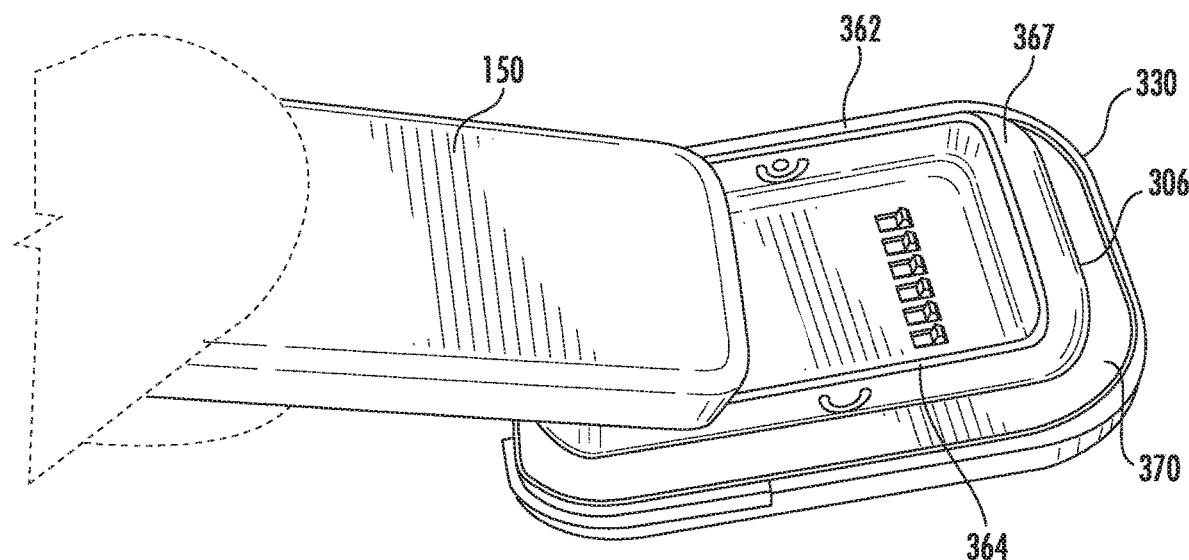
FIGS. 14A-14C or perspective views depicting an example receptacle and the insertion of a removable electronics module into the receptacle in accordance with example embodiments of the present disclosure.
Figure 14B:
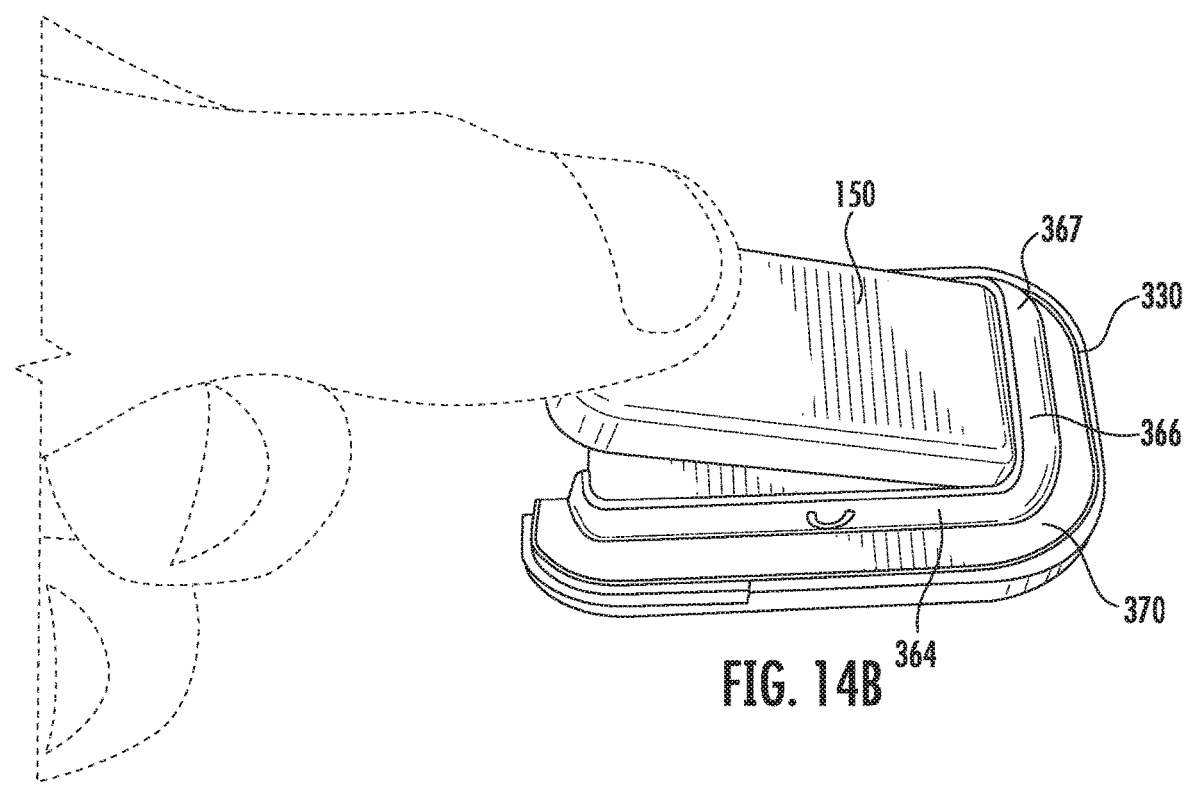
Figure 14C:
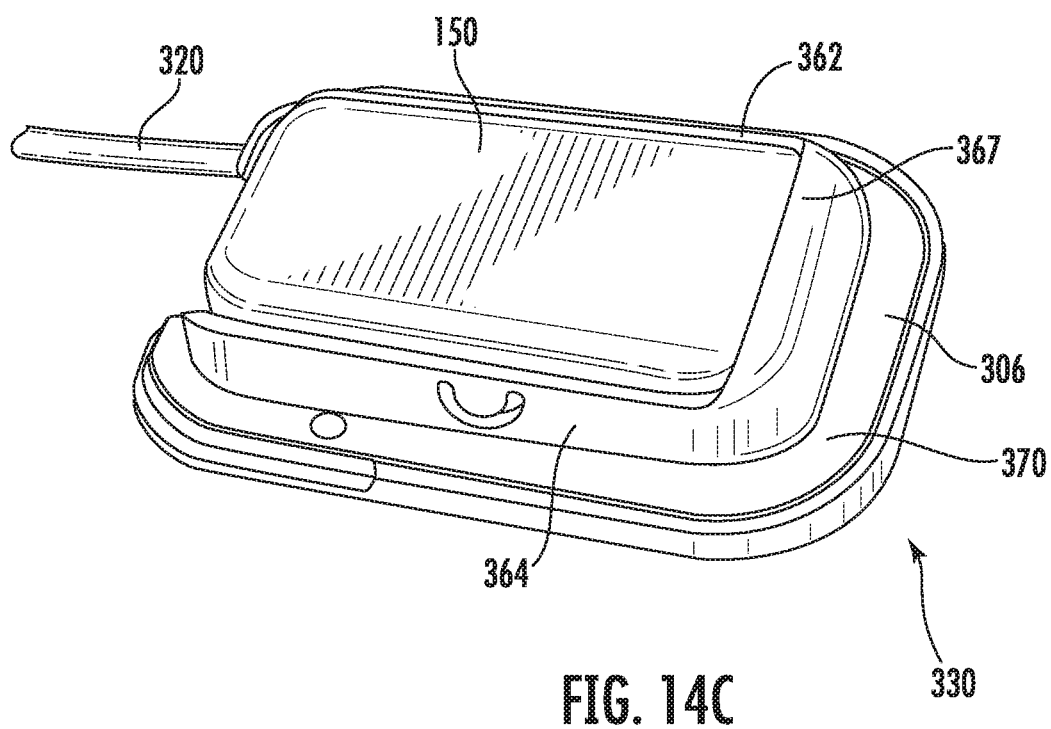

FIGS. 14A-14C depict an example of inserting a removable electronics module 150 into a receptacle 330 in accordance with one example aspect of the present disclosure. A user can insert removable electronics module 150 into receptacle 330 by placing a first lateral surface 206 of removable electronics module 150 into receptacle 330 with a longitudinal force applied in direction parallel to the longitudinal axis. At the same time, user 377 may apply a downward pressure in a vertical direction parallel to the vertical axis to cause first lateral surface 206 to be inserted within receptacle 330. The remaining portion of the lower surface 204 may be inserted by the vertical force until it comes in contact with the base member 368 of receptacle 330. With removable electronics module 150 inserted, the set of contact pads 222 of removable electronics module 150 may contact the set of contact pads of receptacle 330. As illustrated in FIG. 14C, a portion of the upper surface 202 of removable electronics module 150 is contacted by an overhang portion 367 of the back wall of receptacle 330.

Figure 15:
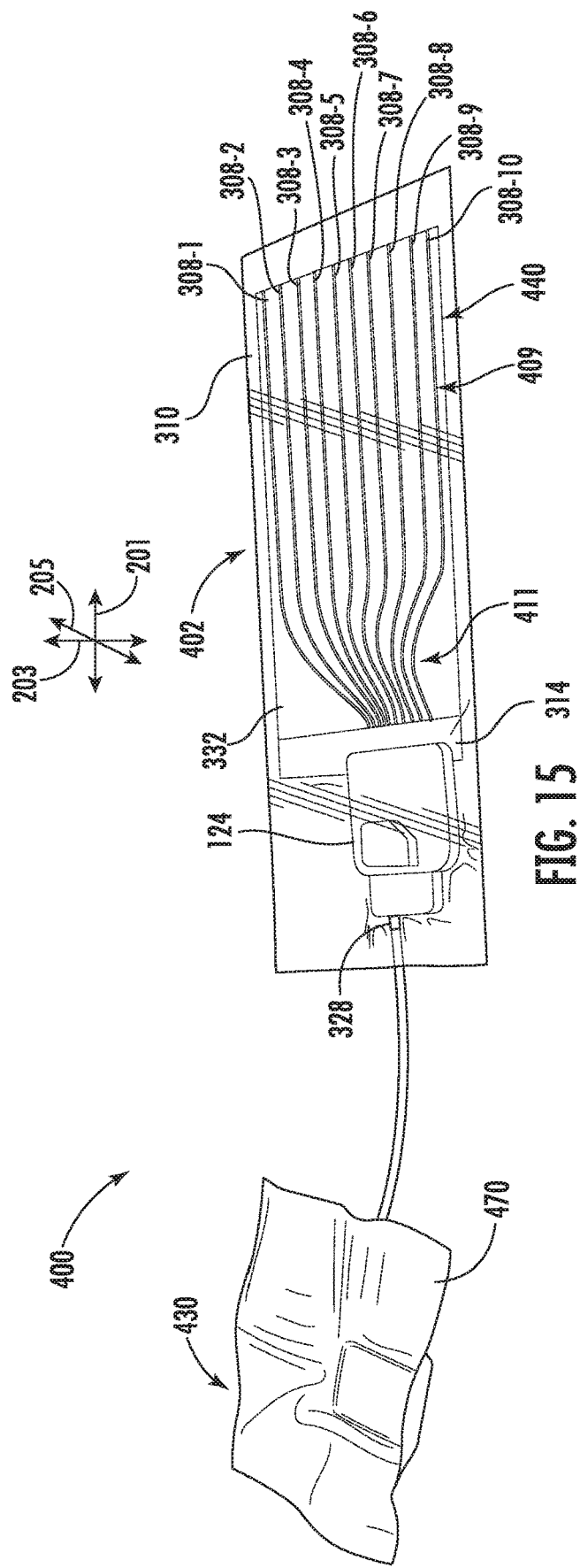
FIGS. 15-16 are top and bottom perspective views, respectively, depicting an example pre-fabricated sensor assembly in accordance with example embodiments of the present disclosure.
Figure 16:
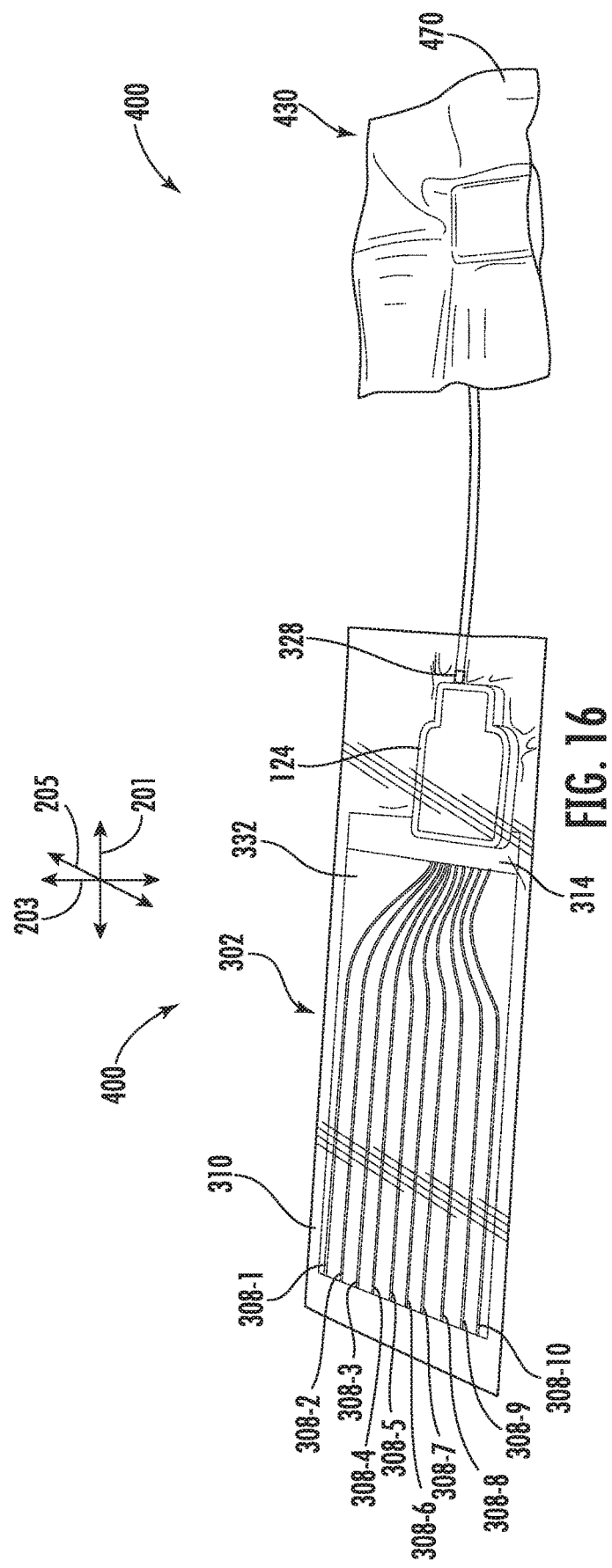

FIGS. 15 and 16 illustrate another example of a pre-fabricated sensor assembly 300 in accordance with example embodiments of the present disclosure. FIG. 15 is a top perspective view and FIG. 16 is a bottom perspective view of a sensor assembly 400 including a touch sensor 402, internal electronics module 124, and receptacle 330. Touch sensor 402 can be configured as a capacitive touch sensor or resistive touch sensor in example embodiments. Touch sensor 402 is one example of a touch sensor 102 as illustrated in FIGS. 1 and 2.

Pre-fabricated sensor assembly 400 includes one or more flexible retaining layers 310 that form a housing that encloses a touch sensor 402 and internal electronics module 124 as earlier described. More particularly, the one more flexible retaining layers at least partially surround touch sensor 402 and internal electronics module 124 to provide stability and to maintain a pre-defined arrangement and positioning of conductive threads 308-1 through 308-10 that form the touch sensor 402 in this example. Touch sensor 402 can be configured as a capacitive touch sensor or resistive touch sensor in example embodiments.

Conductive threads 308-1 through 308-10 are formed on or within a textile-based substrate 332. By way of example, textile-based substrate 332 may be formed by weaving, embroidering, stitching, or otherwise integrating conductive threads 308-1 through 308-10 with a set of nonconductive threads. In the example of FIGS. 15-16, each conductive thread 308 includes a longitudinal portion that extends in a longitudinal direction. Collectively the longitudinal portions of each conductive thread form a touch-sensitive area for the touch sensor 402. Each conductive thread can include a loose portion 411 which is loose from the textile-based substrate 332. The loose portion of each conductive thread can be formed by not weaving, embroidering, etc. the loose portions with the nonconductive threads when forming textile-based substrate 332. The loose portions may enable a more efficient and/or easy connection of the conductive threads to sensing circuitry within internal electronic module 124. As illustrated, the pitch between the conductive threads where they connect to a ribbon 314 and then to the internal electronics module may be less than the pitch between the conductive threads at the touch-sensitive area. Such a design can enable a suitable spacing and arrangement of the conductive threads where the touch-sensitive area(s) are formed, while providing a tighter pitch to enable a compact arrangement where the conductive threads are connected to the sensing circuitry. In the particular example of FIGS. 15-16, a ribbon 314 is utilized to gather and position the conductive threads at a pitch corresponding to a set of electrical contact pads (not shown) of internal electronics module. Ribbon 314 can be utilized to collect and organize the plurality of conductive threads 308 into a ribbon with a pitch that matches a corresponding pitch of connection points of an electronic component such as the sensing circuitry of internal electronics module 124.

Internal electronics module 424 includes a communication port 328 coupled to a first portion of communication cable 320. A second end portion of communication cable 320 is coupled to a receptacle 330. In this example, receptacle 330 includes or is otherwise attached to a flexible attachment member 470. Communication cable 320 includes a first end portion coupled to a communication port 328 of internal electronics module 124 and a second end portion coupled to receptacle 330.

Figure 17:
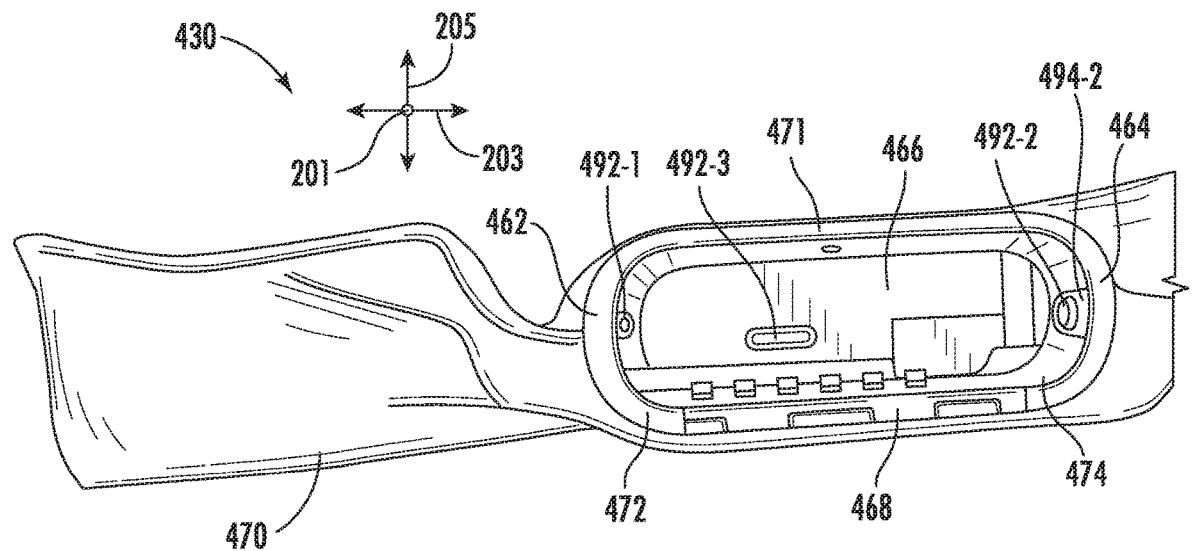
FIGS. 17-18 are front and side perspective views, respectively, depicting an example receptacle of a pre-fabricated sensor assembly in accordance with example embodiments of the present disclosure.
Figure 18:
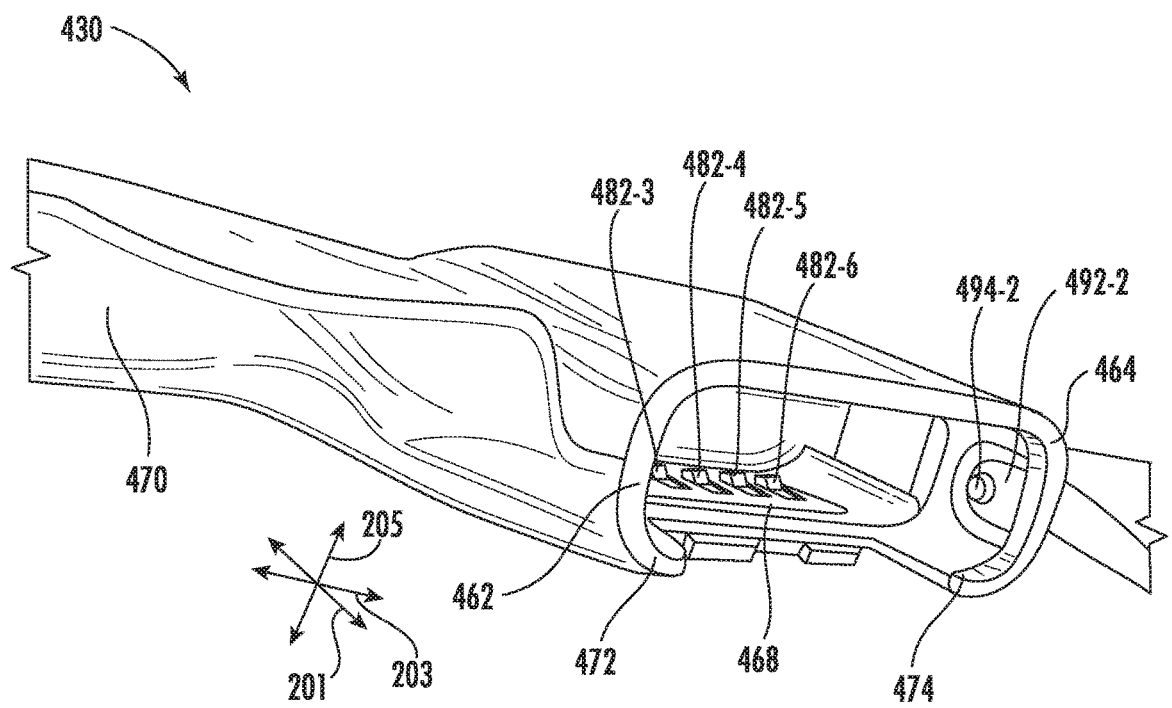

FIGS. 17-18 depict an example of a receptacle 430 in accordance with example aspects of the present disclosure. FIG. 17 depicts a front perspective view of receptacle 430 and FIG. 18 depicts a side perspective view of receptacle 430.

Receptacle 430 includes a first longitudinal sidewall 462, a second longitudinal sidewall 464, a back or lateral wall 466, a base member 468, and a top member 471. Receptacle 430 is one example of a slot-based receptacle including one or more wall members that extend from a base member 468 to form a closed slot for receiving a removable electronics module 150. Receptacle 430 includes a top member 471 that provides a vertical force to hold removable electronics module 150 when inserted. Top member 471 can extend over at least 25% of the length of upper surface of removable electronics module 150 in example embodiments, such as at least 35% of the length of the upper surface, such as at least 45% of the length of the upper surface, such as at least 50% of the upper surface of the length of the upper surface. In other examples, top member 471 may extend less than 25% of the length of the upper surface or more than 50% of the length of the upper surface.

Base member 468 includes a length in the longitudinal direction that is less than a length of the first longitudinal sidewall 462 in the longitudinal direction and the length of the second longitudinal sidewall 464 in the longitudinal direction. In this manner, an opening can be provided to further facilitate removal and insertion of the removable electronics module.

The first longitudinal sidewall 462 can include a first lateral arch 472 and the second longitudinal sidewall 464 can include a second lateral arch 474. Lateral arch 472 can extend along at least a portion of the upper surface of removable electronics module 150 when inserted to provide additional support for the removable electronics module. Lateral arch 474 can extend along at least a portion of the upper surface of removable electronics module 150 when inserted to provide additional support for the removable electronics module.

Receptacle 430 includes a plurality of retaining elements 492. The first longitudinal sidewall 462 includes a first retaining element 492-1 disposed on an inner surface of a horizontal member (not shown). The second longitudinal sidewall 464 includes a second retaining element 492-2 formed on an inner surface of a horizontal member 494-2. Horizontal members such as horizontal member 494-2 can provide flexibility so that retaining elements 492-1 and 492-2 can flex when removable electronics module 150 is inserted. In this manner, the retaining elements 492 can accommodate the retaining elements 232 located on the removable electronics module 150. A third retaining element 492-3 is formed on an inner surface of a lateral wall 466. Retaining elements 492-1, 492-2, and 492-3 can be detents configured to mate with the indents comprising the retaining elements 232 of removable electronics module 150 in example embodiments. Retaining elements 492-1 and 492-2 can include a circular cross-section in example embodiments. Retaining element 492-3 can include a rectangular cross-section in example embodiments.

Base member 468 can include a plurality of openings disposed along a portion of the base member 468 to provide accessibility to a plurality of contact pads 482. In some examples, the plurality of contact pads 482 can extend vertically from the inner surface of base member 468 to form contact protrusions, such that the plurality of contact pads 482 can have an upper surface that defines a plane that is separated vertically from a plane defined in by the inner surface of base member 468.

Receptacle 430 includes an attachment member 470. In this example, receptacle 230 includes or is otherwise attached to a flexible attachment member 470. The flexible attachment member 470 can include a textile fabric or other flexible material in various embodiments. Flexible attachment member 470 can enable the attachment of receptacle 430 to an interactive object. For example, flexible attachment member 470 may be sewn to a substrate that is used to form an interactive object, enabling the receptacle 430 to be affixed to the interactive object. In this example, attachment member 470 can include a flexible textile or other material that is attached to at least a portion of one or more of the first longitudinal sidewall 462, the second longitudinal sidewall 464, the lateral wall 466, and/or the base member 468. The particular arrangement of receptacle 430 enables a removable electronics module 150 to be inserted within the slot formed by the various walls so that removable electronics module can be securely attached to receptacle 430 and thereby to an interactive object including the pre-fabricated sensor assembly 400.

Figure 19A:
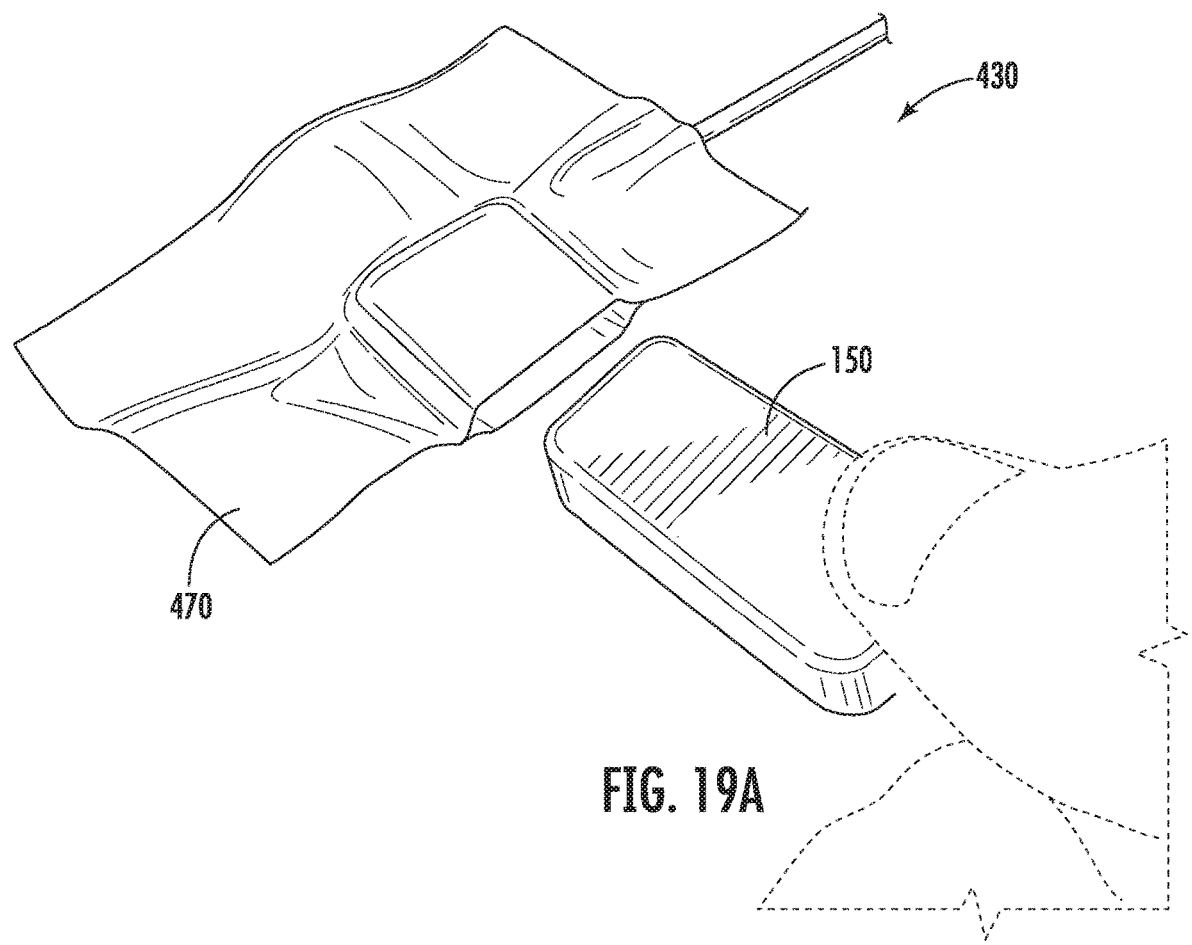
FIGS. 19A-19C are various perspective views depicting an example of inserting a removable electronics module into a receptacle of a pre-fabricated sensor assembly in accordance with example embodiments of the present disclosure.
Figure 19B:
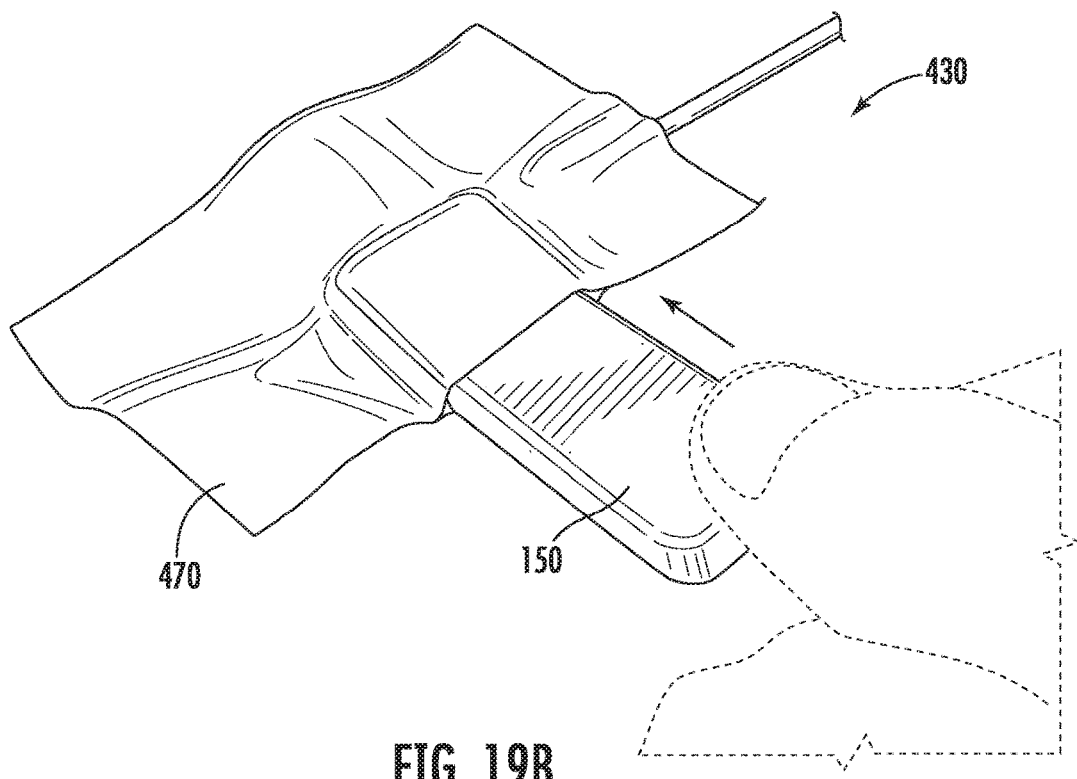
Figure 19C:
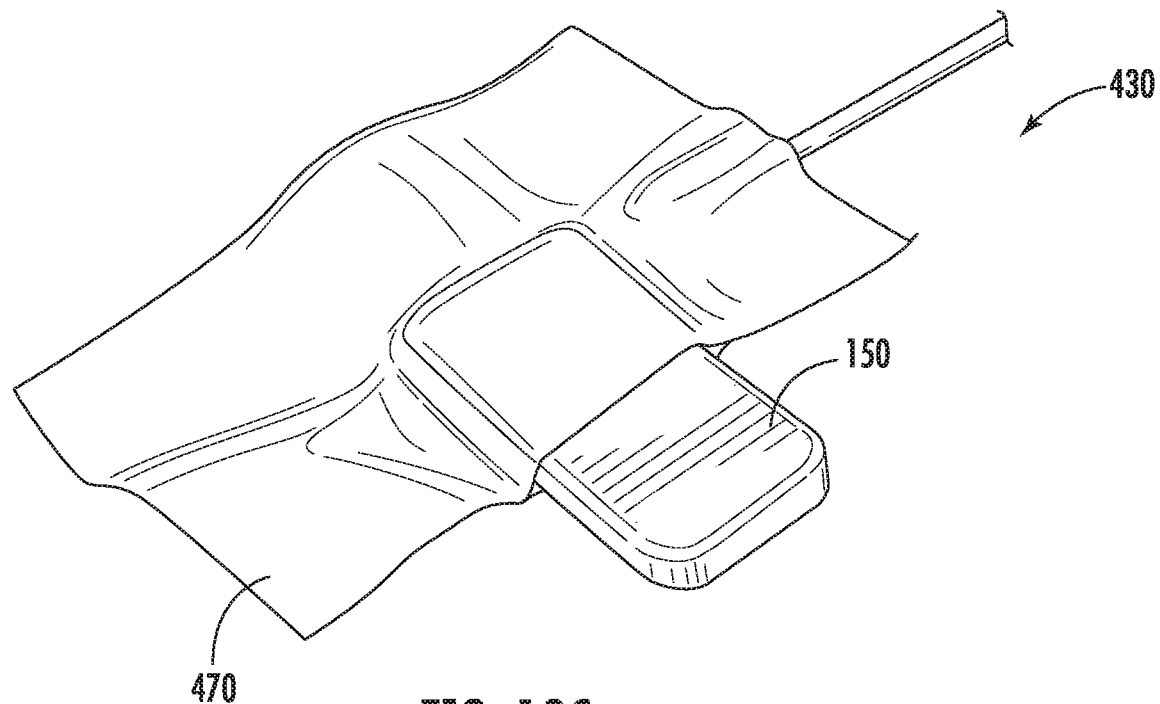

FIGS. 19A-19C depict an example of inserting removable electronics module 150 into receptacle 430 in accordance with one example aspect of the present disclosure. A user can insert removable electronics module 150 into receptacle 430 by placing a first lateral surface 206 of removable electronics module 150 into receptacle 430 with a longitudinal force applied in longitudinal direction. A single longitudinal force can be used to insert the removable electronics module 150 within the slot formed by receptacle 430. Inserting removable electronics module 150, the set of contact pads 222 of removable electronics module 150 (see FIG. 5) may contact the set of contact pads of receptacle 430. As illustrated in FIG. 14C, top member 471 overlies at least a portion of the upper surface of the removable electronics module 150. Additionally, a portion of base member 468 contacts a lower surface of removable electronics module 150. Furthermore, lateral arches 472 and 474 extend in the lateral direction to provide additional support to the lower surface of the removable electronics module 150

Figure 20A:
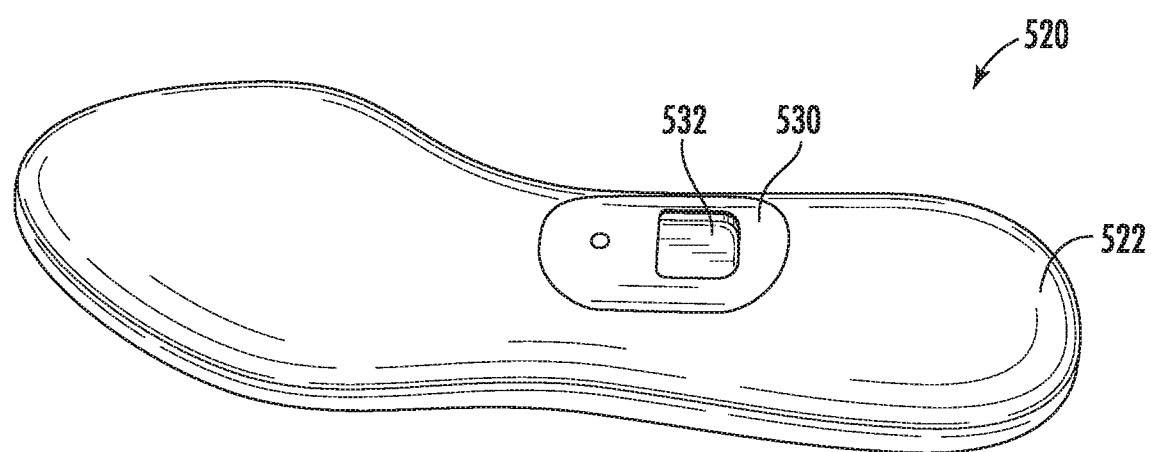
FIGS. 20A-20D are perspective views depicting an interactive shoe insert and the insertion of a removable electronics module into a receptacle of the interactive shoe insert in accordance with example embodiments of the present disclosure.

FIG. 20A depicts an example of an interactive shoe insert 520 (also referred to as an interactive insole or an interactive sock liner) including a receptacle 530 in accordance with one example aspect of the present disclosure. Interactive shoe insert 520 is an example of an interactive object that does not include a pre-fabricated sensor assembly. Instead, interactive shoe insert 520 includes a receptacle 530 that is configured to receive a removable electronics module via an opening 532. In this manner, interactive shoe insert 520 can be configured with the removable electronics module to capture data indicative of movements of the user using the inertial measurement unit of the removable electronics module, for example. The removable electronics module may perform other functions while inserted into the interactive shoe insert 520. For example, removable electronics module 150 may include one or more output devices such as an LED output device, haptic output device, or other output device. The removable electronics module can receive control signals from a remote computing device such as a user smart phone in order to initiate one or more output signals.

Figure 20B:
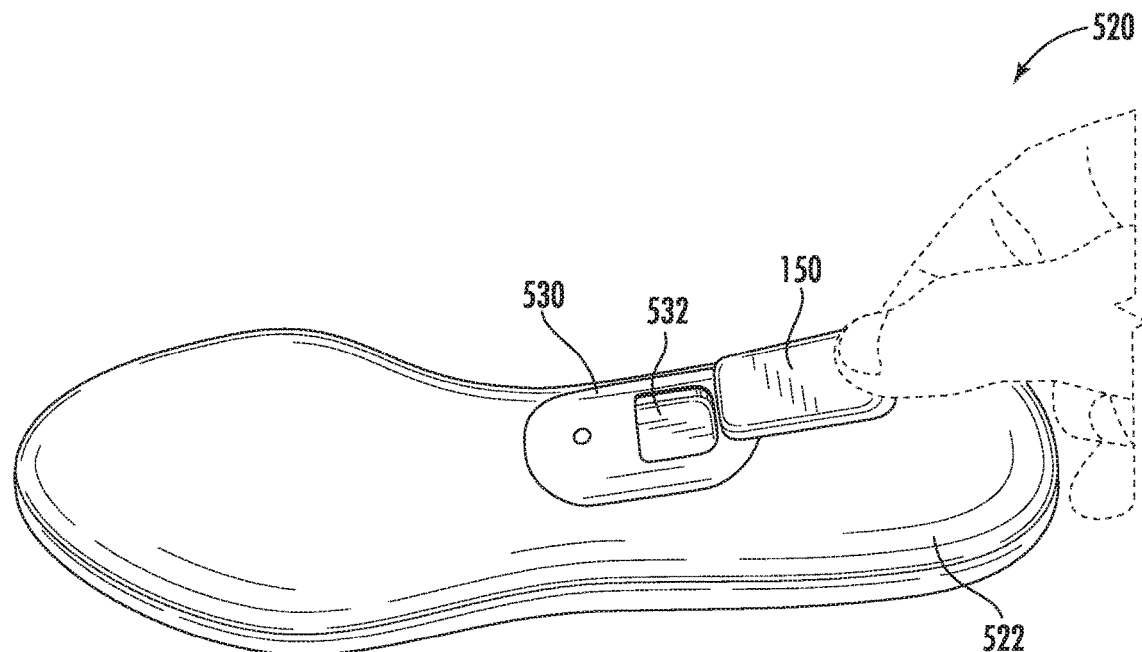
Figure 20C:
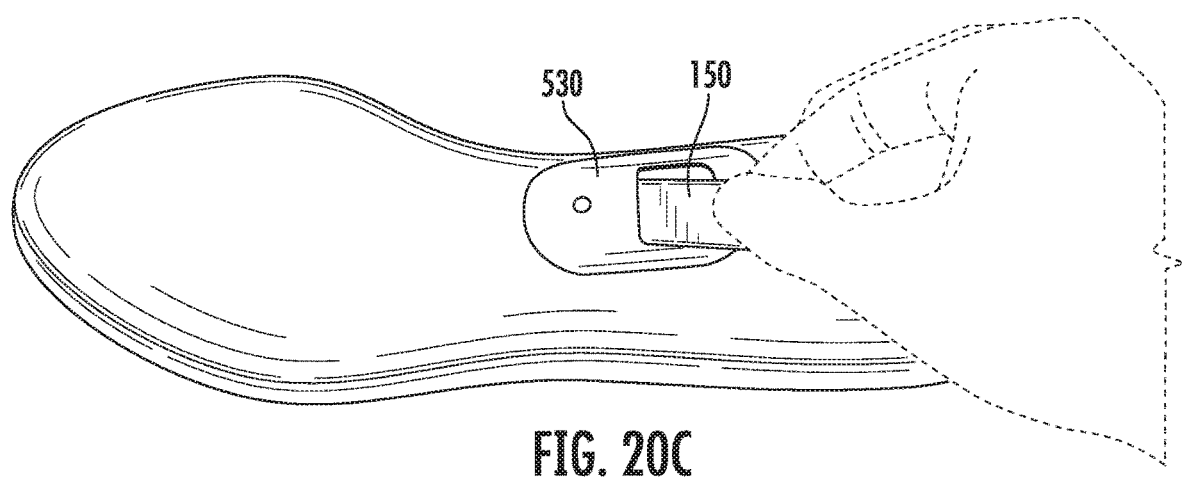
Figure 20D:
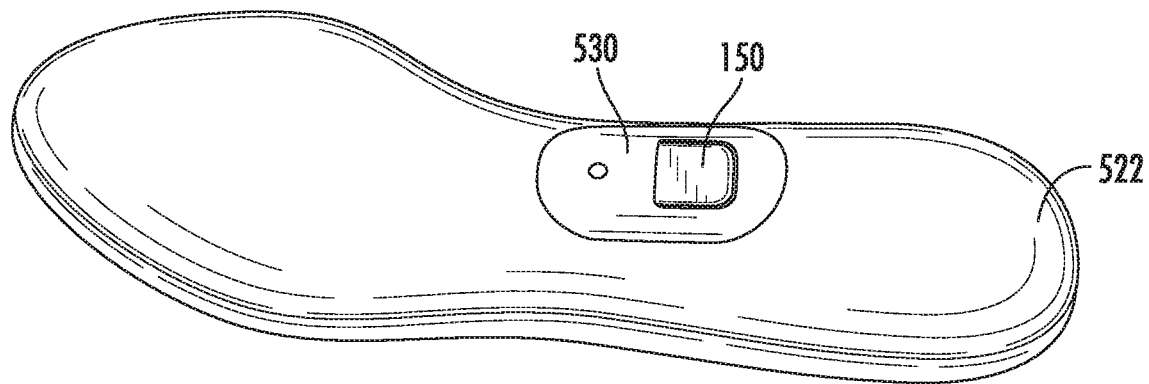

FIGS. 20B-20D depict an example of a user inserting removable electronics module 150 into receptacle 530 of interactive shoe insert 520 in accordance with one example aspect of the present disclosure. A user can insert removable electronics module 150 into receptacle 530 by placing a first lateral surface 206 (also referred to as front surface) of removable electronics module 150 into receptacle 530 with a longitudinal force applied in longitudinal direction. The user may apply longitudinal force to insert a portion of the removable electronics module within receptacle 530. When a back portion of the removable electronics module reaches a back portion of receptacle 530, a user may apply a downward pressure in a vertical direction parallel to the vertical axis 205 to cause the remaining portion of the removable electronics module 150 to be inserted within receptacle 530. A lower surface of removable electronics module 150 may contact an inner surface of interactive shoe insert 520.

Figure 21:
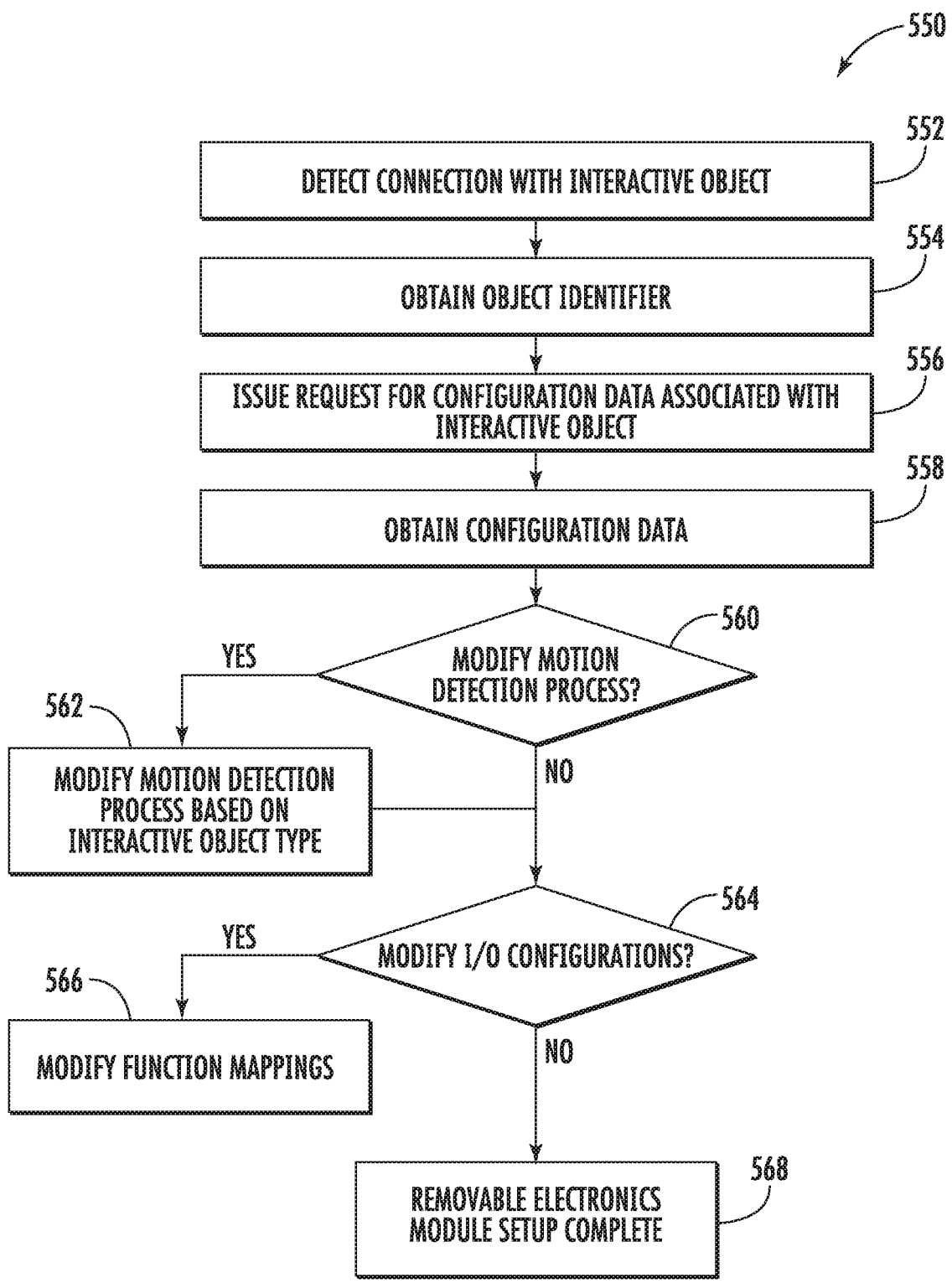
FIG. 21 depicts a flow diagram describing an example process of configuring a removable electronics module for a particular type of pre-fabricated sensor assembly in accordance with example embodiments of the present disclosure.
Figure 38:
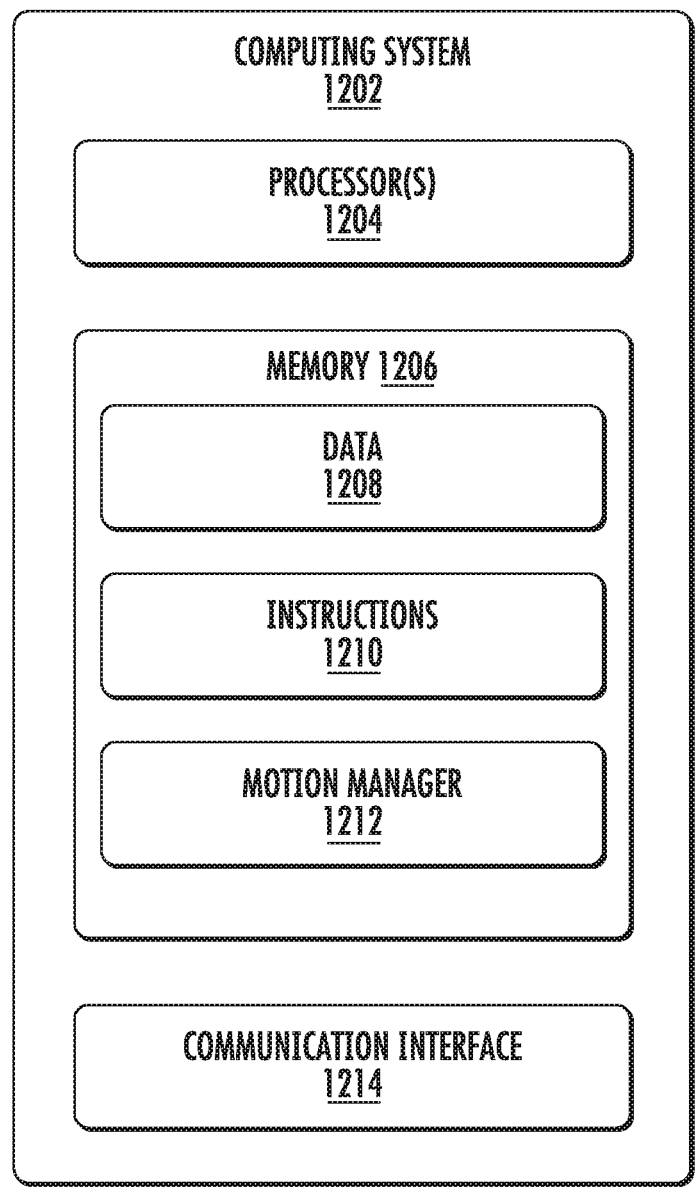
FIG. 38 illustrates various components of an example computing system that can be implemented as any type of client, server, and/or computing device as described herein.

FIG. 21 is a flowchart depicting an example method 550 of configuring a removable electronics device based on a type of interactive object to which the removable electronics module is coupled. One or more portions of method 550 can be implemented by one or more computing devices such as, for example, one or more computing devices of a computing environment 100 as illustrated in FIG. 1, computing environment 190 as illustrated in FIG. 2, or a computing environment 1202 as illustrated in FIG. 38. One or more portions of method 550 can be implemented as an algorithm on the hardware components of the devices described herein to, for example, configure a removable electronics module to process sensor data associated with the interactive object to generate data indicative of the detection of one or more pre-defined motions such as gestures. In example embodiments, method 550 may be performed by one or more processors included within the removable electronics module.

At 552, method 550 can include detecting a connection between an interactive object and a removable electronics module. For example, a removable electronics module may detect a connection to an interactive object in response to one or more signals received at one or more contacts of a communication interface of the removable electronics module. In other examples, the removable electronics module may detect a connection to an interactive object based at least in part on user input provided to the interactive object and/or the removable electronics module. In some examples, the removable electronics device can detect that the removable electronics device is physically coupled to a pre-fabricated sensor assembly comprising.

At 554, method 550 can include obtaining an object identifier associated with the interactive object. In some examples, a pre-fabricated sensor assembly of an interactive object including a touch sensor such as a capacitive or resistive touch sensor can provide a sensor identifier to the removable electronics module. In some examples, an interactive object can obtain an identifier of the interactive object itself, such as where a preconfigured sensor assembly is not included within the interactive object.

At 556, method 550 can include issuing a request for configuration data associated with the interactive object. For example, the removable electronics module may issue one or more requests to a remote server such as may be associated with a cloud computing service that provides configuration data for various interactive objects and/or sensors. The one or more requests can include the interactive object identifier. The request can be issued using a wireless network interface of the removable electronics module in example embodiments. For example, the request may be issued over a bluetooth connection or a Wi-Fi connection in some embodiments.

At 558, method 550 can include obtaining configuration data in response to the request issued at 556. In some examples, configuration data can be obtained from a remote computing device. In other examples, the configuration data may be obtained from a local storage location, such as a local memory of the removable electronics device in some examples. The configuration data can include pre-defined parameters associated with the touch sensor of a particular sensor assembly. The removable electronics device can obtain one or more pre-defined parameters associated with the touch sensor of the first pre-fabricated sensor assembly.

At 560, the removable electronics module determines whether one or more motion detection processes (e.g., gesture detection processes) associated with the removable electronics should be modified based on the configuration data. Examples of configuration data include, but are not limited to, pre-defined parameters such as sensing parameters associated with a particular sensor layout. For example, sensors may include various numbers of sensing elements, various spacing between sensing elements, various lengths or other dimensions of sensing elements, various sensing element materials from which the sensing elements are fabricated, and other differences that may affect the sensor data generated by the sensor. The configuration data may include or may be used by the removable electronics module to determine one or more pre-defined parameters that are associated with the touch sensor of a pre-fabricated sensor assembly of the interactive object in which the removable electronics modules has been inserted.

If one or more gesture detection processes are to be modified based on the configuration data, method 550 modifies the one or more gesture detection processes at 562. For example, the removable electronics module may apply one or more pre-defined parameters associated with particular type of sensor in response to determining that a gesture detection process is to be modified. In some examples, method 550 can include configuring one or more machine learned models associated with a gesture detection process at 562. Configuring the one or more machine learned models can include modifying one or more weights associated with the one or more machine learned models in example embodiments. For instance, the removable electronics device can be configured to detect one or more pre-defined motions by configuring one or more machine learned models for detecting the one or more pre-defined motions based at least in part on one or more first pre-defined parameters associated with a first touch sensor. The removable electronic device can be reconfigured to detect the one or more pre-defined motions by configuring the one or more machine learned models for detecting the one or more pre-defined motions based at least in part on one or more second pre-defined parameters associated with a second touch sensor. In some examples, the removable electronics device can configure one or more machine-learned models to detect one or more pre-defined motions using a set of weights associated with the pre-fabricated sensor assembly. In other examples, configuring the one or more machine learned models can include obtaining a particular machine learned model associated with a particular type of sensor. The removable electronics module can analyze, in response to the removable electronics device being physically coupled to a first pre-fabricated sensor assembly, touch data associated with the first pre-fabricated sensor assembly to detect one or more pre-defined motions based on the pre-defined parameters associated with the touch sensor of the first pre-fabricated sensor assembly. The removable electronics module can analyze, in response to the removable electronics device being physically coupled to a second pre-fabricated sensor assembly, touch data associated with the second pre-fabricated sensor assembly to detect one or more pre-defined motions based on the pre-defined parameters associated with the touch sensor of the second pre-fabricated sensor assembly.

At 564, method 550 can include determining whether one or more input/output (I/O) configurations of the removable electronics module are to be modified based on the configuration data. By way of example, some pre-fabricated sensor assemblies may include an output device such as an audible output device, a visual output device, and/or a haptic output device. Other pre-fabricated sensor assemblies may not include such an output device.

Accordingly, at 566, method 550 can include updating one or more function mappings to correspond with the interactive object type to which the removable electronics module has been connected. For instance, in response to determining that an interactive object includes a pre-fabricated sensor assembly with an output device, a function associated with a particular gesture may include initiating an output by the output device of the pre-fabricated sensor assembly. In response to determining that an interactive object includes a pre-fabricated sensor assembly without an output device, however, a function associated with the same gesture may include initiating an output by the removable electronics module.

At 568, the removable electronics module setup of method 500 completes.

Figure 22:
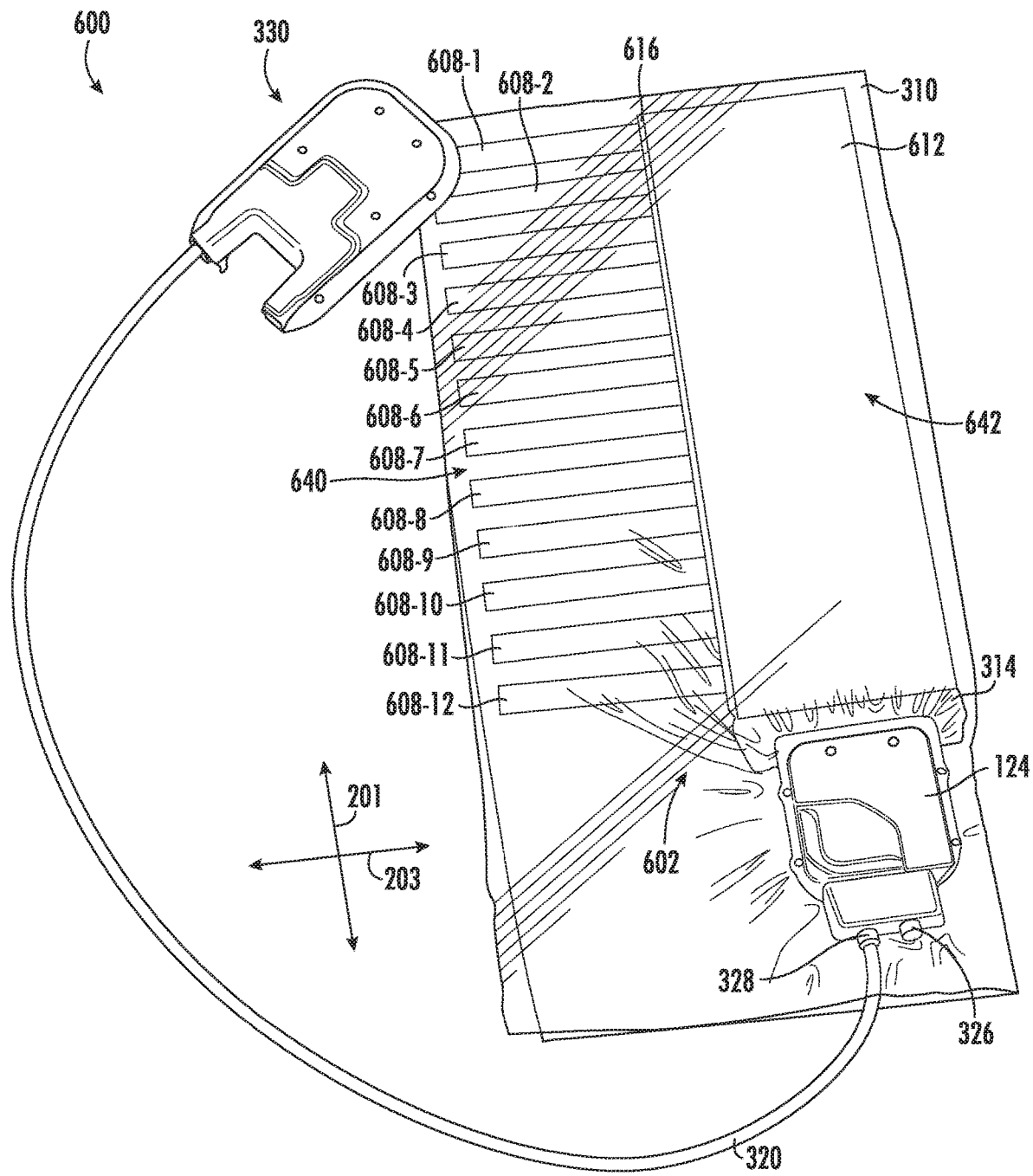
FIGS. 22-23 are top and bottom perspective views depicting an example of a pre-fabricated sensor assembly in accordance with example embodiments of the present disclosure.
Figure 23:
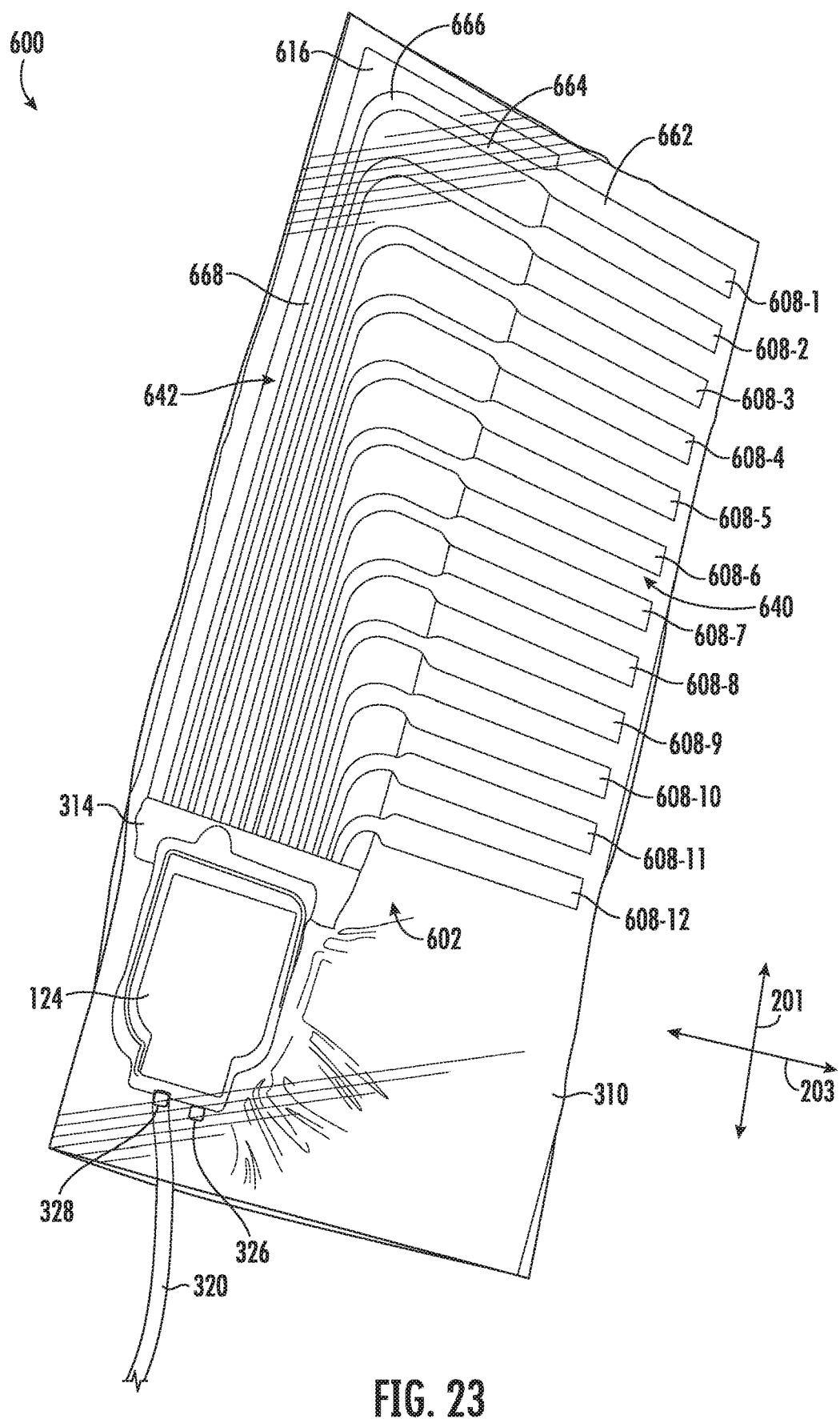
Figure 24:
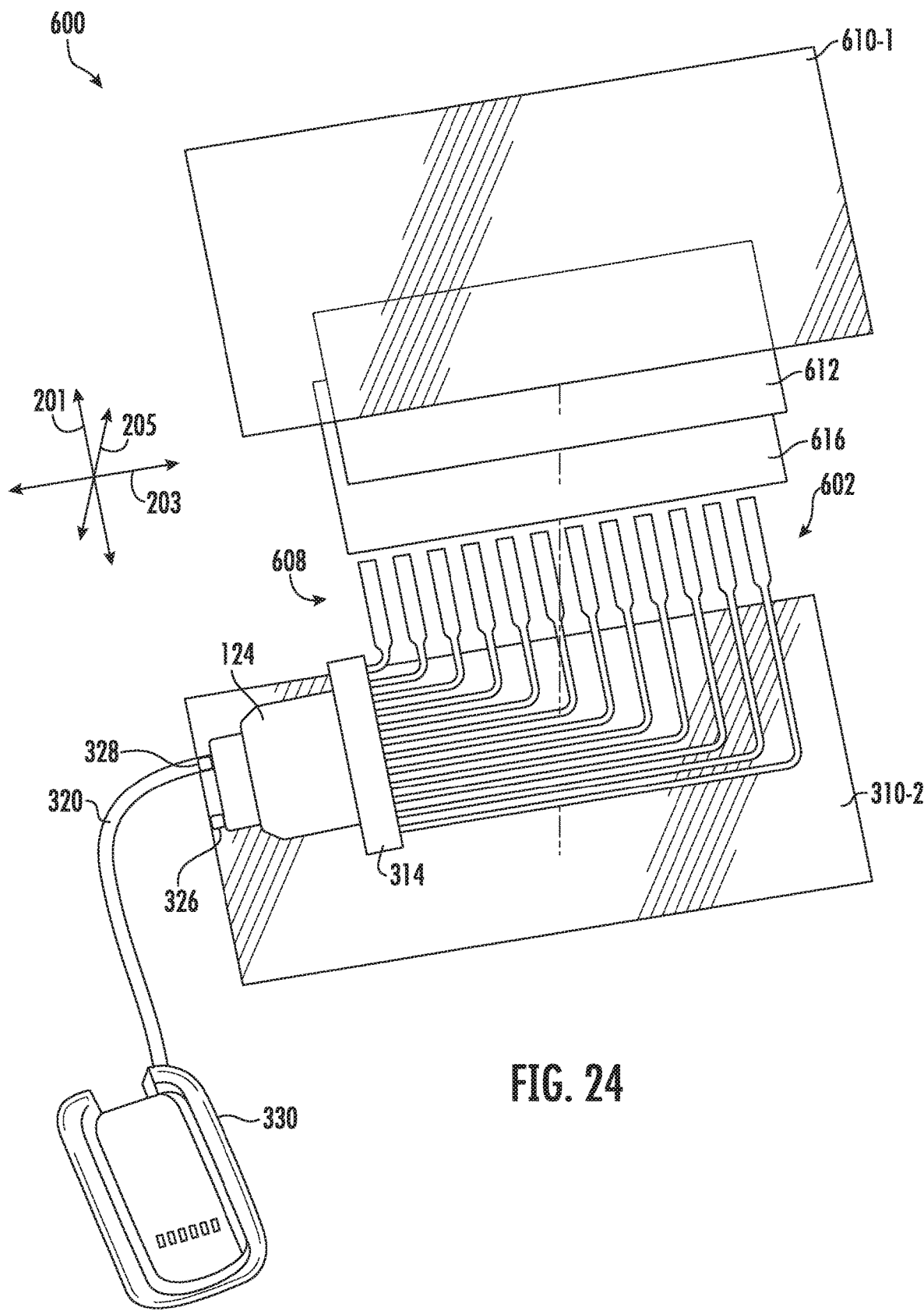
FIG. 24 is an exploded perspective view of the example pre-fabricated sensor assembly depicted in FIGS. 22-23 in accordance with example embodiments of the present disclosure.
Figure 25:
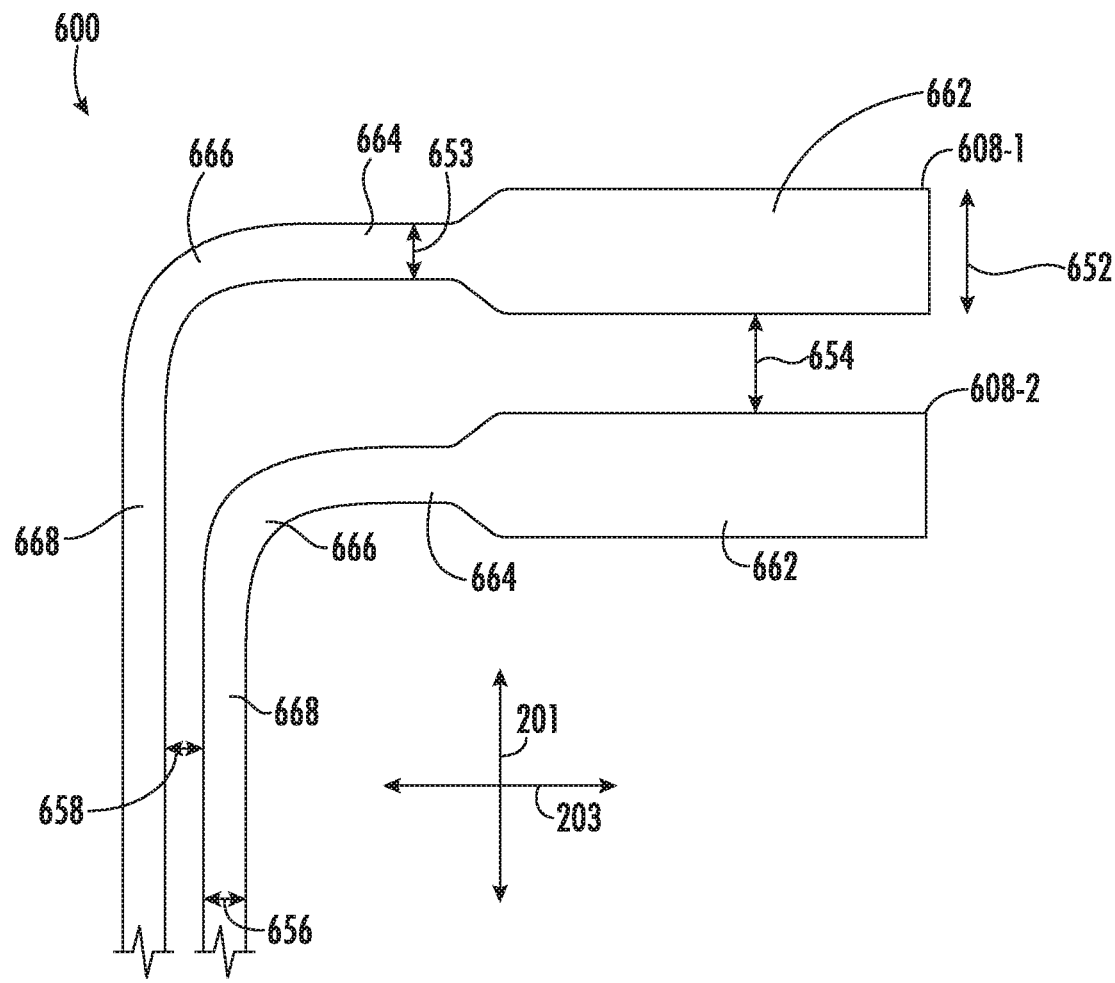
FIG. 25 is a top detailed view of a subset of the sensing lines of the example pre-fabricated sensor assembly depicted in FIGS. 22-24 in accordance with example embodiments of the present disclosure.

FIGS. 22-25 depict an example of another pre-fabricated sensor assembly 600 in accordance with example embodiments of the present disclosure. FIGS. 22 and 23 depict a top perspective view and a bottom perspective view of sensor assembly 600, respectively. FIG. 24 depicts an exploded perspective view of an example set of layers that can be used to form the pre-fabricated sensor assembly 600. FIG. 25 depicts a close-up view of a subset of the sensing lines used to form the capacitive touch sensor for sensor assembly 600.

Pre-fabricated sensor assembly 600 includes a touch sensor 602 that is formed from a plurality of conductive lines 608-1 through 608-12. Touch sensor 602 is one example of a touch sensor 102 as depicted in FIGS. 1 and 2. Conductive lines 608-1 through 608-12 are one example of sensing elements 108. Conductive lines 608-1 through 608-12 extend in a lateral direction parallel to a lateral axis 203 at a touch-sensitive area 640 of the touch sensor 602. Touch sensor 602 is a capacitive touch sensor in example embodiments. Conductive lines 608-1 through 608-12 include a curved section 666 that connects a second lateral section 664 of each conductive line to a longitudinal section 668 of each conductive line that extends in a direction parallel to longitudinal axis 601. The conductive lines are coupled to a connecting ribbon 314 with can be utilized to position the conductive lines for connection to a plurality of electrical contact pads (not shown) of internal electronics module 124. The plurality of conductive lines 608-1 through 608-2 can be collected and organized using ribbon 314 with a pitch that matches a corresponding pitch of connection points of an electronic component such as a component of internal electronics module 124.

The longitudinal section 668 of each conductive line extends in the longitudinal direction at a non-touch-sensitive area 642 of the touch sensor 102. More particularly, one or more shield layers 612 are formed over the longitudinal portion of each conductive line to form the non-touch-sensitive area 642. One or more adhesive layers 616 may be utilized to couple the plurality of conductive lines to the one or more shield layers 612 while optionally providing insulation therebetween. In some examples, the one or more shield layers 612 can be a conductive shield layer that is formed from the same or a similar material to conductive lines 608. In other examples, the one or more shield layers 612 may be one or more insulating layers. By utilizing the one or more shield layers 612, the touch-sensitive area 640 can be selectively formed at a desirable location of the touch sensor 102. In this particular example, the one or more shield layers 612 can be utilized to form a capacitive touch sensor that includes sensing lines that extend in the lateral direction with a spacing therebetween in the longitudinal direction. The longitudinal portion of each conductive line can be covered by the one or more shield layers 612 so that the touch sensor 602 is not touch-sensitive at that area. One or more shield layers may provide a ground in some examples. For instance, a ground can be provided for electrical fields originating in an area associated with the non-touch-sensitive area due to an approaching object such as a user's finger.

Internal electronics module 124 may include sensing circuitry (not shown) in electrical communication with the plurality of conductive lines 608-1 through 608-12. Internal electronics module 124 may include one or more communication ports. In the example of FIG. 3, internal electronics module 124 includes a communication port 326 and a communication port 328. Communication port 328 is coupled to a first end portion of the communications cable 320. Communication cable 320 is one example of a portion of a communication interface 162 as shown in FIG. 2. Communication cable 320 includes a second end portion that is coupled to a receptacle 330. Receptacle 330 is configured to removably connect a removable electronics module 150 (not shown) to the pre-fabricated sensor assembly 600 via communication cable 320. Receptacle 330 may be manufactured from a plastic, metal, polymer, or other suitable material. Receptacle 330 can include one or more electrical contacts not shown for electrically coupling the removable electronics module to the pre-fabricated sensor assembly 600. The receptacle can extend at least partially outside of the one or more flexible retaining layers to enable removable connection of an electronics module in some examples.

With reference to FIG. 24, pre-fabricated sensor assembly 600 may include an upper flexible retaining layer 310-1 and a lower flexible retaining layer 310-2. Between the retaining layers can be formed one or more shield layers 612, one or more adhesive layers 616, a set of conductive lines 608, and an internal electronics module 124. In some examples, a portion of communication cable 320 can be formed between the encapsulation layers as shown. In some examples, a single flexible retaining layer 610 may be utilized while still forming a housing for enclosing the touch sensor 602 and optionally other components such as internal electronics module 124. For instance, a single flexible retaining layer 310 may be folded with the touch sensor 602 and internal electronics module 124 formed therebetween.

The one or more flexible retaining layers can at least partially surround the first electronics module and the plurality of flexible sensing lines of the capacitive touch sensor. The communication cable can extend from within the housing of the one or more flexible retaining layers to outside of the one or more flexible retaining layers. The receptacle extends at least partially outside of the one or more flexible retaining layers to enable removable connection of the second electronics module.

The set of conductive lines 608, ribbon 314, and internal electronics module 124 can be positioned in a predetermined arrangement or sensor layout. Adhesive layer 616 and shield layer 612 can be positioned in a target location where the non-touch-sensitive area 642 is to be formed. The flexible retaining layers 610-1 and 610-2 can be positioned over in contact with the one or more shield layers 612 and under in contact with the set of conductive lines and internal electronics module 124. A vacuum sealing, thermal, pressure, bonding, or other technique may be utilized to adhere the upper flexible retaining layer 310-1 to the lower flexible retaining layer 310-2, thereby enclosing the internal elements within a housing formed by the applicable retaining layers. More particularly, internal electronics module 124 and the set of conductive lines 608 of the touch sensor 602 can be formed within a housing that is made by the flexible retaining layers 310-1 and 310-2.

With reference to FIG. 25, further details of the spacing and arrangement of conductive lines 608 in the example of pre-fabricated sensor assembly 600 is illustrated. A close-up view of a touch sensor is depicted showing a subset of the conductive lines including conductive line 608-1 and conductive line 608-2. Each conductive line includes a first lateral section 662 that extends in a direction parallel to lateral axis 603, a second lateral section 664 that extends in the direction parallel the lateral axis 603, and a longitudinal section 668 that extends in a longitudinal direction parallel to the longitudinal axis 601. Longitudinal section 668 is connected to the second lateral section 664 by curved section 666.

The first lateral section 662 of each conductive line 608 has a width 652. The second lateral section 664 has a smaller width 653. The second lateral portion of each sensing line can have a length that is different than each other second lateral portion. In this manner, the second portion of each flexible sensing line of the plurality of flexible sensing lines can have a length that is different than a length of the second portion of each other flexible sensing line of the plurality of flexible sensing lines.

The longitudinal section 668 includes an even smaller width 656. The lateral section 662 of the first conductive line 608-1 is separated from the lateral section 662 of second conductive line 608-2 by a distance 654. The longitudinal section 668 of the first conductive line 608-1 is separated from the longitudinal section 668 of the second conductive line 608-2 by a distance 658. The distance 654 between the lateral sections is greater than the distance 658 between the longitudinal section. Such a configuration can enable a sufficient spacing to be utilized in the touch-sensitive area to receive and distinguish touch inputs utilizing the conductive lines. Moreover, such a configuration can enable a smaller spacing to be utilized at the non-touch-sensitive area so as to conserve space and ultimately make a more compact device.

Additionally, the decreased spacing and width of the longitudinal extents can enable a tighter pitch to be utilized when connecting to ribbon 314 and ultimately to the sensing circuitry within internal electronics module 124. In such a manner, a tight or small spacing can be utilized to conserve space where connections are made but a larger spacing can be utilized at other areas where a touch input is desired to be detected.

In some examples, each sensing line of the plurality of flexible sensing lines can include a multilayered flexible film. The multilayered flexible film can include at least a flexible base layer and a metal layer that overlies the flexible base layer. In some examples, each sensing line of the plurality of flexible sensing lines includes a passivation layer that overlies the flexible base layer and separates the flexible base layer from the metal layer. For example, one or more passivation layers may be utilized to increase adhesion of the sensing lines to other surfaces. A electromagnetic field shielding fabric can be used to form the sensing lines in some examples.

In some examples, a continuous adhesive layer 616 can be coupled to a first surface of each of the plurality of flexible sensing lines. The continuous adhesive layer can be provided within the housing defined by the one or more flexible retaining layers.

In FIGS. 22-25, each sensing line of the plurality of flexible conductive lines 608 includes a longitudinal section 668 that extends in a first direction at a first portion of the pre-fabricated sensor assembly and a second lateral section 664 and/or 662 that extends in a second direction at a second portion of the pre-fabricated sensor assembly. The first direction and the second direction can be substantially orthogonal. A width of the first portion of each sensing line can be less than a width of the second portion of each sensing line.

In some examples, the capacitive touch sensor comprises an adhesive layer 616 including a first surface coupled to the longitudinal section 668 of each sensing line. The adhesive layer can include a second surface. A shield layer can be coupled to the second surface of the adhesive layer. The shield layer can extend over at least the wanted to longitudinal portion of each sensing line to provide a ground for electrical fields that result from touch input at the first portion of each sensing line. The lateral section 662 of each of the plurality of flexible sensing lines extends beyond an outer perimeter of the shield layer in some examples. In some examples, adhesive layer 616 and shield layer 612 can be combined into a single layer that includes both adhesive and shielding properties.

A similar pre-fabricated sensor assembly may additionally or alternatively include other types of sensors. For example, resistive touch sensors can be formed in a similar manner to capacitive touch sensors as described. Other types of sensors such as inertial measurement units, strain gauges, ultrasonic sensors, radar-based touch interfaces, image-based sensors, infrared sensors, etc. can be integrated within flexible retaining layers as described.

Figure 26:
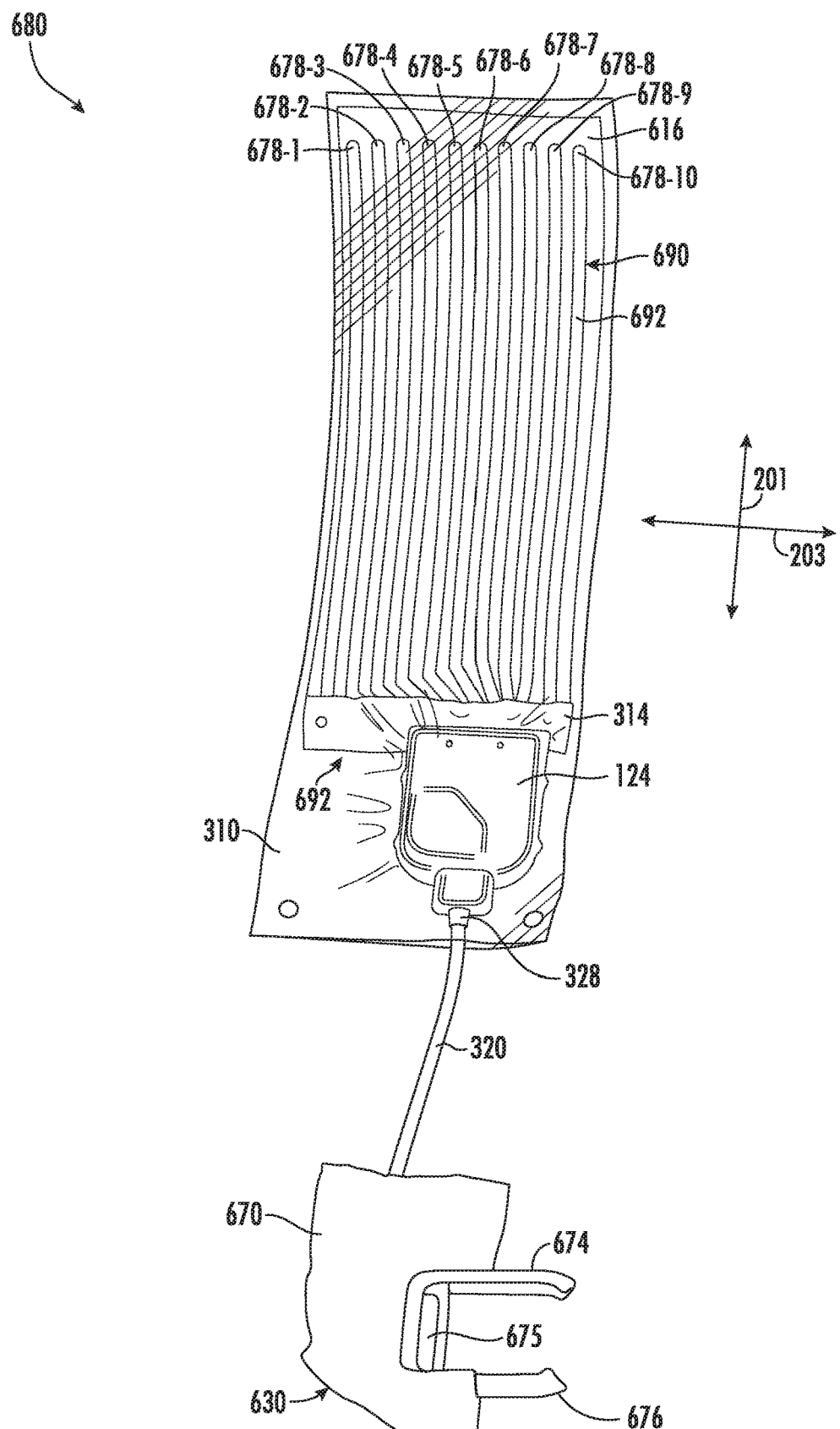
FIG. 26 is a front perspective view depicting another example of a pre-fabricated sensor assembly in accordance with example embodiments of present disclosure.
Figure 27:
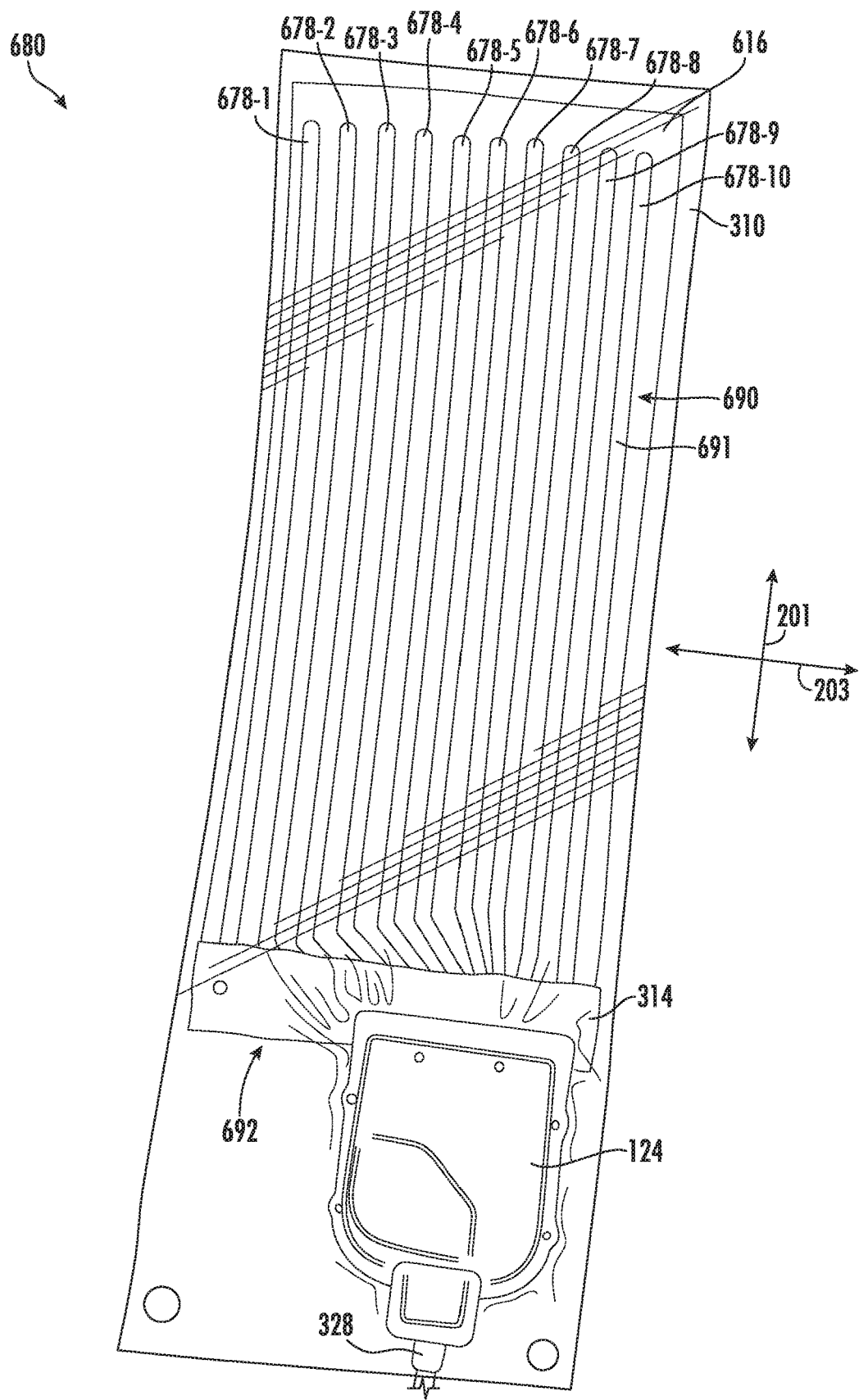
FIG. 27 is a detailed view of the example pre-fabricated sensor assembly depicted in FIG. 7 in accordance with example embodiments of the present disclosure.

FIGS. 26 and 27 depict a pre-fabricated sensor assembly 680 in accordance with another example embodiment of the disclosed technology. FIG. 26 is a front perspective view of the pre-fabricated sensor assembly 680 and FIG. 27 is a front detailed perspective view of the example pre-fabricated sensor assembly 680.

A plurality of sensing lines 678-1 through 678-10 comprising a multilayered film as described with respect to FIGS. 22-25 can be used. In FIG. 26, the plurality of conductive lines extend in a single direction (e.g., parallel to a direction of a longitudinal axis) to form a touch-sensitive area 690 of touch sensor 672. Touch sensor 672 can be configured as a capacitive touch sensor or resistive touch sensor in example embodiments.

The plurality of sensing lines are separated by a first spacing at a first portion of the capacitive touch sensor configured to receive touch input. A smaller or tighter spacing between the plurality of conductive lines can be utilized at second portion of the capacitive touch sensor where the sensing lines 678 are routed or otherwise positioned for attachment to the internal electronics module 124. In this example it can be seen that plurality of sensing lines have a tighter pitch or spacing at the second portion just prior to connection to the internal electronics module 124. In this manner, even though a single direction is utilized for the capacitive touch sensor, a tighter spacing can be provided to properly align the set of sensing lines 678 with electrical contact pads of the internal electronics module 124. In some examples, this arrangement can facilitate a tighter or more compact device architecture. Sensing lines can connect to the internal electronics with a small spacing, while also providing a larger spacing between the sensing lines at a touch-sensitive area of the capacitive touch sensor designed to receive touch input.

The plurality of sensing lines 678 of the pre-fabricated sensor assembly 670 can be attached to a flexible substrate. The flexible substrate can include continuous flexible substrate that attaches to each of the plurality conductive lines. In some examples, the flexible substrate comprises one or more adhesive layers 616 having an upper surface coupled to a lower surface of the flexible base layer of each of the plurality of conductive lines. Other types of flexible substrates may be used in other examples.

By utilizing a continuous flexible substrate that is attached to the plurality of sensing lines, a pre-defined sensor layout of the plurality of sensing elements can be maintained. The pre-defined sensor layout can be maintained while also providing a flexible structure. The flexible sensing lines and the substrate to which they are attached, in conjunction with flexible retaining layers, etc., can provide a pre-fabricated sensor assembly 300 that enables an efficient and simple technique for integrating a passive touch sensor into a base substrate of an existing object.

Communication cable 320 includes a first end portion coupled to a communication port 328 of internal electronics module 124 and a second end portion coupled to receptacle 630. In this example, receptacle 630 includes or is otherwise attached to a flexible attachment member 670. The flexible attachment member 670 can include a textile fabric or other flexible material in various embodiments. Flexible attachment member 670 can enable the attachment of receptacle 630 to an interactive object. For example, flexible attachment member 670 may be sewn to a substrate that is used to form an interactive object, enabling the receptacle 630 to be affixed to the interactive object. In this example, receptacle 630 includes a connector pad 675 and support members 674 and 676 configured to removably connect the removable electronics module to the pre-fabricated sensor assembly. The particular arrangement of receptacle 630 in FIG. 26 enables a removal electronics module 150 to be inserted within the extending support members 674 and 676 of receptacle 630 so that removable electronics module can be securely attached to receptacle 630 and thereby to an interactive object including the pre-fabricated sensor assembly 680.

Figure 28:
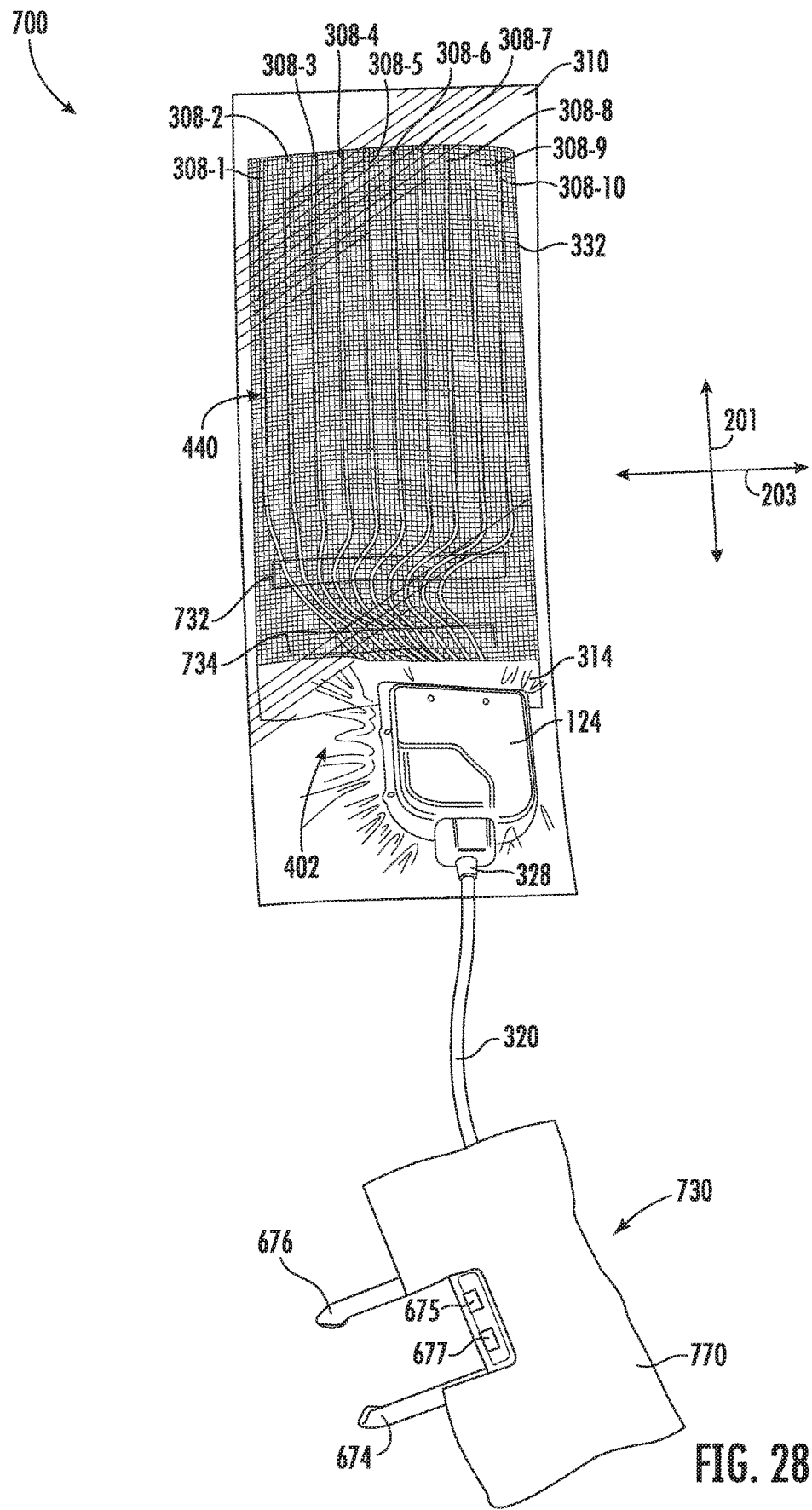
FIG. 28 is a front perspective view depicting an example of a pre-fabricated sensor assembly including conductive threads implemented as a set of conductive lines for a capacitive touch sensor in accordance with example embodiments of the present disclosure.
Figure 29:
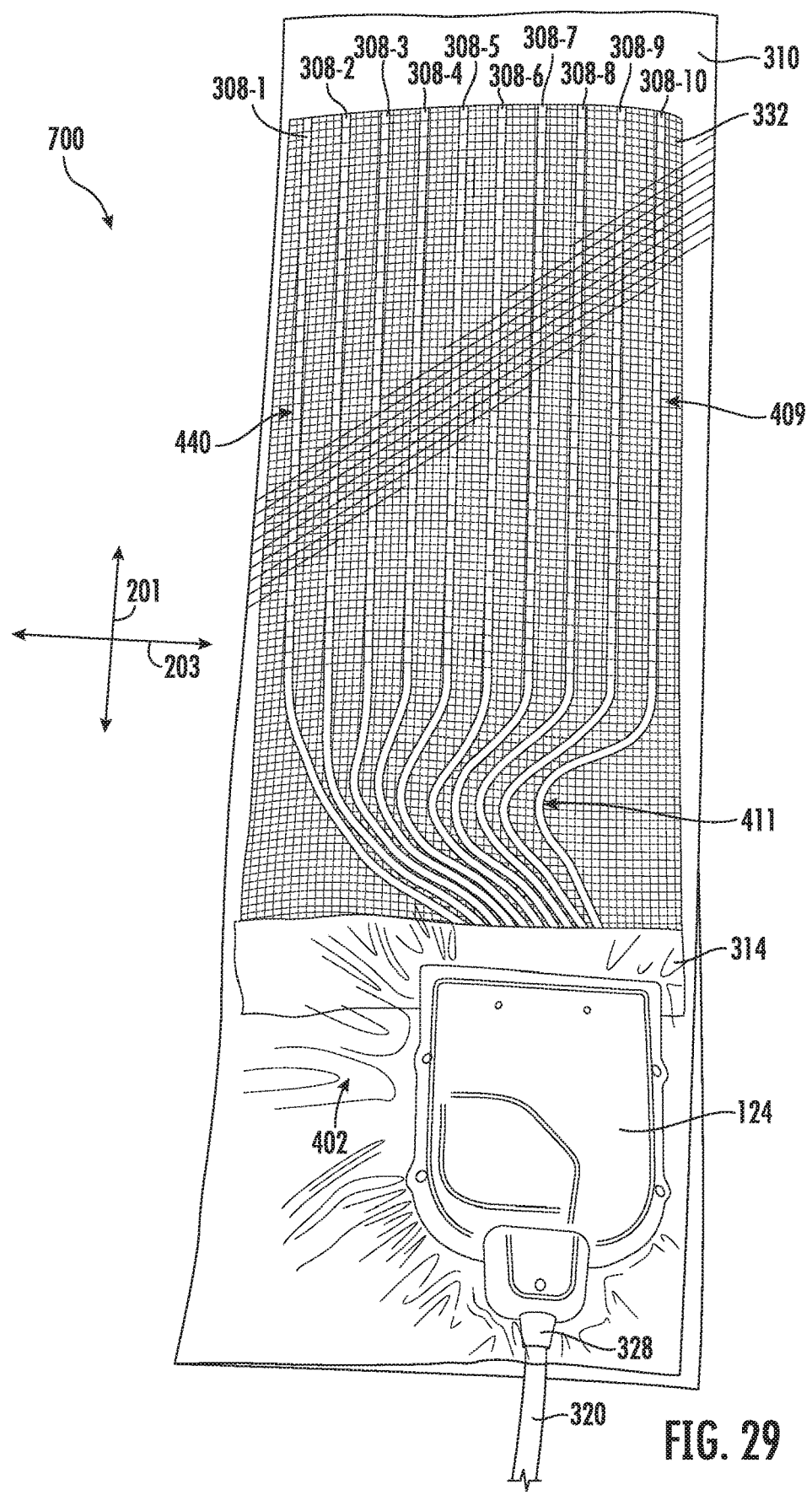
FIG. 29 is a detailed view of the example pre-fabricated sensor assembly depicted in FIG. 9 in accordance with example embodiments of the present disclosure.

FIGS. 28 and 29 illustrate another example of a pre-fabricated sensor assembly 700 in accordance with example embodiments of the present disclosure. FIG. 28 is a front perspective view of a sensor assembly 700 depicting a touch sensor 702, internal electronics module 124, and receptacle 630. FIG. 29 is a close-up front perspective view of sensor assembly 700 depicting additional details of touch sensor 702 and internal electronics module 124. Touch sensor 702 can be configured as a capacitive touch sensor or resistive touch sensor in example embodiments.

Pre-fabricated sensor assembly 700 includes one or more flexible retaining layers 310 that form a housing that encloses a touch sensor 702 and internal electronics module 124 as earlier described. More particularly, the one more flexible retaining layers at least partially surround touch sensor 702 and internal electronics module 124 to provide stability and to maintain a pre-defined arrangement and positioning of conductive threads 308-1 through 308-10 that form the touch sensor 702 in this example. Touch sensor 702 can be configured as a capacitive touch sensor or resistive touch sensor in example embodiments.

Conductive threads 308-1 through 308-10 are formed on or within a textile-based substrate 332 as earlier described. By way of example, textile-based substrate 332 may be formed by weaving, embroidering, stitching, or otherwise integrating conductive threads 308-1 through 308-10 with a set of nonconductive threads. In the example of FIG. 28, each conductive thread 308 includes a longitudinal portion 709 that extends in a longitudinal direction. Collectively the longitudinal portions of each conductive thread form a touch-sensitive area 440 for the touch sensor 702. Each conductive thread can include a loose portion 411 which is loose from the textile-based substrate 332. The loose portion 411 of each conductive thread can be formed by not weaving, embroidering, etc. the loose portions 411 with the nonconductive threads when forming textile-based substrate 332. The loose portions 411 may enable a more efficient and/or easy connection of the conductive threads to sensing circuitry within internal electronic module 124. As illustrated, the pitch between the conductive threads where they connect to the internal electronics module may be less than the pitch between the conductive threads at the touch-sensitive area 440. Such a design can enable a suitable spacing and arrangement of the conductive threads where the touch-sensitive area(s) are formed, while providing a tighter pitch to enable a compact arrangement where the conductive threads are connected to the sensing circuitry. In a particular example of FIG. 28, a ribbon 314 is utilized to gather and position the conductive threads at a pitch corresponding to a set of electrical contact pads (not shown) of internal electronics module 124. Ribbon 314 can be utilized to collect and organize the plurality of conductive threads 308 into a ribbon with a pitch that matches a corresponding pitch of connection points of an electronic component such as the sensing circuitry of internal electronics module 124.

An optional set of stabilizing members 732 and 734 are provided to selectively couple the loose portions 411 to the textile substrate to better facilitate positioning of the conductive threads relative to the ribbon 314. It is noted that stabilizing members 732 and 734 are optional. In some examples, stabilizing members 732 and 734 are formed from a film or other flexible material.

Internal electronics module 124 includes a single communication port 328 coupled to a first portion of communication cable 320. A second end portion of communication cable 320 is coupled to a receptacle 330. In this example, receptacle 330 includes or is otherwise attached to a flexible attachment member 470. The flexible attachment member 470 can include a textile fabric or other flexible material in various embodiments. Flexible attachment member 470 can enable the attachment of receptacle 330 to an interactive object. For example, flexible attachment member 470 may be sewn to a substrate that is used to form an interactive object, enabling the receptacle 730 to be affixed to the interactive object. In this example, receptacle 330 includes a connector having a set of electrical contact pads 675 and 677. In other examples, more or fewer electrical contacts may be utilized. The particular arrangement of receptacle 330 enables a removal electronics module 150 to be inserted within the extending members of receptacle 330 so that removable electronics module can be securely attached to receptacle 330 and thereby to an interactive object including the pre-fabricated sensor assembly 700.

Figure 30:
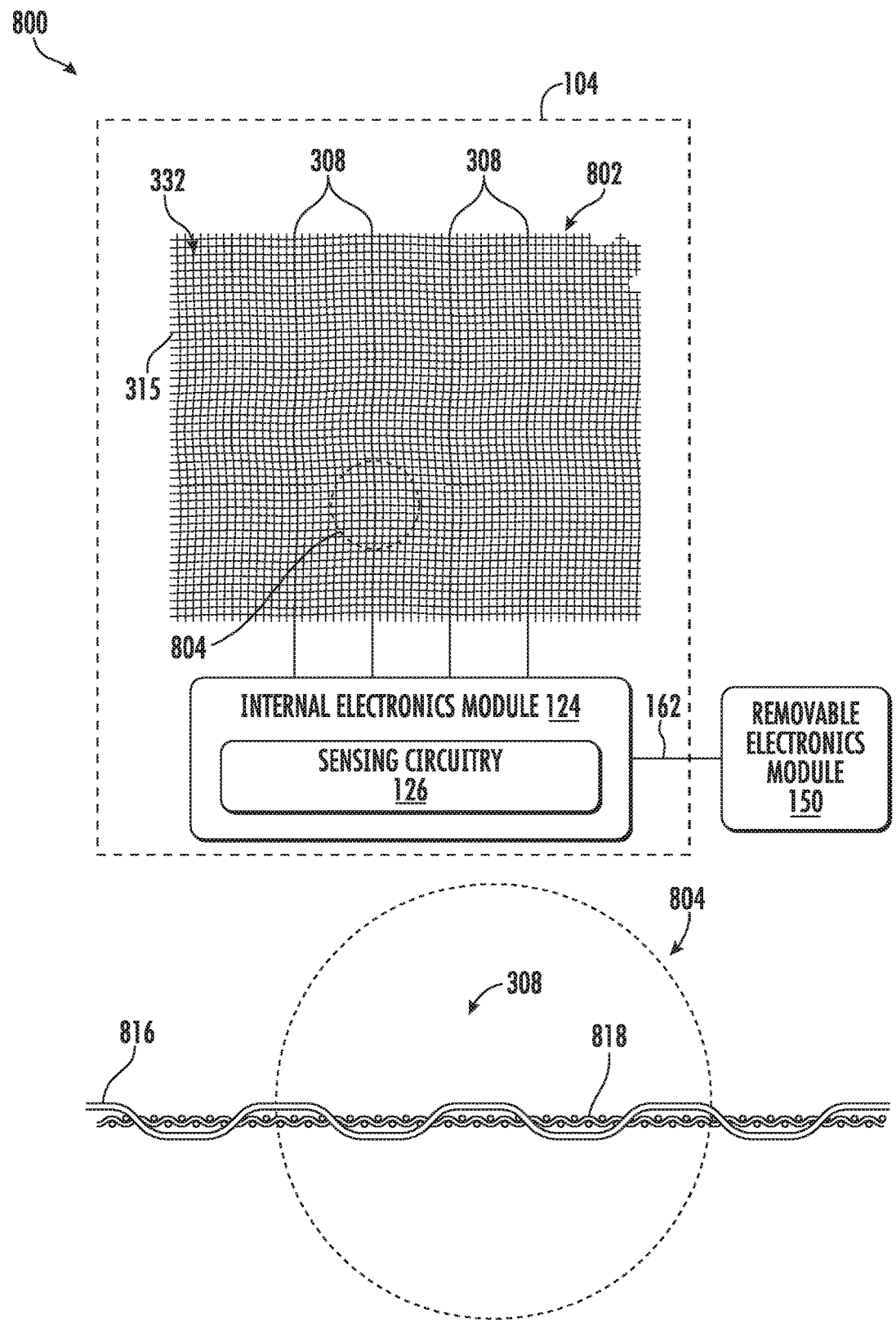
FIG. 30 illustrates an example of an interactive object with multiple electronics modules in accordance with example embodiments of the present disclosure.

FIG. 30 illustrates an example 800 of an interactive object 104 with multiple electronics modules in accordance with one or more implementations. In this example, touch sensor 802 of the interactive object 104 includes non-conductive threads 315 woven with conductive threads 308 to form touch sensor 802 (e.g., interactive textile). Non-conductive threads may correspond to any type of non-conductive thread, fiber, or fabric, such as cotton, wool, silk, nylon, polyester, and so forth. Touch sensor 802 can be configured as a capacitive touch sensor or resistive touch sensor in example embodiments. Together, non-conductive threads 315 and conductive threads 308 form a textile or textile-based substrate 820.

At 804, a zoomed-in view of conductive thread 308 is illustrated. Conductive thread 308 includes a conductive wire 816 or a plurality of conductive filaments that are twisted, braided, or wrapped with a flexible thread 818. As shown, the conductive thread 308 can be woven or otherwise integrated with the non-conductive threads to form a fabric or a textile-based substrate 332. Although a conductive thread and textile is illustrated, it will be appreciated that other sensing lines and substrates may be used, such as flexible metal lines formed on a plastic substrate.

In one or more implementations, conductive thread 308 includes a thin copper wire. It is to be noted, however, that the conductive thread 308 may also be implemented using other materials, such as silver, gold, or other materials coated with a conductive material. The conductive thread 308 may include an outer cover layer formed by braiding together non-conductive threads. The non-conductive threads may be implemented as any type of flexible thread or fiber, such as cotton, wool, silk, nylon, polyester, and so forth.

Touch sensor 802 can be formed efficiently and in a low-cost manner, using any conventional weaving process (e.g., jacquard weaving or 3D-weaving), which involves interlacing a set of longer threads (called the warp) with a set of crossing threads (called the weft). Weaving may be implemented on a frame or machine known as a loom, of which there are a number of types. Thus, a loom can weave non-conductive threads 315 with conductive threads 308 to create touch sensor 802.

The conductive threads 308 can be woven into the touch sensor 802 in any suitable pattern or array. In one embodiment, for instance, the conductive threads 308 may form a single series of parallel threads. For instance, in one embodiment, the capacitive touch sensor may comprise a single plurality of parallel conductive threads conveniently located on the interactive object, such as on the sleeve of a jacket. In an alternative embodiment, the conductive threads 308 may form a grid.

In the example of pre-fabricated sensor assembly 800, conductive thread 308 is woven into touch sensor 802 to form a sensor that includes a single set of substantially parallel conductive threads 308. In other examples, a second set of substantially parallel conductive threads 308 crosses the first set of conductive threads can be to form a grid.

In such an example (not shown), the first set of conductive threads 308 are oriented horizontally and the second set of conductive threads 308 are oriented vertically, such that the first set of conductive threads through a are positioned substantially orthogonal to the second set of conductive threads 308. It is to be appreciated, however, that conductive threads 308 may be oriented such that crossing conductive threads 308 are not orthogonal to each other. For example, in some cases crossing conductive threads 308 may form a diamond-shaped grid. While conductive threads 308 are illustrated as being spaced out from each other in FIG. 30, it is to be noted that conductive threads 308 may be weaved very closely together. For example, in some cases two or three conductive threads may be weaved closely together in each direction. Further, in some cases the conductive threads may be oriented as parallel sensing lines that do not cross or intersect with each other.

In the example of pre-fabricated sensor assembly 800, sensing circuitry 126 is shown as being integrated within object 104, and is directly connected to conductive threads 308. During operation, sensing circuitry 126 can determine positions of touch-input on the conductive threads 308 using self-capacitance sensing or projective capacitive sensing. For example, sensing circuitry 126 can detect a change in capacitance associated with one or more conductive threads 308.

Although not illustrated, sensing elements such as conductive threads 308 may be implemented as a grid of sensing lines. For example, when configured as a self-capacitance sensor, sensing circuitry 126 can charge crossing conductive threads 308 (e.g., horizontal and vertical conductive threads) by applying a control signal (e.g., a sine signal) to each conductive thread 308. When an object, such as the user's finger, touches or comes in proximity to the parallel arrangement or grid of conductive thread 308, the conductive threads 308 that are touched are grounded, which changes the capacitance (e.g., increases or decreases the capacitance) on the touched conductive threads 308.

Sensing circuitry 126 uses the change in capacitance to identify the presence of the object. If a grid of conductive threads is used, sensing circuitry 126 detects a position of the touch-input by detecting which horizontal conductive thread 308 is touched, and which vertical conductive thread 308 is touched by detecting changes in capacitance of each respective conductive thread 308. Sensing circuitry 126 uses the intersection of the crossing conductive threads 308 that are touched to determine the position of the touch-input on the grid of conductive threads 308. For example, sensing circuitry 126 can determine touch data by determining the position of each touch as X,Y coordinates on the grid of conductive thread 308.

When implemented as a self-capacitance sensor, "ghosting" may occur when multi-touch-input is received. Consider, for example, that a user touches a grid of conductive thread 308 with two fingers. When this occurs, sensing circuitry 126 determines X and Y coordinates for each of the two touches. However, sensing circuitry 126 may be unable to determine how to match each X coordinate to its corresponding Y coordinate. For example, if a first touch and the second touch have different coordinates, sensing circuitry 126 may also detect "ghost" coordinates.

In one or more implementations, sensing circuitry 126 is configured to detect "areas" of touch-input corresponding to two or more touch-input points on the grid of conductive thread 308. Conductive threads 308 may be weaved closely together such that when an object touches the grid of conductive thread 308, the capacitance will be changed for multiple horizontal conductive threads 308 and/or multiple vertical conductive threads 308. For example, a single touch with a single finger may generate the coordinates. Sensing circuitry 126 may be configured to detect touch-input if the capacitance is changed for multiple horizontal conductive threads 308 and/or multiple vertical conductive threads 308. Note that this removes the effect of ghosting because sensing circuitry 126 will not detect touch-input if two single-point touches are detected which are spaced apart.

Alternately, when implemented as a projective capacitance sensor, sensing circuitry 126 charges a single set of conductive threads 308 (e.g., horizontal conductive threads 308) by applying a control signal (e.g., a sine signal) to the single set of conductive threads 308. Then, sensing circuitry 126 senses changes in capacitance in the other set of conductive threads 308 (e.g., vertical conductive threads 308).

In this implementation, vertical conductive threads 308 are not charged and thus act as a virtual ground. However, when horizontal conductive threads 308 are charged, the horizontal conductive threads capacitively couple to vertical conductive threads 308. Thus, when an object, such as the user's finger, touches the grid of conductive thread 308, the capacitance changes on the vertical conductive threads (e.g., increases or decreases). Sensing circuitry 126 uses the change in capacitance on vertical conductive threads 308 to identify the presence of the object. To do so, sensing circuitry 126 detects a position of the touch-input by scanning vertical conductive threads 308 to detect changes in capacitance. Sensing circuitry 126 determines the position of the touch-input as the intersection point between the vertical conductive thread 308 with the changed capacitance, and the horizontal conductive thread 308 on which the control signal was transmitted. For example, sensing circuitry 126 can determine touch data by determining the position of each touch as X,Y coordinates on the grid of conductive thread 308.

Whether implemented as a self-capacitance sensor or a projective capacitance sensor, the conductive thread 308 and sensing circuitry 126 is configured to communicate the touch data that is representative of the detected touch-input to removable electronics module 150, which is removably coupled to interactive object 104 via communication interface 162. The microprocessor 152 may then cause communication of the touch data, via network interface 156, to computing device 106 to enable the device to determine gestures based on the touch data, which can be used to control object 104, computing device 106, or applications implemented at computing device 106. In some implementations, a gesture may be determined by the internal electronics module and/or the removable electronics module and data indicative of the gesture can be communicated to a computing device 106 to control object 104, computing device 106, or applications implemented at computing device 106.

The computing device 106 can be implemented to recognize a variety of different types of gestures, such as touches, taps, swipes, holds, and covers made to touch sensor 102. To recognize the various different types of gestures, the computing device can be configured to determine a duration of the touch, swipe, or hold (e.g., one second or two seconds), a number of the touches, swipes, or holds (e.g., a single tap, a double tap, or a triple tap), a number of fingers of the touch, swipe, or hold (e.g., a one finger-touch or swipe, a two-finger touch or swipe, or a three-finger touch or swipe), a frequency of the touch, and a dynamic direction of a touch or swipe (e.g., up, down, left, right). With regards to holds, the computing device 106 can also determine an area of the grid of conductive thread 308 that is being held (e.g., top, bottom, left, right, or top and bottom. Thus, the computing device 106 can recognize a variety of different types of holds, such as a cover, a cover and hold, a five finger hold, a five finger cover and hold, a three finger pinch and hold, and so forth.

Figure 31:
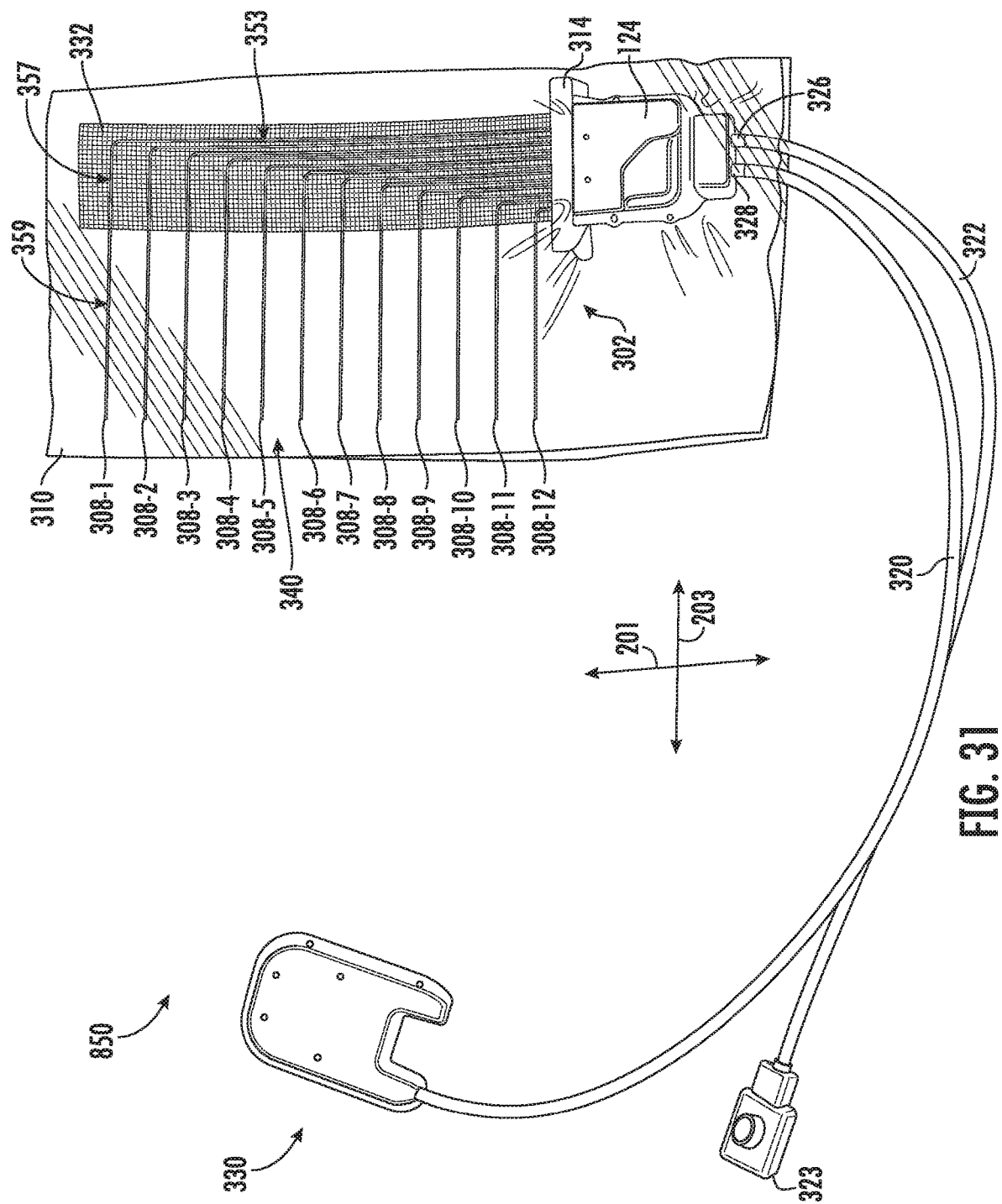
FIG. 31 is a front perspective view depicting another example of a pre-fabricated sensor assembly including conductive threads implemented as a set of conductive lines for a capacitive touch sensor in accordance with example embodiments of the present disclosure.

FIG. 31 illustrates an example of a pre-fabricated sensor assembly 850 in accordance with example embodiments of the present disclosure. FIG. 31 is a top view of sensor assembly 850 depicting a touch sensor 302 as illustrated in FIG. 8, internal electronics module 124, receptacle 330, communication cable 320, and communication cable 322. FIG. 31 depicts another example where the sensing lines are formed from a plurality of conductive threads 308-1 through 308-12. Similar to the example depicted in FIG. 8, the plurality of conductive threads 308 are woven or otherwise integrated with one or more nonconductive threads or another flexible material to form a flexible substrate 332. Touch sensor 302 can be configured as a capacitive touch sensor or resistive touch sensor in example embodiments.

More particularly, in this example each conductive thread 308 includes a longitudinal section 353 that extends in a longitudinal direction from ribbon 314. In some examples, the longitudinal section 353 may be integrated with the flexible substrate 332 such as by weaving the longitudinal section 353 with the one or more nonconductive threads to form the flexible substrate 332. Each conductive thread also includes a curved section that attaches the longitudinal extent to a first lateral section 357. In some embodiments, the first lateral section 357 can also be integrated with the flexible substrate, such as by weaving, embroidering, etc. In other examples, the first lateral section 357 or a portion thereof may be loose from the flexible substrate 332 such that it is movable relative to the flexible substrate. Each conductive thread includes a second lateral section 359 that extends beyond the outer perimeter of the flexible substrate 332. Collectively, the second lateral section 359 of the plurality of conductive threads forms a touch-sensitive area 340 for touch sensor 302.

One or more flexible retaining layers 310 can be used to form a housing for touch sensor 302 and internal electronics module 124. In this example, internal electronics module 124 is included within the flexible retaining layers 310. By way of example, a vacuum sealing, heat sealing, and/or another technique can be used such that the second lateral section 359 of each of the conductive threads is formed within the sensor assembly at a pre-defined location and spacing relative to the other conductive threads. The one or more flexible retaining layers can facilitate such positioning and spacing of the conductive threads while allowing the conductive threads to extend beyond the outer perimeter of the flexible substrate on which they are at least partially formed.

The conductive threads may be spaced from one another by a variable distance to facilitate a compact arrangement while also providing a suitable space for the capacitive touch sensor. As illustrated in FIG. 31, for example, the longitudinal section 353 of each conductive thread is spaced from an adjacent longitudinal section 353 of another conductive thread by a distance that is less than a distance between the lateral section 359 of each conductive thread. In this manner, a tight spacing or pitch between the longitudinal sections can be utilized to facilitate connection to the internal electronics module 124 at a smaller pitch or spacing between threads than is used at the touch-sensitive area 340. At the touch-sensitive area 340, the distance between the lateral sections can be made greater to facilitate a capacitive touch sensor that is suitably receptive to touch input.

Internal electronics module 124 includes a plurality of ports including a communication port 326 and a communication port 328. Communication port 326 is coupled to a first end portion of communication cable 320. Communication cable 320 includes a second end portion that is coupled to a receptacle 330. Communication port 328 is coupled to a first end portion of a communication cable 322. The second end portion of communication cable 322 is coupled to an output device 323. Output device 323 can be a visual output device including one or more LEDs for providing a visual output response to touch input received at the capacitive touch sensor, as well as to input from one or more computing devices 106. In other examples, communication cable 322 may be coupled to other types of input and/or output devices, such as audio output devices (e.g., speakers) and/or haptic output devices (e.g., haptic motors). Object 104 may also include one or more output devices configured to provide a haptic response, a tactical response, an audio response, a visual response, or some combination thereof. A communication cable may attach or otherwise coupled to output devices such as one or more output devices configured to provide a haptic response, tactical response, audio response, a visual response, or some combination thereof. Output devices may include visual output devices, such as one or more light-emitting diodes (LEDs), audio output devices such as one or more speakers, one or more tactile output devices, and/or one or more haptic output devices.

Figure 32:
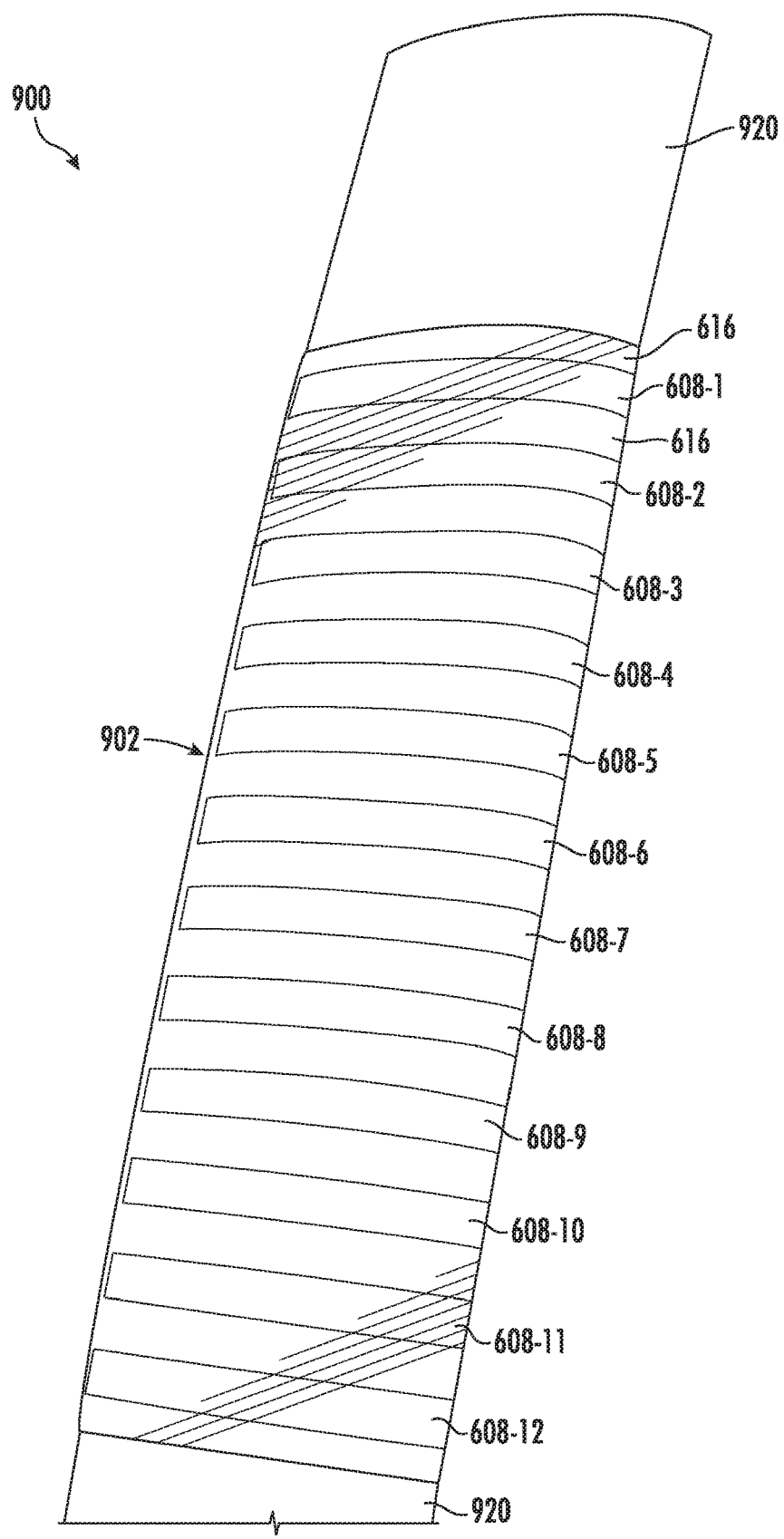
FIG. 32 is a front perspective view depicting an example of a pre-fabricated sensor assembly attached to a strap of an interactive garment accessory in accordance with example embodiments of the present disclosure.
Figure 33:
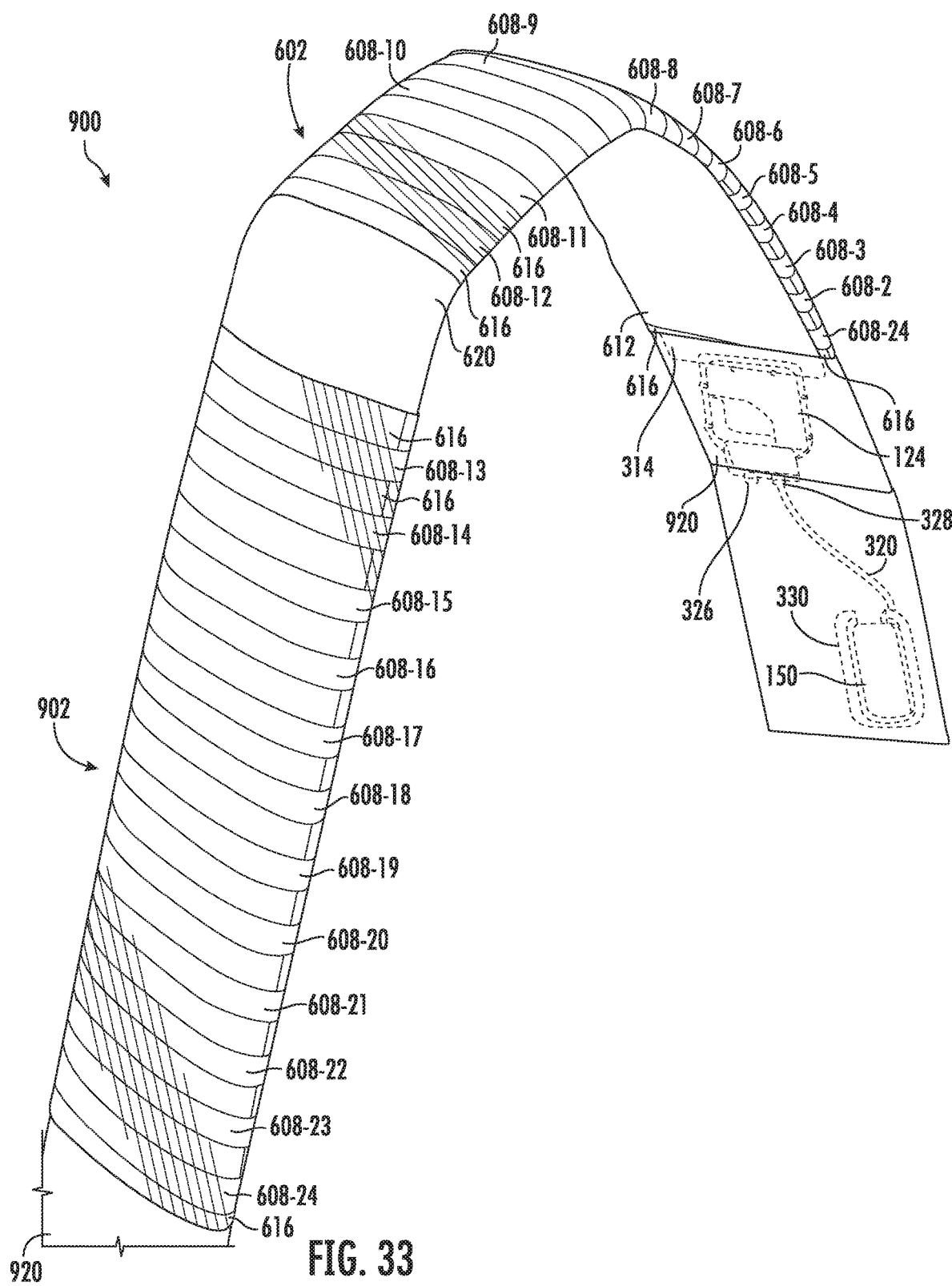
FIG. 33 is a side perspective view depicting the example pre-fabricated sensor assembly and interactive garment accessory depicted in FIG. 13 in accordance with example embodiments of the present disclosure.

FIGS. 32-33 illustrate an example of an interactive object 900 in accordance with example embodiments of the disclosed technology. In this example, interactive object 900 is depicted as strap or other flexible member. By way of example, interactive object 900 may include a strap of a backpack, satchel, purse, bag, or other object. In this manner, interactive object 900 may comprise an object suitable for its primary purpose and that is intended for attachment to another object to form a final product. FIG. 32 is a front perspective view of a portion of an example interactive object in which a pre-fabricated sensor assembly in accordance with example embodiments is integrated. FIG. 33 is a side perspective view of the example interactive object in which a pre-fabricated sensor assembly in accordance with example embodiments is integrated.

A pre-fabricated sensor assembly can be attached to the pre-fabricated strap substrate which can be formed of one or more flexible object substrates. By way of example, a strap can be formed from a flexible foam material, a flexible woven or non-woven fabric, or other flexible material. In some examples, a strap can be formed from one or more rigid materials. A touch sensor 902 of the pre-fabricated sensor assembly includes a plurality of conductive lines 608-1 through 608-24 similar to those illustrated in FIG. 22. Each of the sensing lines may include a multilayer conductive line structure as earlier described. In other examples, each of the sensing lines may include a conductive thread. Touch sensor 902 can be configured as a capacitive touch sensor or resistive touch sensor in example embodiments.

In the particularly described example, the plurality of conductive lines are formed along the first surface of object substrate 920. The plurality of conductive lines may also extend long the rear surface of the object substrate 920. In some examples, one or more shield layers 612 may be applied over plurality of sensing lines at the rear surface of the objects substrate. One or more adhesive layers 616 may be used to attach the plurality of sensing lines to the object substrate. The one or more adhesive layers may be formed over the plurality of sensing lines or under the plurality of sensing lines. In other examples, a glue, heat, or other techniques may be used to attach the plurality of sensing lines to the object substrate. In some examples, the substrate may be folded to encapsulate the plurality of sensing lines such that the rear surface of the plurality of sensing lines will be separated from the user other object that may come in contact with the strap.

FIG. 32 illustrates that the plurality of sensing lines may be divided into sections with a space therebetween. For example, sensing lines 908-1 through 908-12 may form a first touch-sensitive area while the sensing lines 908-13 through 908-24 may form a second touch-sensitive area. In some examples, sensing lines 908-1 through 908-12 may form a first capacitive touch sensor in the sensing lines 908-13 through 908-24 may form a second capacitive touch sensor. In other examples sensing lines 908-1 through 908-24 can form a single touch sensor.

In some examples, the touch sensor 902 can be formed by folding a sensor assembly 600. For example internal electronics module 124 can be formed between two layers of foam that form the strap of the backpack. The internal electronics module 124 can be placed in other locations in other examples. Receptacle 330 is integrated within the strap. A portion of receptacle 330 can be exposed to facilitate user removal and insertion of removable electronics module 150. In other examples, receptacle may be formed within a main body portion of the backpack, or at another location.

Figure 34:
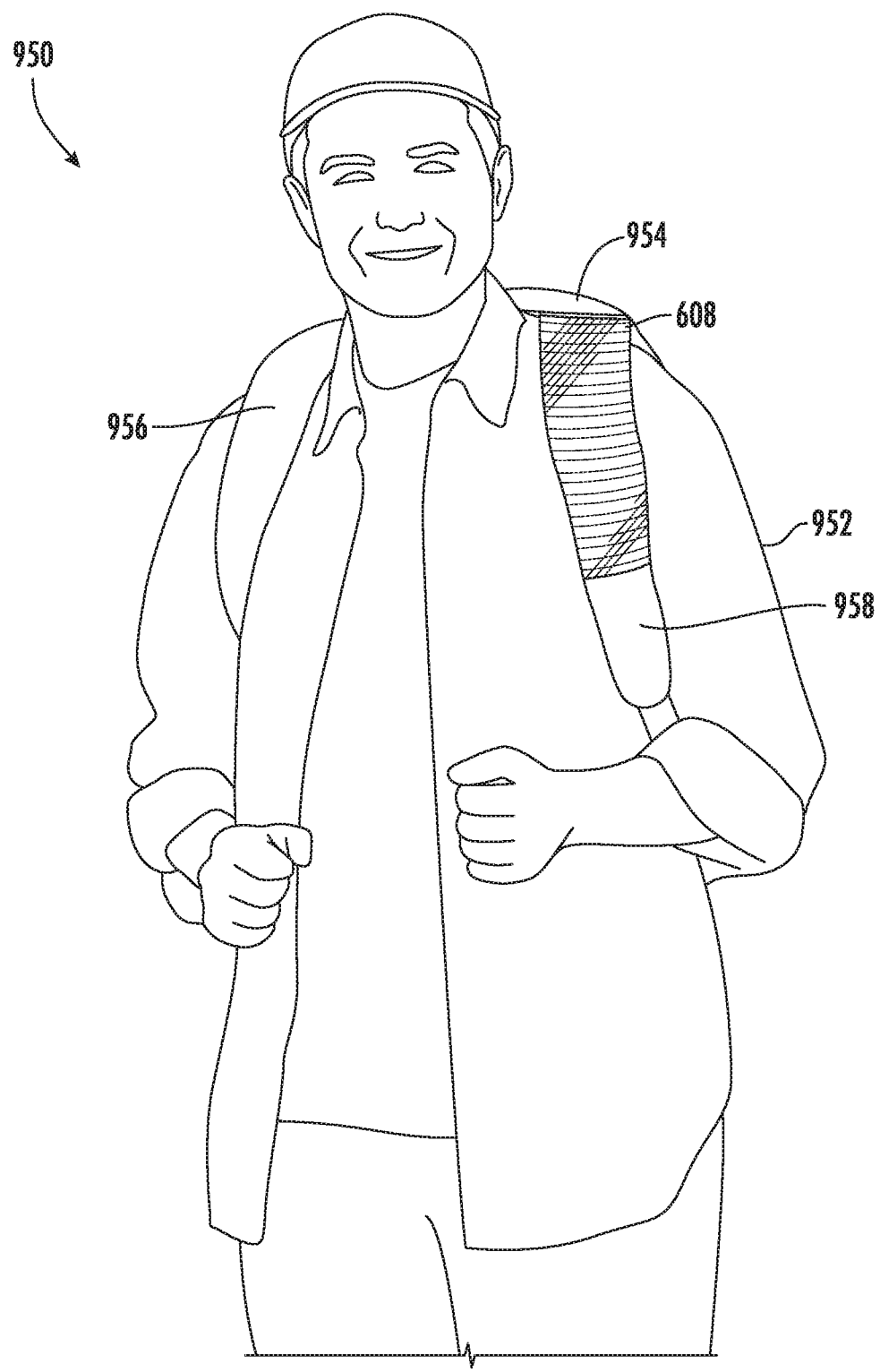
FIG. 34 is an illustration of a person wearing an interactive backpack including a pre-fabricated sensor assembly in accordance with example embodiments of the present disclosure.

FIG. 34 illustrates a user 952, wearing an interactive backpack 954 comprising a strap 956 and a strap 958. Strap 958 incorporates a pre-fabricated sensor assembly in accordance with example embodiments has been integrated. In the particularly described example, the plurality of sensing lines 908 of a capacitive touch sensor are formed on a strap as earlier described.

Although FIG. 34 depicts the plurality of sensing lines 608 that are visible, the plurality of sensing lines may be hidden in other examples. For instance, one or more layers may be formed over the plurality of sensing lines such that the plurality of sensing lines are hidden from view.

Figure 35:
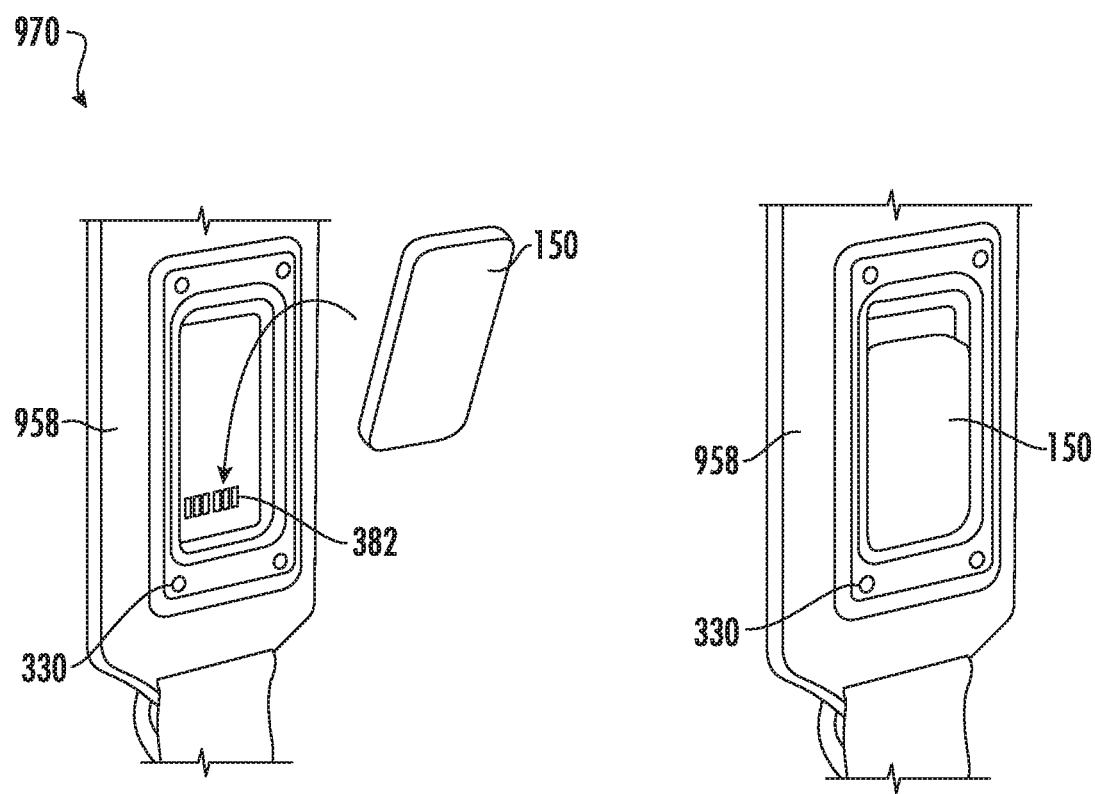
FIG. 35 depicts a receptacle of a pre-fabricated sensor assembly and illustrates a removable electronics module being physically coupled to an interactive object via the receptacle in accordance with example embodiments of the present disclosure.

Receptacle 330 can be coupled to the touch sensor 902 that is integrated within a strap or other portion of an interacted object as shown in FIG. 35 in some examples. By way of example, a receptacle can be integrated in a portion of the backpack such as within an interior portion of the backpack. In another example, a receptacle can be integrated within a rear portion of the strap for example. Touch sensor 902 can be configured as a capacitive touch sensor or resistive touch sensor in example embodiments.

FIG. 35 illustrates an example receptacle 330 of a pre-fabricated sensor assembly 970 in accordance with example embodiments. In the example depicted in FIG. 35, receptacle 330 is integrated within a rear portion of the strap 958 of an interactive object such as an interactive garment, interactive garment container, or interactive garment accessory.

In some examples, a portion of the object substrate or other portion of the interactive object can be molded to secure the receptacle in the interactive object. In other examples, receptacle 330 can be glued, bonded, or otherwise coupled to an object substrate of the interactive object.

FIG. 35 illustrates that a removable electronics module 150 may be removably connected to the receptacle by inserting the removable electronic module into the receptacle. Receptacle 330 may include one or more electrical contact pads 382 configured to provide electrical communication between the removable electronics module 150 and the pre-fabricated sensor assembly.

Figure 36:
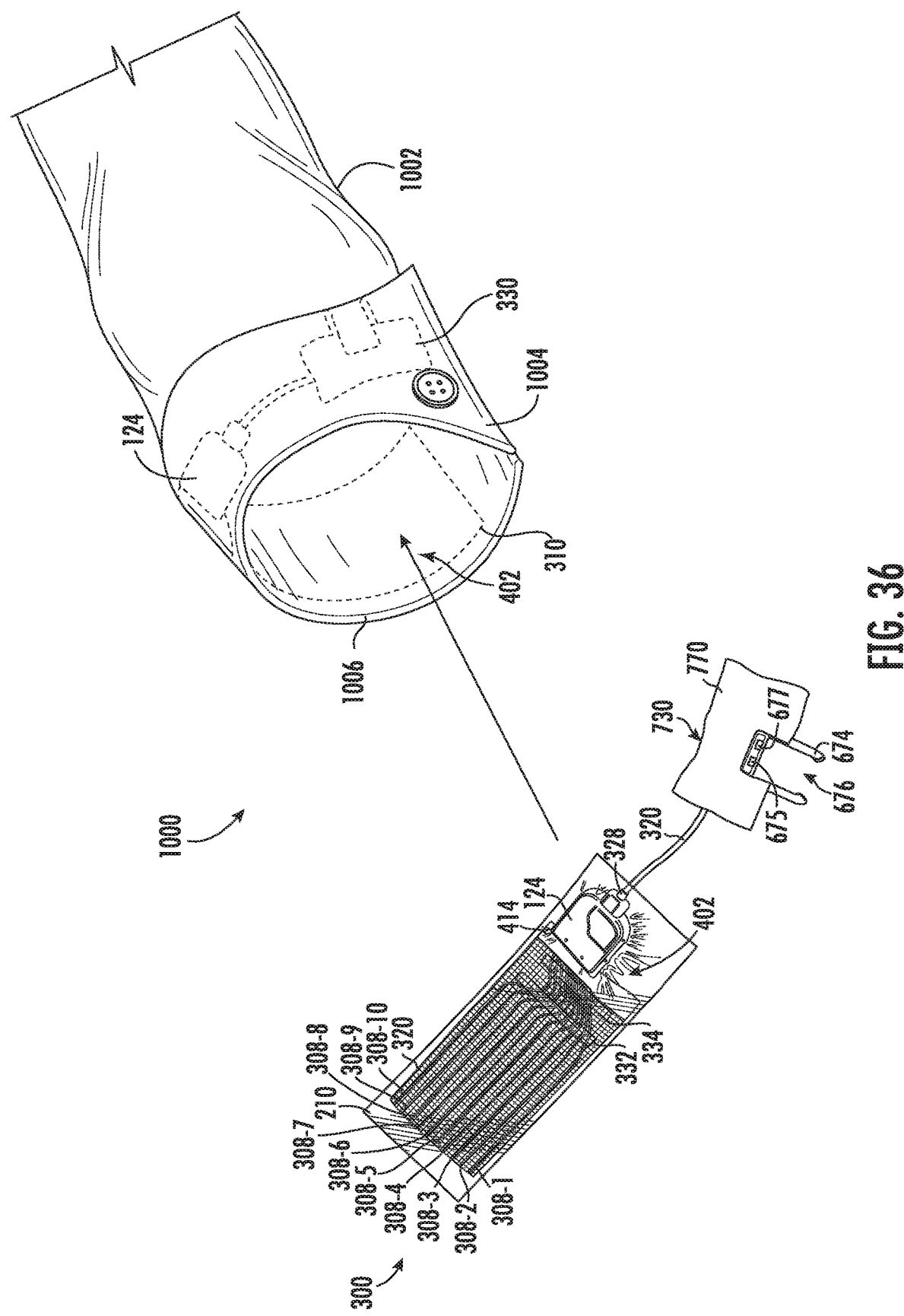
FIG. 36 is an illustration of an interactive garment depicting the insertion of a pre-fabricated sensor assembly into the interactive garment in accordance with example embodiments of the present disclosure.

FIG. 36 illustrates an example of an interactive object such as an interactive garment including a sleeve 1002 in which a pre-fabricated sensor assembly 300 in accordance with one or more embodiments is being attached. FIG. 36 illustrates an example of attaching a pre-fabricated sensor assembly to an at least partially preformed object in accordance with example embodiments. FIG. 36 depicts an example including an interactive garment, having a sleeve 1002 in which pre-fabricated sensor assembly 300 is to be integrated. It is noted that the use of pre-fabricated sensor assembly 300 is provided by way of example only. Any of the pre-fabricated sensor assemblies as described herein may be used.

In some examples, pre-fabricated sensor assembly 300 can be applied to the inside portion of the cuff 1004. For example, pre-fabricated sensor assembly 300 can be positioned such that the plurality of sensing lines are adjacent to the inside surface of the textile substrate that forms the interactive object. In some examples, a shield layer may be utilized to inhibit touch inputs between the user's arm or other portion that may be on the inside surface of the sleeve. In some examples, a heat pressing or other thermal application may be applied to connect the one or more retaining layers to the textile substrate. In other examples, other fastening techniques such as gluing, sewing, bonding, or other techniques may be used.

Pre-fabricated sensor assembly 300 can be inserted in an opening 1006. The cuff 1004 of the interactive object can include an opening 1006. The opening 1006 in the cuff is one example of a receiving feature of an interactive object. The pre-fabricated sensor assembly 300 can be inserted in the opening 1006 after the sleeve has been formed. After inserting the pre-fabricated sensor assembly, one or more processes can be used to attach the pre-fabricated sensor assembly to the textile substrate. After attaching the pre-fabricated sensor assembly, opening 1006 may be close by sewing or another technique. It is noted however, that the pre-fabricated sensor simply can be inserted directly within the cuff without utilizing an opening in some examples. The plurality of sensing lines can extend circumferentially around at least a portion of the cuff. In this manner, a user wearing the interactive jacket can provide swipe or other motions in a direction along the direction of the sleeve to provide swipe gestures and other gestures using the interactive garment. It is noted that other arrangements of the plurality of sensing lines may be used.

Figure 37:
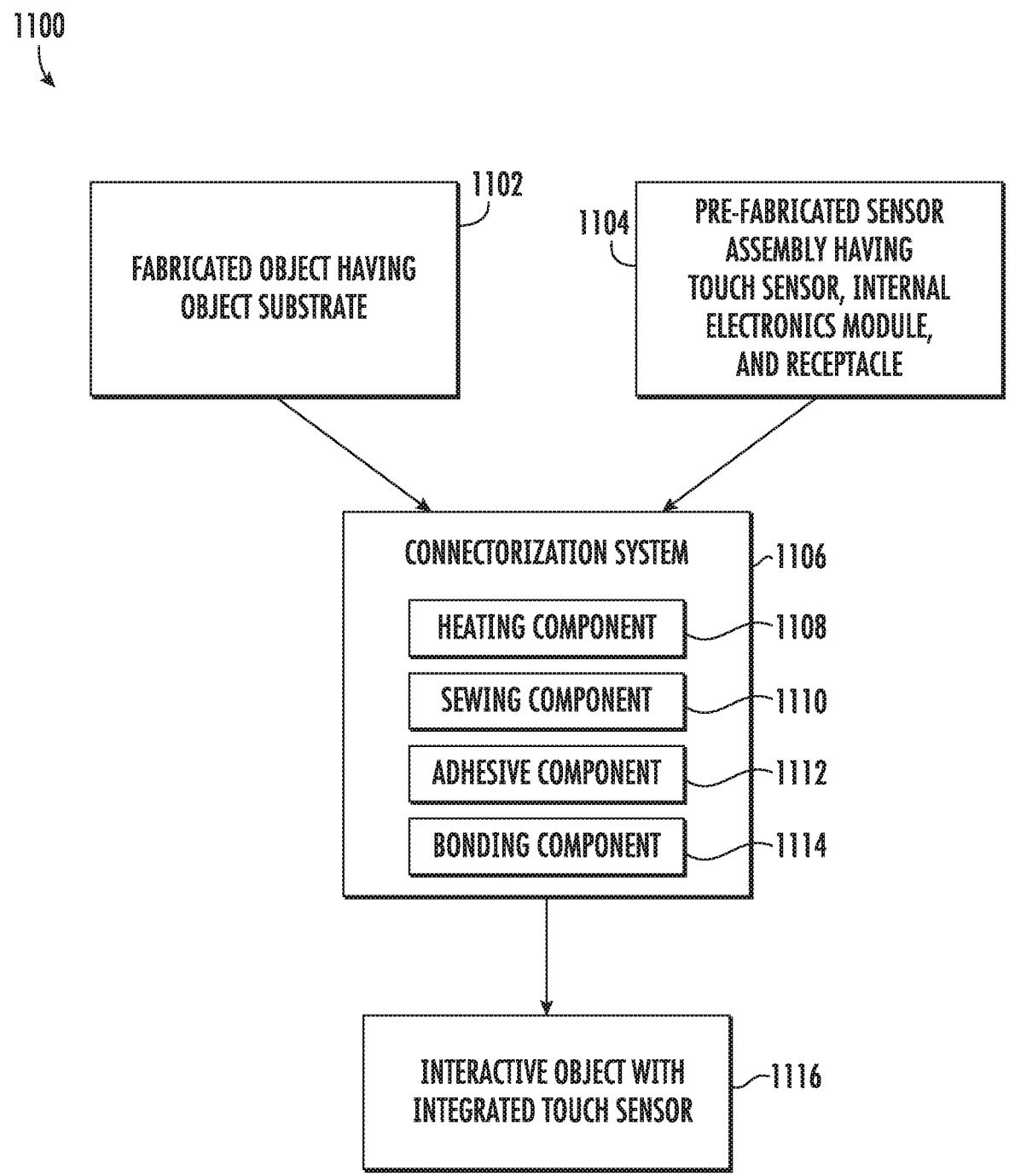
FIG. 37 depicts a block diagram illustrating an example process of manufacturing an interactive object using a pre-fabricated sensor assembly in accordance with example embodiments of the present disclosure.

FIG. 37 is a block diagram depicting a manufacturing process 1100 that can be utilized in accordance with example embodiments of the present disclosure. A pre-fabricated sensor assembly can be applied to a object substrate is been at least partially formed into an object.

At 1102, process 1100 includes providing a fabricated object having an object substrate. The fabricated object can be a manufactured object comprising an object substrate. The manufactured object can be received by a connectorization system. The manufactured object can be in a form suitable for its primary purpose. For example, the manufacturer object can be a garment that is suitable to be worn or garment accessory that is suitable to be used. As a specific example, one or more seams in a garment can be left open such that a pre-fabricated sensor assembly can be inserted within the opening. In this manner, the manufactured object can include receiving feature. The receiving feature can be an opening or other mechanism whereby a pre-fabricated sensor assembly can be inserted. Numerous types of receiving features can be used. At 1104, process 1100 can include providing a pre-fabricated sensor assembly. The pre-fabricated sensor assembly can have a touch sensor (e.g., capacitive or resistive), an internal electronics module, and a receptacle in example embodiments. The pre-fabricated sensor assembly can include a communication interface having a first in portion coupled to a first electronics module and a second and portion coupled to a receptacle configured to removably connect a second electronics module to the pre-fabricated sensor assembly. The touch sensor can include a plurality of flexible sensing elements such as flexible sensing lines elongated in a first direction coupled to the first electronics module. The first electronics module can be powered by a power source of the second electronics module when the second electronics module is connected to the pre-fabricated sensor assembly. The fabricated object and the pre-fabricated sensor assembly can be provided to a connectorization system 1106.

Connectorization system 1106 can include a heating component 1108, a sewing component 1110, an adhesive component 1112, a bonding component 1114, and/or other components that can be utilized to connect pre-fabricated sensor assembly to the fabricated object having an object substrate.

The connectorization system 1106 can be used to create an interactive object having an integrated capacitive touch sensor shown at 1116. In some examples, a first connectorization component can be utilized to attach one portion of the pre-fabricated sensor assembly to an interactive object in a second connector relation component can utilize to connect the second portion of the pre-fabricated sensor assemblies to the interactive object. By way of example, one or more flexible retaining layers such as one or more encapsulation films can be heat pressed to attach a capacitive touch sensor portion of a capacitive sensor assembly to an interactive object. In another example a sewing component or other bonding component can be utilized to attach the capacitive touch sensor to the interactive object.

A second connectorization component can be utilized to attach a second portion of the pre-fabricated sensor assembly to the interactive object. For example, after using a heating component 1108 to attach one or more retaining layers housing a capacitive touch sensor, sewing component 1110 can be utilized to attach a receptacle to the interactive object. Other examples and combinations can be used.

In accordance with example embodiments, a pre-fabricated sensor assembly for an interactive object including an object substrate can be provided. The pre-fabricated sensor assembly can include a capacitive touch sensor that includes a plurality of flexible sensing lines elongated in at least a first direction. The pre-fabricated sensor assembly can include a first electronics module comprising sensing circuitry in electrical communication with the plurality of flexible sensing lines. The pre-fabricated sensor assembly can include a communication interface comprising a first end portion coupled to the first electronics module and comprising a second end portion. The pre-fabricated sensor assembly can include a receptacle coupled to the second end portion of the communication interface. The receptacle can include one or more electrical contacts for electrically coupling to a second electronics module. The receptacle can be configured to removably connect the second electronics module to the pre-fabricated sensor assembly. The pre-fabricated sensor assembly can include one or more flexible retaining layers that define a housing for a first portion of the pre-fabricated sensor assembly. The first portion of the pre-fabricated sensor assembly can include at least a portion of each of the plurality of flexible sensing lines.

FIG. 38 illustrates various components of an example computing system 1202 that can implement any type of client, server, and/or computing device described herein. In embodiments, computing system 1202 can be implemented as one or a combination of a wired and/or wireless wearable device, System-on-Chip (SoC), and/or as another type of device or portion thereof. Computing system 1202 may also be associated with a user (e.g., a person) and/or an entity that operates the device such that a device describes logical devices that include users, software, firmware, and/or a combination of devices.

Computing system 1202 includes a communication interface 1214 that enables wired and/or wireless communication of data 1208 (e.g., received data, data that is being received, data scheduled for broadcast, data packets of the data, etc.). Data 1208 can include configuration settings of the device, media content stored on the device, and/or information associated with a user of the device. Media content stored on computing system 1202 can include any type of audio, video, and/or image data. Computing system 1202 includes one or more data inputs via which any type of data, media content, and/or inputs can be received, such as human utterances, touch data generated by a touch sensor, user-selectable inputs (explicit or implicit), messages, music, television media content, recorded video content, and any other type of audio, video, and/or image data received from any content and/or data source.

Communication interfaces can be implemented as any one or more of a serial and/or parallel interface, a wireless interface, any type of network interface, a modem, and as any other type of communication interface. Communication interfaces provide a connection and/or communication links between computing system 1202 and a communication network by which other electronic, computing, and communication devices communicate data with computing system 1202.

Computing system 1202 includes one or more processors 1204 (e.g., any of microprocessors, controllers, and the like), which process various computer-executable instructions to control the operation of computing system 1202 and to enable techniques for, or in which can be embodied, interactive cord. Alternatively or in addition, computing system 1202 can be implemented with any one or combination of hardware, firmware, or fixed logic circuitry that is implemented in connection with processing and control circuits. Although not shown, computing system 1202 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 1202 also includes memory 1206 which may include computer-readable media, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Memory 1206 may also include a mass storage media device of computing system 1202.

Computer-readable media provides data storage mechanisms to store device data, as well as computer-readable instructions 1210 which can implement various device applications and any other types of information and/or data related to operational aspects of computing system 1202. For example, an operating system can be maintained as a computer application with computer-readable media and executed on processors 1204. Device applications may include a device manager, such as any form of a control application, software application, signal-processing and control module, code that is native to a particular device, a hardware abstraction layer for a particular device, and so on.

Memory 1206 may also include a motion manager 1212. Motion manager 1212 is capable of interacting with applications and touch sensor 102 effective to activate various functionalities associated with computing device 106 and/or applications through touch-input (e.g., gestures) received by touch sensor 102. Motion manager 1212 may be implemented at a computing device 106 that is local to object 104 or remote from object 104. Motion manager 1212 is one example of a controller.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A removable electronics device, comprising:
   one or more processors;
   a first communication interface configured to communicatively couple the removable electronics device to one or more remote computing devices;
   a second communication interface configured to communicatively couple the removable electronics device to at least a first pre-fabricated sensor assembly comprising a first touch sensor having a first set of sensing elements and a second pre-fabricated sensor assembly comprising a second touch sensor having a second set of sensing elements, wherein a first sensor layout of the first set of sensing elements is different from a second sensor layout of the second set of sensing elements; and
   one or more non-transitory computer-readable media that collectively store instructions that, when executed by the one or more processors, cause the one or more processors to perform operations, the operations comprising:
      analyzing, in response to the removable electronics device being physically coupled to the first pre-fabricated sensor assembly, first touch data associated with the first pre-fabricated sensor assembly to detect one or more pre-defined motions based on one or more first pre-defined parameters associated with the first touch sensor; and
      analyzing, in response to the removable electronics device being physically coupled to the second pre-fabricated sensor assembly, second touch data associated with the second pre-fabricated sensor assembly to detect the one or more pre-defined motions based on one or more second pre-defined parameters associated with the second touch sensor.

2. The removable electronics device of claim 1, wherein the operations further comprise:
   detecting that the removable electronics device is physically coupled to the first pre-fabricated sensor assembly via the second communication interface;
   obtaining the one or more first pre-defined parameters from at least one remote computing device via a wireless network interface in response to detecting that the removable electronics device is physically coupled to the first pre-fabricated sensor assembly; and
   configuring the removable electronics device to detect the one or more pre-defined motions based at least in part on the one or more first pre-defined parameters.

3. The removable electronics device of claim 2, wherein the operations further comprise:
   subsequent to configuring the removable electronics device to detect the one or more pre-defined motions based at least in part on the one or more first pre-defined parameters, detecting that the removable electronics device is physically coupled to the second pre-fabricated sensor assembly via the second communication interface;
   obtaining the one or more second pre-defined parameters from the at least one remote computing device via the wireless network interface in response to detecting that the removable electronics device is physically coupled to the second pre-fabricated sensor assembly; and configuring the removable electronics device to detect the one or more pre-defined motions based at least in part on the one or more second pre-defined parameters.

4. The removable electronics device of claim 3, wherein:
configuring the removable electronics device to detect the one or more pre-defined motions based at least in part on the one or more first pre-defined parameters comprises configuring one or more machine-learned models to detect the one or more pre-defined motions based at least in part on the one or more first pre-defined parameters; and
configuring the removable electronics device to detect the one or more pre-defined motions based at least in part on the one or more second pre-defined parameters comprises configuring the one or more machine-learned models to detect the one or more pre-defined motions based at least in part on the one or more second pre-defined parameters.

5. The removable electronics device of claim 4, wherein:
configuring the one or more machine-learned models to detect the one or more pre-defined motions based at least in part on the one or more first pre-defined parameters comprises configuring the one or more machine-learned models to detect the one or more pre-defined motions using a first set of weights associated with the first pre-fabricated sensor assembly; and
configuring the one or more machine-learned models to detect the one or more pre-defined motions based at least in part on the one or more second pre-defined parameters comprises configuring the one or more machine-learned models to detect the one or more pre-defined motions using on a second set of weights associated with the second pre-fabricated sensor assembly.

6. The removable electronics device of claim 3, wherein:
configuring the removable electronics device to detect the one or more pre-defined motions based at least in part on the one or more first pre-defined parameters comprises obtaining one or more first machine-learned models for detecting the one or more pre-defined motions; and
configuring the removable electronics device to detect the one or more pre-defined motions based at least in part on the one or more second pre-defined parameters comprises obtaining one or more second machine-learned models for detecting the one or more pre-defined motions.

7. The removable electronics device of claim 1, wherein:
the first communication interface is configured to physically and removably couple the removable electronics device to the one or more remote computing devices;
the second communication interface is configured to physically and removably couple the removable electronics device to the first pre-fabricated sensor assembly and the second pre-fabricated sensor assembly; and
the removable electronics device includes a wireless network interface configured to communicatively couple the removable electronics device to at least one remote computing device.

8. The removable electronics device of claim 1, wherein the first sensor layout includes a least one of a different number of sensing elements, a different spacing of sensing elements, or a different sensing element material, relative to the second sensor layout.

9. The removable electronics device of claim 1, wherein:
the removable electronics device is configured to provide power to sensing circuitry for the first set of sensing elements of the first pre-fabricated sensor assembly when the removable electronics device is physically coupled to the first pre-fabricated sensor assembly; and
the removable electronics device is configured to provide power to sensing circuitry for the second set of sensing elements of the second pre-fabricated sensor assembly when the removable electronics device is physically coupled to the second pre-fabricated sensor assembly.

10. The removable electronics device of claim 1, further comprising:
an interactive backpack including the first pre-fabricated sensor assembly; and
an interactive jacket including the second pre-fabricated sensor assembly.

11. A computer-implemented method of analyzing touch input for interactive objects, comprising:
detecting, by one or more processors of a removable electronics device, that the removable electronics device is physically coupled to a first pre-fabricated sensor assembly comprising a first touch sensor having a first set of sensing elements, the first set of sensing elements having a first sensor layout;
obtaining, by the one or more processors and in response to detecting that the removable electronics device is physically coupled to the first pre-fabricated sensor assembly, one or more first pre-defined parameters associated with the first touch sensor of the first pre-fabricated sensor assembly;
configuring, by the one or more processors, the removable electronics device to detect one or more pre-defined motions using the one or more first pre-defined parameters in response to touch data associated with the first pre-fabricated sensory assembly;
detecting, by the one or more processors, that the removable electronics device is physically coupled to a second pre-fabricated sensor assembly comprising a second touch sensor having a second set of sensing elements, the second set of sensing elements having a second sensor layout that is different from the first sensor layout;
obtaining, by the one or more processors and in response to detecting that the removable electronics device is physically coupled to the second pre-fabricated sensor assembly, one or more second pre-defined parameters associated with the second touch sensor of the second pre-fabricated sensor assembly; and
configuring, by the one or more processors, the removable electronics device to detect the one or more pre-defined motions using the one or more second pre-defined parameters in response to touch data associated with the second pre-fabricated sensor assembly.

12. The computer-implemented method of claim 11, further comprising:
obtaining, via a communication interface of the removable electronics device, the touch data associated with the first pre-fabricated sensor assembly;
analyzing, by the one or more processors, the touch data associated with the first pre-fabricated sensor assembly to detect the one or more pre-defined motions based at least in part on the one or more first pre-defined parameters associated with the first touch sensor of the first pre-fabricated sensor assembly;
obtaining, via the communication interface of the removable electronics device, the touch data associated with the second pre-fabricated sensor assembly; and
analyzing, by the one or more processors, the touch data associated with the second pre-fabricated sensor assembly to detect the one or more pre-defined motions based at least in part on the one or more second pre-defined parameters associated with the second touch sensor of the second pre-fabricated sensor assembly.

13. The computer-implemented method of claim 11, wherein:
   configuring the removable electronics device to detect the one or more pre-defined motions based at least in part on the one or more first pre-defined parameters comprises configuring one or more machine-learned models to detect the one or more pre-defined motions based at least in part on the one or more first pre-defined parameters; and
   configuring the removable electronics device to detect the one or more pre-defined motions based at least in part on the one or more second pre-defined parameters comprises configuring the one or more machine-learned models to detect the one or more pre-defined motions based at least in part on the one or more second pre-defined parameters.

14. The computer-implemented method of claim 13, wherein:
   configuring the one or more machine-learned models to detect the one or more pre-defined motions based at least in part on the one or more first pre-defined parameters comprises configuring the one or more machine-learned models to detect the one or more pre-defined motions using a first set of weights associated with the first pre-fabricated sensor assembly; and
   configuring the one or more machine-learned models to detect the one or more pre-defined motions based at least in part on the one or more second pre-defined parameters comprises configuring the one or more machine-learned models to detect the one or more pre-defined motions using a second set of weights associated with the second pre-fabricated sensor assembly.

15. The computer-implemented method of claim 11, wherein:
   configuring the removable electronics device to detect the one or more pre-defined motions based at least in part on the one or more first pre-defined parameters comprises obtaining one or more first machine-learned models to detect the one or more pre-defined motions; and
   configuring the removable electronics device to detect the one or more pre-defined motions based at least in part on the one or more second pre-defined parameters comprises obtaining one or more second machine-learned models to detect the one or more pre-defined motions.

16. The computer-implemented method of claim 11, wherein:
   the first sensor layout includes at least one of a first number of sensing elements, a first spacing between sensing elements, or a first sensing material; and
   the second sensor layout includes at least one of a second number of sensing elements, a second spacing between sensing elements, or a second sensing material.

17. One or more non-transitory computer-readable media that store instructions that, when executed by one or more processors, cause the one or more processors to perform operations, the operations comprising:
   detecting, by one or more processors of a removable electronics device, that the removable electronics device is physically coupled to a first pre-fabricated sensor assembly comprising a first touch sensor having a first set of sensing elements, the first set of sensing elements having a first sensor layout;
   obtaining, by the one or more processors and in response to detecting that the removable electronics device is physically coupled to the first pre-fabricated sensor assembly, one or more first pre-defined parameters associated with the first touch sensor of the first pre-fabricated sensor assembly;
   configuring, by the one or more processors, the removable electronics device to detect one or more pre-defined motions using the one or more first pre-defined parameters in response to touch data associated with the first pre-fabricated sensory assembly;
   detecting, by the one or more processors, that the removable electronics device is physically coupled to a second pre-fabricated sensor assembly comprising a second touch sensor having a second set of sensing elements, the second set of sensing elements having a second sensor layout that is different from the first sensor layout;
   obtaining, by the one or more processors and in response to detecting that the removable electronics device is physically coupled to the second pre-fabricated sensor assembly, one or more second pre-defined parameters associated with the second touch sensor of the second pre-fabricated sensor assembly; and
   configuring, by the one or more processors, the removable electronics device to detect the one or more pre-defined motions using the one or more second pre-defined parameters in response to touch data associated with the second pre-fabricated sensor assembly.

18. The one or more non-transitory computer-readable media of claim 17, wherein:
   configuring the removable electronics device to detect the one or more pre-defined motions using the one or more first pre-defined parameters comprises configuring one or more machine-learned models to detect the one or more pre-defined motions based at least in part on the one or more first pre-defined parameters; and
   configuring the removable electronics device to detect the one or more pre-defined motions using the one or more second pre-defined parameters comprises configuring one or more machine-learned models to detect the one or more pre-defined motions based at least in part on the one or more second pre-defined parameters.

19. The one or more non-transitory computer-readable media of claim 18, wherein:
   configuring the one or more machine-learned models to detect the one or more pre-defined motions based at least in part on the one or more first pre-defined parameters comprises configuring the one or more machine-learned models to detect the one or more pre-defined motions using a first set of weights associated with the first pre-fabricated sensor assembly; and
   configuring the one or more machine-learned models to detect the one or more pre-defined motions based at least in part on the one or more second pre-defined parameters comprises configuring the one or more machine-learned models to detect the one or more pre-defined motions using a second set of weights associated with the second pre-fabricated sensor assembly.

20. The one or more non-transitory computer-readable media of claim 17, wherein:
   configuring the removable electronics device to detect the one or more pre-defined motions based at least in part on the one or more first pre-defined parameters comprises obtaining one or more first machine-learned models for detecting the one or more pre-defined motions; and configuring the removable electronics device to detect the one or more pre-defined motions based at least in part on the one or more second pre-defined parameters comprises obtaining one or more second machine-learned models for detecting the one or more pre-defined motions.

\* \* \* \* \*